(12) United States Patent
Vandike et al.

(10) Patent No.: US 12,733,563 B2
(45) Date of Patent: Sep. 15, 2026

(54) SYSTEMS AND METHODS FOR PREDICTIVE END DIVIDER CONTROL

(71) Applicant: Deere & Company, Moline, IL (US)

(72) Inventors: Nathan R. Vandike, Geneseo, IL (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 1200 days.

(21) Appl. No.: 17/682,470

(22) Filed: Feb. 28, 2022

(65) Prior Publication Data

US 2023/0270038 A1 Aug. 31, 2023

(51) Int. Cl.
*A01D 63/00* (2006.01)
*A01B 79/00* (2006.01)
*A01D 45/02* (2006.01)

(52) U.S. Cl.
CPC .......... *A01B 79/005* (2013.01); *A01D 45/021* (2013.01); *A01D 63/00* (2013.01)

(58) Field of Classification Search
None
See application file for complete search history.

(56) References Cited

U.S. PATENT DOCUMENTS 3,568,157 A 3/1971 Downing et al.
3,580,257 A 5/1971 Teague
3,599,543 A 8/1971 Kerridge
3,775,019 A 11/1973 Konig et al.
3,856,754 A 12/1974 Habermeier et al.
4,129,573 A 12/1978 Bellus et al.
4,166,735 A 9/1979 Pilgram et al.
4,183,742 A 1/1980 Sasse et al.
4,268,679 A 5/1981 Lavanish
4,349,377 A 9/1982 Durr et al.
4,360,677 A 11/1982 Doweyko et al.
4,435,203 A 3/1984 Funaki et al.
4,493,726 A 1/1985 Burdeska et al.
4,566,901 A 1/1986 Martin et al.
4,584,013 A 4/1986 Brunner
4,687,505 A 8/1987 Sylling et al.
4,857,101 A 8/1989 Musco et al.
4,911,751 A 3/1990 Nyffeler et al.
5,059,154 A 10/1991 Reyenga
(Continued)

FOREIGN PATENT DOCUMENTS

AR 108898 A1 10/2018
AU 20100224431 A1 4/2011
(Continued)

OTHER PUBLICATIONS

Apan et al., "Predictive Mapping of Blackberry in the Condamine Catchment Using Logistic Regressiona dn Spatial Analysis", Jan. 2008, 12 pages.
(Continued)

*Primary Examiner* — Adam D Tissot
*Assistant Examiner* — Laura E Linhardt
(74) *Attorney, Agent, or Firm* — Christopher J. Volkmann; KELLY, HOLT & CHRISTENSON PLLC

(57) ABSTRACT

A map is obtained by an agricultural system. The map maps values of a characteristic to different geographic locations in a field. A control system generates a control signal to control operation of one or more end dividers on an agricultural harvester based on the map.

20 Claims, 16 Drawing Sheets

(56) References Cited

U.S. PATENT DOCUMENTS 5,089,043 A 2/1992 Hayase et al.
5,246,164 A 9/1993 McCann et al.
5,246,915 A 9/1993 Lutz et al.
5,250,690 A 10/1993 Turner et al.
5,296,702 A 3/1994 Beck et al.
5,300,477 A 4/1994 Tice
5,416,061 A 5/1995 Hewett et al.
5,477,459 A 12/1995 Clegg et al.
5,488,817 A 2/1996 Paquet et al.
5,563,112 A 10/1996 Barnes, III
5,585,626 A 12/1996 Beck et al.
5,586,033 A 12/1996 Hall
5,592,606 A 1/1997 Myers
5,606,821 A 3/1997 Sadjadi et al.
5,666,793 A 9/1997 Bottinger
5,767,373 A 6/1998 Ward et al.
5,771,169 A 6/1998 Wendte
5,789,741 A 8/1998 Kinter et al.
5,809,440 A 9/1998 Beck et al.
5,849,665 A 12/1998 Gut et al.
5,878,821 A 3/1999 Flenker et al.
5,902,343 A 5/1999 Hale et al.
5,915,492 A 6/1999 Yates et al.
5,957,304 A 9/1999 Dawson
5,991,687 A 11/1999 Hale et al.
5,991,694 A 11/1999 Gudat et al.
5,995,859 A 11/1999 Takahashi
5,995,895 A 11/1999 Watt et al.
6,004,076 A 12/1999 Cook et al.
6,016,713 A 1/2000 Hale
6,029,106 A 2/2000 Hale et al.
6,041,582 A 3/2000 Tiede et al.
6,119,442 A 9/2000 Hale
6,119,531 A 9/2000 Wendte et al.
6,178,253 B1 1/2001 Hendrickson et al.
6,185,990 B1 2/2001 Missotten et al.
6,188,942 B1 2/2001 Corcoran et al.
6,199,000 B1 3/2001 Keller et al.
6,204,856 B1 3/2001 Wood et al.
6,205,384 B1 3/2001 Diekhans
6,216,071 B1 4/2001 Motz
6,236,924 B1 5/2001 Motz et al.
6,247,297 B1 6/2001 Becker
6,374,173 B1 4/2002 Ehlbeck
6,380,745 B1 4/2002 Anderson et al.
6,431,790 B1 8/2002 Anderegg et al.
6,451,733 B1 9/2002 Pidskalny et al.
6,505,146 B1 1/2003 Blackmer
6,505,998 B1 1/2003 Bullivant
6,539,102 B1 3/2003 Anderson et al.
6,549,849 B2 4/2003 Lange et al.
6,584,390 B2 6/2003 Beck
6,591,145 B1 7/2003 Hoskinson et al.
6,591,591 B2 7/2003 Coers et al.
6,592,453 B2 7/2003 Coers et al.
6,604,432 B1 8/2003 Hamblen et al.
6,681,551 B1 1/2004 Sheidler et al.
6,729,189 B2 5/2004 Paakkinen
6,735,568 B1 5/2004 Buckwalter et al.
6,834,550 B2 12/2004 Upadhyaya et al.
6,838,564 B2 1/2005 Edmunds et al.
6,846,128 B2 1/2005 Sick
6,999,877 B1 2/2006 Dyer et al.
7,073,374 B2 7/2006 Berkman
7,167,797 B2 1/2007 Faivre et al.
7,167,800 B2 1/2007 Faivre et al.
7,191,062 B2 3/2007 Chi et al.
7,194,965 B2 3/2007 Hickey et al.
7,211,994 B1 5/2007 Mergen et al.
7,248,968 B2 7/2007 Reid
7,255,016 B2 8/2007 Gumpoltsberger
7,302,837 B2 12/2007 Wendt
7,308,326 B2 12/2007 Maertens et al.
7,313,478 B1 12/2007 Anderson et al.
7,318,010 B2 1/2008 Anderson
7,347,168 B2 3/2008 Reckels et al.
7,408,145 B2 8/2008 Holland
7,483,791 B2 1/2009 Anderegg et al.
7,557,066 B2 7/2009 Hills et al.
7,628,059 B1 12/2009 Scherbring
7,687,435 B2 3/2010 Witschel et al.
7,703,036 B2 4/2010 Satterfield et al.
7,725,233 B2 5/2010 Hendrickson et al.
7,733,416 B2 6/2010 Gal
7,756,624 B2 7/2010 Diekhans et al.
7,827,042 B2 11/2010 Jung et al.
7,915,200 B2 3/2011 Epp et al.
7,993,188 B2 8/2011 Ritter
8,024,074 B2 9/2011 Stelford et al.
8,107,681 B2 1/2012 Gaal
8,147,176 B2 4/2012 Coers et al.
8,152,610 B2 4/2012 Harrington
8,195,342 B2 6/2012 Anderson
8,195,358 B2 6/2012 Anderson
8,224,500 B2 7/2012 Anderson
8,252,723 B2 8/2012 Jakobi et al.
8,321,365 B2 11/2012 Anderson
8,329,717 B2 12/2012 Minn et al.
8,332,105 B2 12/2012 Laux
8,338,332 B1 12/2012 Hacker et al.
8,340,862 B2 12/2012 Baumgarten et al.
8,407,157 B2 3/2013 Anderson et al.
8,478,493 B2 7/2013 Anderson
8,488,865 B2 7/2013 Hausmann et al.
8,494,727 B2 7/2013 Green et al.
8,527,157 B2 9/2013 Imhof et al.
8,544,397 B2 10/2013 Bassett
8,577,561 B2 11/2013 Green et al.
8,635,903 B2 1/2014 Oetken et al.
8,671,760 B2 3/2014 Wallrath et al.
8,677,724 B2 3/2014 Chaney et al.
8,738,244 B2 5/2014 Lenz et al.
8,843,269 B2 9/2014 Anderson et al.
8,909,389 B2 12/2014 Meyer
D721,740 S 1/2015 Schmaltz et al.
8,962,523 B2 2/2015 Rosinger et al.
9,008,918 B2 4/2015 Missotten et al.
9,009,087 B1 4/2015 Mewes et al.
9,011,222 B2 4/2015 Johnson et al.
9,043,096 B2 5/2015 Zielke et al.
9,043,129 B2 5/2015 Bonefas et al.
9,066,465 B2 6/2015 Hendrickson et al.
9,073,428 B2 7/2015 Shimada et al.
9,095,090 B2 8/2015 Casper et al.
9,127,428 B2 9/2015 Meier
9,131,644 B2 9/2015 Osborne
9,152,938 B2 10/2015 Lang et al.
9,173,339 B2 11/2015 Sauder et al.
9,179,599 B2 11/2015 Bischoff
9,188,518 B2 11/2015 Snyder et al.
9,226,449 B2 1/2016 Bischoff
9,234,317 B2 1/2016 Chi
9,235,214 B2 1/2016 Anderson
9,301,466 B2 4/2016 Kelly
9,322,629 B2 4/2016 Sauder et al.
9,405,039 B2 8/2016 Anderson
9,410,840 B2 8/2016 Acheson et al.
9,439,342 B2 9/2016 Pasquier
9,485,905 B2 11/2016 Jung et al.
9,489,576 B2 11/2016 Johnson et al.
9,510,508 B2 12/2016 Jung
9,511,633 B2 12/2016 Anderson et al.
9,516,812 B2 12/2016 Baumgarten et al.
9,521,805 B2 12/2016 Muench et al.
9,538,714 B2 1/2017 Anderson
9,563,492 B2 2/2017 Bell et al.
9,563,852 B1 2/2017 Wiles et al.
9,578,808 B2 2/2017 Dybro et al.
9,629,308 B2 4/2017 Schøler et al.
9,631,964 B2 4/2017 Gelinske et al.
9,648,807 B2 5/2017 Escher et al.
9,681,605 B2 6/2017 Noonan et al.
9,694,712 B2 7/2017 Healy
9,696,162 B2 7/2017 Anderson

(56) References Cited

U.S. PATENT DOCUMENTS 9,699,967 B2 7/2017 Palla et al.
9,714,856 B2 7/2017 Myers
9,721,181 B2 8/2017 Guan et al.
9,723,790 B2 8/2017 Berry et al.
9,740,208 B2 8/2017 Sugumaran et al.
9,767,521 B2 9/2017 Stuber et al.
9,807,940 B2 11/2017 Roell et al.
9,810,679 B2 11/2017 Kimmel
9,848,528 B2 12/2017 Werner et al.
9,856,609 B2 1/2018 Dehmel
9,856,612 B2 1/2018 Detken
9,872,433 B2 1/2018 Acheson et al.
9,903,077 B2 2/2018 Rio
9,903,979 B2 2/2018 Dybro et al.
9,904,963 B2 2/2018 Rupp et al.
9,922,405 B2 3/2018 Sauder et al.
9,928,584 B2 3/2018 Jens et al.
9,974,226 B2 5/2018 Rupp et al.
9,982,397 B2 5/2018 Korb et al.
9,984,455 B1 5/2018 Fox et al.
10,004,176 B2 6/2018 Mayerle
10,019,018 B2 7/2018 Hulin
10,025,983 B2 7/2018 Guan et al.
10,028,435 B2 7/2018 Anderson et al.
10,028,451 B2 7/2018 Rowan et al.
10,039,231 B2 8/2018 Anderson et al.
10,058,028 B2 8/2018 Richard et al.
10,064,331 B2 9/2018 Bradley
10,064,335 B2 9/2018 Byttebier et al.
10,078,890 B1 9/2018 Tagestad et al.
10,085,372 B2 10/2018 Noyer et al.
10,091,925 B2 10/2018 Aharoni et al.
10,126,153 B2 11/2018 Bischoff et al.
10,143,132 B2 12/2018 Inoue et al.
10,152,035 B2 12/2018 Reid et al.
10,154,624 B2 12/2018 Guan et al.
10,165,725 B2 1/2019 Sugumaran et al.
10,178,823 B2 1/2019 Kovach et al.
10,183,667 B2 1/2019 Anderson et al.
10,188,037 B2 1/2019 Bruns et al.
10,201,121 B1 2/2019 Wilson
10,209,179 B2 2/2019 Hollstein
10,231,371 B2 3/2019 Dillon
10,255,670 B1 4/2019 Wu et al.
10,275,550 B2 4/2019 Lee
10,295,703 B2 5/2019 Dybro et al.
10,310,455 B2 6/2019 Blank et al.
10,314,232 B2 6/2019 Isaac et al.
10,315,655 B2 6/2019 Blank et al.
10,368,488 B2 8/2019 Becker et al.
10,408,545 B2 9/2019 Nakamura et al.
10,412,889 B2 9/2019 Palla et al.
10,426,086 B2 10/2019 Van De Wege et al.
10,437,243 B2 10/2019 Blank et al.
10,477,756 B1 11/2019 Richt et al.
10,485,178 B2 11/2019 Mayerle
10,521,526 B2 12/2019 Haaland et al.
10,537,061 B2 1/2020 Farley et al.
10,568,316 B2 2/2020 Gall et al.
10,631,462 B2 4/2020 Bonefas
10,687,469 B2 6/2020 Ricketts et al.
10,694,654 B2 6/2020 Walker et al.
10,729,067 B2 8/2020 Hammer et al.
10,745,868 B2 8/2020 Laugwitz et al.
10,866,109 B2 12/2020 Madsen et al.
10,909,368 B2 2/2021 Guo et al.
10,912,249 B1 2/2021 Wilson
12,171,163 B2 12/2024 Shearer et al.
2002/0083695 A1 7/2002 Behnke et al.
2002/0091458 A1 7/2002 Moore
2002/0099471 A1 7/2002 Benneweis
2002/0133309 A1 9/2002 Hardt
2002/0193928 A1 12/2002 Beck
2002/0193929 A1 12/2002 Beck
2002/0198654 A1 12/2002 Lange et al.
2003/0004630 A1 1/2003 Beck
2003/0014171 A1 1/2003 Ma et al.
2003/0015351 A1 1/2003 Goldmari et al.
2003/0060245 A1 3/2003 Coers et al.
2003/0075145 A1 4/2003 Sheidler et al.
2003/0174207 A1 9/2003 Alexia et al.
2003/0187560 A1 10/2003 Keller et al.
2003/0216158 A1 11/2003 Bischoff
2003/0229432 A1 12/2003 Ho et al.
2003/0229435 A1 12/2003 Van der Lely
2005/0059445 A1 3/2005 Niermann et al.
2005/0066738 A1 3/2005 Moore
2005/0149235 A1 7/2005 Seal et al.
2005/0197175 A1 9/2005 Anderson
2005/0241285 A1 11/2005 Maertens et al.
2005/0284119 A1 12/2005 Brunnert
2006/0014643 A1 1/2006 Hacker et al.
2006/0074560 A1 4/2006 Dyer et al.
2006/0196158 A1 9/2006 Faivre et al.
2006/0200334 A1 9/2006 Faivre et al.
2007/0005209 A1 1/2007 Fitzner et al.
2007/0021948 A1 1/2007 Anderson
2007/0056258 A1 3/2007 Behnke
2007/0068238 A1 3/2007 Wendte
2007/0089390 A1 4/2007 Hendrickson et al.
2007/0135190 A1 6/2007 Diekhans et al.
2007/0185749 A1 8/2007 Anderson et al.
2007/0199903 A1 8/2007 Denny
2007/0208510 A1 9/2007 Anderson et al.
2007/0239337 A1 10/2007 Anderson
2008/0030320 A1 2/2008 Wilcox et al.
2008/0140431 A1 6/2008 Anderson et al.
2008/0177449 A1 7/2008 Pickett et al.
2008/0248843 A1 10/2008 Birrell et al.
2008/0268927 A1 10/2008 Farley et al.
2008/0269052 A1 10/2008 Rosinger et al.
2008/0289308 A1 11/2008 Brubaker
2008/0312085 A1 12/2008 Kordes et al.
2009/0074243 A1 3/2009 Missotten et al.
2009/0143941 A1 6/2009 Tarasinski et al.
2009/0226036 A1 9/2009 Gaal
2009/0259483 A1 10/2009 Hendrickson et al.
2009/0265098 A1 10/2009 Dix
2009/0311084 A1 12/2009 Coers et al.
2009/0312920 A1 12/2009 Boenig et al.
2009/0325658 A1 12/2009 Phelan et al.
2010/0036696 A1 2/2010 Lang et al.
2010/0063626 A1 3/2010 Anderson
2010/0063648 A1 3/2010 Anderson
2010/0063651 A1 3/2010 Anderson
2010/0063664 A1 3/2010 Anderson
2010/0063954 A1 3/2010 Anderson
2010/0071329 A1 3/2010 Hindryckx et al.
2010/0094481 A1 4/2010 Anderson
2010/0121541 A1 5/2010 Behnke et al.
2010/0137373 A1 6/2010 Hungenberg et al.
2010/0152270 A1 6/2010 Suty-Heinze et al.
2010/0152943 A1 6/2010 Matthews
2010/0268562 A1 10/2010 Anderson
2010/0268679 A1 10/2010 Anderson
2010/0285964 A1 11/2010 Waldraff et al.
2010/0317517 A1 12/2010 Rosinger et al.
2010/0319941 A1 12/2010 Peterson
2011/0056178 A1 3/2011 Sauerwein et al.
2011/0059782 A1 3/2011 Harrington
2011/0086684 A1 4/2011 Luellen et al.
2011/0213531 A1 9/2011 Farley et al.
2011/0270494 A1 11/2011 Imhof et al.
2011/0270495 A1 11/2011 Knapp
2011/0307149 A1 12/2011 Pighi et al.
2012/0004813 A1 1/2012 Baumgarten et al.
2012/0029732 A1 2/2012 Meyer
2012/0087771 A1 4/2012 Wenzel
2012/0096827 A1 4/2012 Chaney et al.
2012/0253611 A1 10/2012 Zielke et al.
2012/0323452 A1 12/2012 Green et al.
2013/0046419 A1 2/2013 Anderson et al.
2013/0046439 A1 2/2013 Anderson et al.
2013/0046525 A1 2/2013 Ali et al.

(56) References Cited

U.S. PATENT DOCUMENTS

2013/0103269 A1 4/2013 Meyer Zu Helligen et al.
2013/0124239 A1 5/2013 Rosa et al.
2013/0184944 A1 7/2013 Missotten et al.
2013/0205733 A1 8/2013 Peters et al.
2013/0210505 A1 8/2013 Bischoff
2013/0231823 A1 9/2013 Wang et al.
2013/0319941 A1 12/2013 Schneider
2013/0332003 A1 12/2013 Murray et al.
2014/0002489 A1 1/2014 Sauder et al.
2014/0019017 A1 1/2014 Wilken et al.
2014/0021598 A1 1/2014 Sutardja
2014/0050364 A1 2/2014 Brueckner et al.
2014/0067745 A1 3/2014 Avey
2014/0121882 A1 5/2014 Gilmore et al.
2014/0129048 A1 5/2014 Baumgarten et al.
2014/0172222 A1 6/2014 Nickel
2014/0172224 A1 6/2014 Matthews et al.
2014/0172225 A1 6/2014 Matthews et al.
2014/0215984 A1 8/2014 Bischoff
2014/0230391 A1 8/2014 Hendrickson et al.
2014/0230392 A1 8/2014 Dybro et al.
2014/0236381 A1 8/2014 Anderson et al.
2014/0236431 A1 8/2014 Hendrickson et al.
2014/0257911 A1 9/2014 Anderson
2014/0277960 A1 9/2014 Blank et al.
2014/0297242 A1 10/2014 Sauder et al.
2014/0338298 A1 11/2014 Jung et al.
2014/0350802 A1 11/2014 Biggerstaff et al.
2014/0360148 A1 12/2014 Wienker et al.
2015/0049088 A1 2/2015 Snyder et al.
2015/0088785 A1 3/2015 Chi
2015/0095830 A1 4/2015 Massoumi et al.
2015/0101300 A1 4/2015 Pierson
2015/0105984 A1 4/2015 Birrell et al.
2015/0121831 A1 5/2015 Noll et al.
2015/0124054 A1 5/2015 Darr et al.
2015/0168187 A1 6/2015 Myers
2015/0211199 A1 7/2015 Corcoran et al.
2015/0242799 A1 8/2015 Seki et al.
2015/0243114 A1 8/2015 Tanabe et al.
2015/0254800 A1 9/2015 Johnson et al.
2015/0264863 A1 9/2015 Muench et al.
2015/0276794 A1 10/2015 Pistrol et al.
2015/0278640 A1 10/2015 Johnson et al.
2015/0293029 A1 10/2015 Acheson et al.
2015/0305238 A1 10/2015 Klausmann et al.
2015/0305239 A1 10/2015 Jung
2015/0327440 A1 11/2015 Dybro et al.
2015/0351320 A1 12/2015 Takahara et al.
2015/0370935 A1 12/2015 Starr
2015/0373902 A1 12/2015 Pasquier
2016/0014971 A1* 1/2016 Kraus .................. A01D 85/005
701/50
2016/0025531 A1 1/2016 Bischoff et al.
2016/0029558 A1 2/2016 Dybro et al.
2016/0052525 A1 2/2016 Tuncer et al.
2016/0057922 A1 3/2016 Freiberg et al.
2016/0066505 A1 3/2016 Bakke et al.
2016/0073573 A1 3/2016 Ethington et al.
2016/0078375 A1 3/2016 Ethington et al.
2016/0084813 A1 3/2016 Anderson et al.
2016/0088794 A1 3/2016 Baumgarten et al.
2016/0106038 A1 4/2016 Boyd et al.
2016/0146611 A1 5/2016 Matthews
2016/0203657 A1 7/2016 Bell et al.
2016/0212939 A1 7/2016 Ouchida et al.
2016/0215994 A1 7/2016 Mewes et al.
2016/0232621 A1 8/2016 Ethington et al.
2016/0247075 A1 8/2016 Mewes et al.
2016/0247082 A1 8/2016 Stehling
2016/0260021 A1 9/2016 Marek
2016/0286720 A1 10/2016 Heitmann et al.
2016/0286721 A1 10/2016 Heitmann et al.
2016/0286722 A1 10/2016 Heitmann et al.
2016/0309656 A1 10/2016 Wilken et al.
2016/0324072 A1 11/2016 Long et al.
2016/0327535 A1 11/2016 Cotton et al.
2016/0330906 A1 11/2016 Acheson et al.
2016/0338267 A1 11/2016 Anderson et al.
2016/0360697 A1 12/2016 Diaz
2017/0013773 A1 1/2017 Kirk et al.
2017/0031365 A1 2/2017 Sugumaran et al.
2017/0034997 A1 2/2017 Mayerle
2017/0049045 A1 2/2017 Wilken et al.
2017/0086381 A1 3/2017 Roell et al.
2017/0089741 A1 3/2017 Takahashi et al.
2017/0089742 A1 3/2017 Bruns et al.
2017/0090068 A1 3/2017 Xiang et al.
2017/0105335 A1 4/2017 Xu et al.
2017/0112061 A1 4/2017 Meyer
2017/0115862 A1 4/2017 Stratton et al.
2017/0118915 A1 5/2017 Middelberg et al.
2017/0124463 A1 5/2017 Chen et al.
2017/0161627 A1 6/2017 Xu et al.
2017/0185086 A1 6/2017 Sauder et al.
2017/0188515 A1 7/2017 Baumgarten et al.
2017/0192431 A1 7/2017 Foster et al.
2017/0208742 A1 7/2017 Ingibergsson et al.
2017/0215330 A1 8/2017 Missotten et al.
2017/0223947 A1 8/2017 Gall et al.
2017/0227969 A1 8/2017 Murray et al.
2017/0235471 A1 8/2017 Scholer et al.
2017/0245434 A1 8/2017 Jung et al.
2017/0251600 A1 9/2017 Anderson et al.
2017/0316692 A1 11/2017 Rusciolelli et al.
2017/0318743 A1 11/2017 Sauder et al.
2017/0332551 A1 11/2017 Todd et al.
2017/0339827 A1 11/2017 Anderson et al.
2017/0370765 A1 12/2017 Meier et al.
2018/0000011 A1 1/2018 Schleusner et al.
2018/0014452 A1* 1/2018 Starr .................. A01M 7/0089
2018/0035622 A1 2/2018 Gresch et al.
2018/0054955 A1 3/2018 Oliver
2018/0060975 A1 3/2018 Hassanzadeh
2018/0070534 A1 3/2018 Mayerle
2018/0077865 A1 3/2018 Gallmeier
2018/0084709 A1 3/2018 Wieckhorst et al.
2018/0084722 A1 3/2018 Wieckhorst et al.
2018/0092301 A1 4/2018 Vandike et al.
2018/0092302 A1 4/2018 Vandike et al.
2018/0108123 A1 4/2018 Baurer et al.
2018/0121821 A1 5/2018 Parsons et al.
2018/0124992 A1 5/2018 Koch et al.
2018/0128933 A1 5/2018 Koch et al.
2018/0129879 A1 5/2018 Achtelik et al.
2018/0132422 A1 5/2018 Hassanzadeh et al.
2018/0136664 A1 5/2018 Tomita et al.
2018/0146624 A1 5/2018 Chen et al.
2018/0153084 A1 6/2018 Calleija et al.
2018/0177125 A1 6/2018 Takahara et al.
2018/0196438 A1 7/2018 Newlin et al.
2018/0196441 A1 7/2018 Muench et al.
2018/0211156 A1 7/2018 Guan et al.
2018/0232674 A1 8/2018 Bilde
2018/0242523 A1 8/2018 Kirchbeck et al.
2018/0249641 A1 9/2018 Lewis et al.
2018/0257657 A1 9/2018 Blank et al.
2018/0271015 A1 9/2018 Redden et al.
2018/0279599 A1 10/2018 Struve
2018/0295771 A1 10/2018 Peters
2018/0310474 A1 11/2018 Posselius et al.
2018/0317381 A1 11/2018 Bassett
2018/0317385 A1 11/2018 Wellensiek et al.
2018/0325012 A1 11/2018 Ferrari et al.
2018/0325014 A1 11/2018 Debbaut
2018/0332767 A1 11/2018 Muench et al.
2018/0338422 A1 11/2018 Brubaker
2018/0340845 A1 11/2018 Rhodes et al.
2018/0359917 A1 12/2018 Blank et al.
2018/0359919 A1 12/2018 Blank et al.
2018/0364726 A1 12/2018 Foster et al.
2019/0021226 A1 1/2019 Dima et al.
2019/0025175 A1 1/2019 Laugwitz
2019/0041813 A1 2/2019 Horn et al.

(56) References Cited

U.S. PATENT DOCUMENTS

2019/0050948 A1 2/2019 Perry et al.
2019/0057460 A1 2/2019 Sakaguchi et al.
2019/0066234 A1 2/2019 Bedoya et al.
2019/0069470 A1 3/2019 Pfeiffer et al.
2019/0075727 A1 3/2019 Duke et al.
2019/0090423 A1 3/2019 Escher et al.
2019/0104722 A1 4/2019 Slaughter et al.
2019/0108413 A1 4/2019 Chen et al.
2019/0114847 A1 4/2019 Wagner et al.
2019/0129430 A1 5/2019 Madsen et al.
2019/0136491 A1 5/2019 Martin
2019/0138962 A1 5/2019 Ehlmann et al.
2019/0147094 A1 5/2019 Zhan et al.
2019/0147249 A1 5/2019 Kiepe et al.
2019/0156255 A1 5/2019 Carroll
2019/0174667 A1 6/2019 Gresch et al.
2019/0183047 A1 6/2019 Dybro et al.
2019/0200522 A1 7/2019 Hansen et al.
2019/0230855 A1 8/2019 Reed et al.
2019/0230856 A1 8/2019 Dighton et al.
2019/0261560 A1 8/2019 Jelenkovic
2019/0327889 A1 10/2019 Borgstadt
2019/0327892 A1 10/2019 Fries et al.
2019/0335662 A1 11/2019 Good et al.
2019/0343035 A1 11/2019 Smith et al.
2019/0343043 A1 11/2019 Bormann et al.
2019/0343044 A1 11/2019 Bormann et al.
2019/0364733 A1 12/2019 Laugen et al.
2019/0364734 A1 12/2019 Kriebel et al.
2020/0008351 A1 1/2020 Zielke et al.
2020/0015416 A1 1/2020 Barther et al.
2020/0019159 A1 1/2020 Kocer et al.
2020/0024102 A1 1/2020 Brill et al.
2020/0037491 A1 2/2020 Schoeny et al.
2020/0053961 A1 2/2020 Dix et al.
2020/0084966 A1 3/2020 Corban et al.
2020/0090094 A1 3/2020 Blank
2020/0125822 A1 4/2020 Yang et al.
2020/0128732 A1 4/2020 Chaney
2020/0128733 A1 4/2020 Vandike et al.
2020/0128734 A1 4/2020 Brammeier et al.
2020/0128737 A1 4/2020 Anderson et al.
2020/0128747 A1* 4/2020 Heims .................. A01D 45/021
2020/0146203 A1 5/2020 Deng
2020/0150631 A1 5/2020 Frieberg et al.
2020/0154639 A1 5/2020 Takahara et al.
2020/0163277 A1 5/2020 Cooksey et al.
2020/0187409 A1 6/2020 Meyer Zu Helligen
2020/0221635 A1 7/2020 Hendrickson et al.
2020/0278680 A1 9/2020 Schultz et al.
2020/0319655 A1 10/2020 Desai et al.
2020/0323133 A1 10/2020 Anderson et al.
2020/0326674 A1 10/2020 Palla et al.
2020/0326727 A1 10/2020 Palla et al.
2021/0015041 A1 1/2021 Bormann et al.
2021/0084804 A1* 3/2021 Stanhope ............. A01B 79/005
2021/0129853 A1 5/2021 Appleton et al.
2021/0176916 A1 6/2021 Sidon et al.
2021/0176918 A1 6/2021 Franzen et al.
2021/0243936 A1 8/2021 Vandike et al.
2021/0289587 A1 9/2021 Heinold et al.
2021/0321554 A1* 10/2021 Liu ...................... A01C 21/005
2021/0321567 A1 10/2021 Sidon et al.
2022/0110257 A1* 4/2022 Vandike ............... A01D 41/127
2022/0113730 A1* 4/2022 Vandike ............. G01C 21/3848
2022/0225569 A1 7/2022 Zielke et al.
2022/0279704 A1* 9/2022 Sharda ................. A01C 21/005
2022/0377978 A1* 12/2022 Laugen .................. A01D 63/00

FOREIGN PATENT DOCUMENTS

BR MU6800140 U 12/1989
BR PI0502658 A 2/2007
BR PI0802384 A2 3/2010
BR PI1100258 A2 3/2014
BR 102014007178 A2 8/2016
CA 1165300 A 4/1984
CA 2283767 A1 3/2001
CA 2330979 A1 8/2001
CA 2629555 A1 11/2009
CA 135611 S 5/2011
CN 2451633 Y 10/2001
CN 101236188 A 8/2008
CN 100416590 C 9/2008
CN 101303338 A 11/2008
CN 101363833 A 2/2009
CN 201218789 Y 4/2009
CN 101839906 A 9/2010
CN 101929166 A 12/2010
CN 102080373 A 6/2011
CN 102138383 A 8/2011
CN 102277867 B 12/2011
CN 202110103 U 1/2012
CN 202119772 U 1/2012
CN 202340435 U 7/2012
CN 103088807 A 5/2013
CN 103181263 A 7/2013
CN 203053961 U 7/2013
CN 203055121 U 7/2013
CN 203206739 U 9/2013
CN 203275401 U 11/2013
CN 203613525 U 5/2014
CN 203658201 U 6/2014
CN 103954738 A 7/2014
CN 203741803 U 7/2014
CN 204000818 U 12/2014
CN 204435344 U 7/2015
CN 204475304 U 7/2015
CN 105205248 A 12/2015
CN 204989174 U 1/2016
CN 105432228 A 3/2016
CN 105741180 A 7/2016
CN 106053330 A 10/2016
CN 106198877 A 12/2016
CN 106198879 A 12/2016
CN 106226470 A 12/2016
CN 106248873 A 12/2016
CN 106290800 A 1/2017
CN 106327349 A 1/2017
CN 106644663 A 5/2017
CN 206330815 U 7/2017
CN 206515118 U 9/2017
CN 206515119 U 9/2017
CN 206616118 U 11/2017
CN 206696107 12/2017
CN 206696107 U 12/2017
CN 107576674 1/2018
CN 107576674 A 1/2018
CN 206906093 U 1/2018
CN 206941558 1/2018
CN 206941558 U 1/2018
CN 107736088 A 2/2018
CN 107795095 A 3/2018
CN 207079558 3/2018
CN 107941286 A 4/2018
CN 107957408 A 4/2018
CN 108009542 A 5/2018
CN 108304796 A 7/2018
CN 207567744 U 7/2018
CN 108614089 A 10/2018
CN 208013131 U 10/2018
CN 108881825 A 11/2018
CN 208047351 U 11/2018
CN 109357804 A 2/2019
CN 109485353 A 3/2019
CN 109633127 A 4/2019
CN 109763476 A 5/2019
CN 109961024 A 7/2019
CN 110262287 A 9/2019
CN 110720302 A 1/2020
CN 111201879 A 5/2020
CN 210585958 U 5/2020
CN 111406505 A 7/2020
CS 247426 B1 12/1986

(56) References Cited

FOREIGN PATENT DOCUMENTS

CS 248318 B1 2/1987
CZ 17266 U1 2/2007
CZ 20252 U1 11/2009
DE 504035 C 7/1830
DE 441597 C 3/1927
DE 2354828 A1 5/1975
DE 152380 A1 11/1981
DE 3728669 A1 3/1989
DE 4431824 C1 5/1996
DE 19509496 A1 9/1996
DE 19528663 A1 2/1997
DE 19718455 A1 11/1997
DE 19705842 A1 8/1998
DE 19828355 A1 1/2000
DE 10050224 A1 4/2002
DE 10120173 A1 10/2002
DE 202004015141 U1 12/2004
DE 102005000770 B3 7/2006
DE 102005000771 A1 8/2006
DE 102008021785 A1 11/2009
DE 102009041646 A1 3/2011
DE 102010004648 A1 7/2011
DE 102010038661 A1 2/2012
DE 102011005400 A1 9/2012
DE 202012103730 U1 10/2012
DE 102011052688 A1 2/2013
DE 102012211001 A1 1/2014
DE 102012220109 5/2014
DE 102012223768 6/2014
DE 102013212151 A1 12/2014
DE 102013019098 B3 1/2015
DE 102014108449 A1 2/2015
DE 2014201203 A1 7/2015
DE 102014208068 A1 10/2015
DE 102015006398 B3 5/2016
DE 102015109799 A1 12/2016
DE 112015002194 T5 1/2017
DE 102017204511 A1 9/2018
DE 102019206734 A1 11/2020
DE 102019114872 A1 12/2020
EP 0070219 B1 10/1984
EP 0355049 A2 2/1990
EP 0532146 B1 8/1998
EP 1444879 A1 8/2004
EP 1219159 B1 6/2005
EP 1219153 B1 2/2006
EP 1692928 A2 8/2006
EP 1574122 B1 2/2008
EP 1943877 A2 7/2008
EP 1598586 B1 9/2009
EP 1731983 B1 9/2009
EP 2146307 A2 1/2010
EP 0845198 B2 2/2010
EP 2186389 A1 5/2010
EP 2267566 A2 12/2010
EP 3491192 A2 12/2010
EP 2057884 B1 1/2011
EP 2146307 B1 5/2012
EP 2446732 A1 5/2012
EP 2524586 A2 11/2012
EP 2529610 A1 12/2012
EP 2243353 B1 3/2013
EP 2174537 B1 5/2013
EP 2592919 A1 5/2013
EP 1674324 B2 5/2014
EP 2759829 A1 7/2014
EP 2267566 A3 12/2014
EP 2191439 B1 3/2015
EP 2586286 B1 3/2015
EP 2592919 B1 9/2015
EP 2921042 A1 9/2015
EP 2944725 A1 11/2015
EP 2764764 B1 12/2015
EP 2510777 B1 3/2016
EP 2997805 A1 3/2016
EP 3000302 A1 3/2016
EP 2868806 B1 7/2016
EP 3085221 A1 10/2016
EP 3095310 A1 11/2016
EP 3097759 A1 11/2016
EP 2452551 B1 5/2017
EP 3175691 A1 6/2017
EP 3195719 A1 7/2017
EP 3195720 A1 7/2017
EP 3259976 A1 12/2017
EP 3262934 A1 1/2018
EP 3491192 A1 1/2018
EP 3287007 A1 2/2018
EP 3298876 A1 3/2018
EP 3300579 A1 4/2018
EP 3315005 A1 5/2018
EP 3316208 A1 5/2018
EP 2829171 B1 6/2018
EP 2508057 7/2018
EP 2508057 B1 7/2018
EP 3378298 A1 9/2018
EP 3378299 A1 9/2018
EP 3384754 A1 10/2018
EP 3289853 B1 3/2019
EP 3456167 A1 3/2019
EP 3466239 A1 4/2019
EP 3469878 A1 4/2019
EP 3289852 B1 6/2019
EP 3494770 A1 6/2019
EP 3498074 A1 6/2019
EP 3000302 B1 8/2019
EP 3533314 A1 9/2019
EP 3569049 A1 11/2019
EP 3000307 B1 12/2019
EP 3586592 A2 1/2020
EP 3593613 A1 1/2020
EP 3593620 A1 1/2020
EP 3603379 B1 2/2020
EP 3613272 A1 2/2020
EP 3243374 B1 3/2020
EP 3626038 A1 3/2020
EP 3259976 B1 4/2020
EP 3635647 A1 4/2020
EP 3378298 B1 5/2020
EP 3646699 A1 5/2020
EP 3662741 A1 6/2020
EP 3685648 A1 7/2020
EP 2995191 B2 10/2020
ES 2116215 A1 7/1998
ES 2311322 A1 2/2009
FI 5533 A 11/1913
FR 1451480 A 1/1966
FR 2817344 A1 5/2002
FR 2901291 A 11/2007
FR 2901291 A1 11/2007
GB 901081 A 7/1962
GB 201519517 A1 5/2017
IN 01632DE2014 A 8/2016
IN 201641027017 A 10/2016
IN 202041039250 A 9/2020
JP 7079681 A 11/1982
JP S60253617 A 12/1985
JP S63308110 A 12/1988
JP H02196960 A 8/1990
JP H02215311 A 8/1990
JP H0779681 A 3/1995
JP H1066436 A 3/1998
JP H1068436 A 3/1998
JP H10191762 A 7/1998
JP 2000352044 A 12/2000
JP 2001057809 A 3/2001
JP 2002186348 A 7/2002
JP 2005227233 A 8/2005
JP 2011205967 A 10/2011
JP 2015070812 A 4/2015
JP 2015151826 A 8/2015
JP 2015219651 A 12/2015
JP 2016071726 A 5/2016
JP 2016160808 A 9/2016

(56) References Cited

FOREIGN PATENT DOCUMENTS

| | | | |
|---|---|---|---|
| JP | 6087258 | B2 | 3/2017 |
| JP | 2017136035 | A | 8/2017 |
| JP | 2017137729 | A | 8/2017 |
| JP | 2017195804 | A | 11/2017 |
| JP | 2018068284 | A | 5/2018 |
| JP | 2018102154 | A | 7/2018 |
| JP | 2018151388 | A | 9/2018 |
| JP | 2019004796 | A | 1/2019 |
| JP | 2019129744 | A | 8/2019 |
| JP | 2019146506 | A | 9/2019 |
| JP | 2019216744 | A | 12/2019 |
| JP | 2020018255 | A | 2/2020 |
| JP | 2020031607 | A | 3/2020 |
| JP | 2020113062 | A | 7/2020 |
| JP | 2020127405 | A | 8/2020 |
| JP | 2006166871 | A | 6/2026 |
| KR | 100974892 | | 8/2010 |
| KR | 100974892 | B1 | 8/2010 |
| KR | 20110018582 | A | 2/2011 |
| KR | 101067576 | B | 9/2011 |
| KR | 101067576 | B1 | 9/2011 |
| KR | 101134075 | B1 | 4/2012 |
| KR | 101447197 | B1 | 10/2014 |
| KR | 101653750 | | 9/2016 |
| KR | 20170041377 | A | 4/2017 |
| KR | 200485051 | Y | 11/2017 |
| KR | 200485051 | Y1 | 11/2017 |
| KR | 101873657 | B | 8/2018 |
| MX | GT06000012 | A | 1/2008 |
| PL | 178299 | B1 | 4/2000 |
| RO | 130713 | | 11/2015 |
| RU | 1791767 | C | 1/1993 |
| RU | 2005102554 | A | 7/2006 |
| RU | 2421744 | C | 6/2011 |
| RU | 2421744 | C1 | 6/2011 |
| RU | 2447640 | C1 | 4/2012 |
| RU | 2502047 | C | 12/2013 |
| RU | 2502047 | C1 | 12/2013 |
| RU | 164128 | | 8/2016 |
| RU | 2017114139 | A | 10/2018 |
| RU | 2017114139 | A3 | 5/2019 |
| SU | 834514 | A1 | 5/1981 |
| SU | 887717 | A1 | 12/1981 |
| SU | 1052940 | A1 | 11/1983 |
| SU | 1134669 | A1 | 1/1985 |
| SU | 1526588 | A1 | 12/1989 |
| SU | 1540053 | A1 | 1/1991 |
| SU | 1761864 | A1 | 9/1992 |
| WO | 1986005353 | A1 | 9/1986 |
| WO | 2001052160 | A1 | 7/2001 |
| WO | 2003005803 | A1 | 1/2003 |
| WO | 2007050192 | A2 | 5/2007 |
| WO | 2009156542 | A1 | 12/2009 |
| WO | 2010003421 | A1 | 1/2010 |
| WO | 2011104085 | A1 | 9/2011 |
| WO | 2013063106 | A2 | 5/2013 |
| WO | 2014093814 | A1 | 6/2014 |
| WO | 2014195302 | A1 | 12/2014 |
| WO | 2015038751 | A1 | 3/2015 |
| WO | 2015153809 | A1 | 10/2015 |
| WO | 16020595 | A1 | 2/2016 |
| WO | 2016020595 | A1 | 2/2016 |
| WO | 2016118686 | A1 | 7/2016 |
| WO | 2017008161 | A1 | 1/2017 |
| WO | 2017060168 | A1 | 4/2017 |
| WO | 2017077113 | A1 | 5/2017 |
| WO | 2017096489 | A1 | 6/2017 |
| WO | 2017099570 | A1 | 6/2017 |
| WO | 2017116913 | A1 | 7/2017 |
| WO | 2017170507 | A1 | 10/2017 |
| WO | 2017205406 | A1 | 11/2017 |
| WO | 2017205410 | A1 | 11/2017 |
| WO | 2018043336 | A1 | 3/2018 |
| WO | 2018073060 | A1 | 4/2018 |
| WO | 2018081759 | A1 | 5/2018 |
| WO | 2018112615 | | 6/2018 |
| WO | 2018200870 | A1 | 11/2018 |
| WO | 2018206587 | A1 | 11/2018 |
| WO | 2018220159 | A1 | 12/2018 |
| WO | 2018235486 | A1 | 12/2018 |
| WO | 2018235942 | A1 | 12/2018 |
| WO | WO18235486 | A1 | 12/2018 |
| WO | 2019034213 | A1 | 2/2019 |
| WO | 2019079205 | A1 | 4/2019 |
| WO | 2019081349 | A1 | 5/2019 |
| WO | 2019091535 | A1 | 5/2019 |
| WO | 2019109191 | A1 | 6/2019 |
| WO | 2019124174 | A1 | 6/2019 |
| WO | 2019124217 | A1 | 6/2019 |
| WO | 2019124225 | A1 | 6/2019 |
| WO | 2019124273 | A1 | 6/2019 |
| WO | 2019129333 | A1 | 7/2019 |
| WO | 2019129334 | A1 | 7/2019 |
| WO | 2019129335 | A1 | 7/2019 |
| WO | 2019230358 | A1 | 12/2019 |
| WO | 2020026578 | A1 | 2/2020 |
| WO | 2020031473 | A1 | 2/2020 |
| WO | 2020039312 | A1 | 2/2020 |
| WO | 2020039671 | A1 | 2/2020 |
| WO | 2020100810 | A1 | 5/2020 |
| WO | 2020110920 | A1 | 6/2020 |
| WO | 2020195007 | A1 | 10/2020 |
| WO | 2020206941 | A1 | 10/2020 |
| WO | 2020206942 | A1 | 10/2020 |
| WO | 2020210607 | A1 | 10/2020 |
| WO | 2020221981 | A1 | 11/2020 |
| WO | WO2021116802 | A1 | 6/2021 |
| WO | 2021262500 | A1 | 12/2021 |

OTHER PUBLICATIONS

Robson, “Remote Sensing Applications for the Determination of Yield, Maturity and Aflatoxin Contamination in Peanut”, Oct. 2007, 275 pages.

Bhattarai et al., “Remote Sensing Data to Detect Hessian Fly Infestation in Commercial Wheat Fields”, Apr. 16, 2019, 8 pages.

Towery, et al., “Remote Sensing of Crop Hail Damage”, Jul. 21, 1975, 31 pages.

Sa et al., “WeedMap: A Large-Scale Semantic Weed Mapping Framework Using Aerial Multispectral Imaging and Deep Neural Network for Precision Farming”, Sep. 7, 2018, 25 pages.

Mathyam et al., “Remote Sensing of Biotic Stress in Crop Plants and Its Applications for Pest Management”, Dec. 2011, 30 pages.

Martinez-Feria et al., “Evaluating Maize and Soybean Grain Dry-Down in the Field With Predictive Algorithms and Genotype-by-Environmental Analysis”, May 9, 2019, 13 pages.

“GIS Maps for Agriculture”, Precision Agricultural Mapping, Retrieved Dec. 11, 2020, 6 pages.

Paul, “Scabby Wheat Grain? Increasing Your Fan Speed May Help”, https://agcrops.osu.edu/newsletter/corn-newsletter/2015-20/scabby-wheat-grain-increasing-yourfan-speed-may-help, C.O.R.N Newsletter//2015-20, 3 pages.

Clay et al., “Scouting for Weeds”, SSMG-15, 4 pages, 2002.

Taylor et al., “Sensor-Based Variable Rate Application for Cotton”, 8 pages, 2010.

Christiansen et al., “Designing and Testing a UAV Mapping System for Agricultural Field Surveying”, Nov. 23, 2017, 19 pages.

Haung et al., “AccurateWeed Mapping and Prescription Map Generation Based on Fully Convolutional Networks Using UAV Imagery”, Oct. 1, 2018, 12 pages.

Ma et al., Identification of Fusarium Head Blight in Winter Wheat Ears Using Continuous Wavelet Analysis, Dec. 19, 2019, 15 pages.

Morrison, “Should You Use Tillage to Control Resistant Weeds”, Aug. 29, 2014, 9 pages.

Morrison, “Snow Trapping Snars Water”, Oct. 13, 2005, 3 pages.

“Soil Zone Index”, https://www.satimagingcorp.com/applications/natural-resources/agricultu . . . , Retrieved Dec. 11, 2020, 5 pages.

Malvic, “Soybean Cyst Nematode”, University of Minnesota Extension, Oct. 19, 2020, 3 pages.

(56) References Cited

OTHER PUBLICATIONS

Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages. cited by applicant
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (© 2001 American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery for Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (Spodoptera frugiperda) in maize at a regional scale", Apr. 10, 2015, 14 pages.
Booker, "Video: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University—Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, Video: Canadian cage mill teams up with JD (https://www.producer.com/2019/12/video-canadian-cage-mill-teams-up-with-jd/) , 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdG14&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component _Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Extended European Search Report and Written Opinion issued in European Patent Application No. 23156165.5, dated Dec. 4, 2023, in 08 pages.
Martin, et al., "Breakage Susceptibility and Hardness of Corn Kernels of Various Sizes and Shapes", May 1987, 10 Pages.
Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.

(56) References Cited

OTHER PUBLICATIONS

John Deere S-Series Combines S760, S770, S780, S790 Brochure, 44 pages, Nov. 15, 2017.
Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCI/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide To Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Deprediation by Wildlife, Jun. 2006, 14 pages.
Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does An Adaptive Gearbox Really Learn How You Drive? ", Oct. 30, 2019, 8 pages.
Eggerl, "Optimization of Combine Processes Using Expert Knowledge and Methods of Artificial Intelligence", Oct. 7, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1-pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture Yield Monitors" University of Missouri-System, 4 pages, 1998.
Apan et al., "Predicting Grain Protein Content in Wheat Using Hyperspectrai Sensing of In-season Crop Canopies and Partial Least Squares Regression" 18 pages, 2006.
Xu et al., "Prediction ofWheat Grain Protein by Coupling Multisource Remote Sensing imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer. Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
Martin et al. Breakage Susceptibiltiy and Hardness of Corn Kernels of Various Sizes and Shapes, vol. 3(): May 1087, 10 pages: https://pdfs.semanticscholar.org/e579/1b5363b6a78efd44adfb97755a0cdd14/7ca.pdf.
Hoff, "Combine Adjustments" (https://smallfarmersjournal.com/combine-adjustments/), Mar. 1943, 9 pages.
Optimizing Crop Profit Across Multiple Grain Attributes and Stover, Electronic Publication Date May 26, 2009, 17 pages.
Unglesbee: Soybean Pod Shatter—Bad Enough to Scout Before Harvest—DTN, Oct. 17, 2018, 11 pages. Susceptibility to shatter (https://agfax.com/2018/10/17/soybeani-pod-shatter-bad-enough-to-scout-before-harvest-dtn/).
GIS Maps for Agricultural, accessed on May 10, 2022. 7 pages. https://www.satimagingcorp.com/services/geographic-information-systems/gis-maps-agriculture-mapping.
https://wingtra.com/drone-mapping-applications/use-of-drones-in-agriculture, accessed on May 10, 2022, 19 pages.
Energy Requirement Model for a Combine Harvester: Part 1; Development of Comporient Models, Published online Dec. 22, 2004, 17 pages.
Energy Requirement Model for a Combine Harvester, Part 2: Integration of Component Models, Published online Jan. 18, 2005. 11 pages.
Pioneer on reducing soybean harvest losses including combine adjustments (last accessed Jul. 23, 2020) (https://www.pioneer.com/us/agronomy/reducing_harvest_losses_in_soybeans.html), 5 pages.
Leu et al., Grazing Corn Residue Using Resources and Reducing Costs, Aug. 2009, 4 pages.
"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High-Resolution Uavimages in Gronau, Germany", Feb. 2017, 63 pages.
Hunt, "Mapping Weed Infestations Using Remote Sensing", 8 pages, Jul. 19, 2005.
Wright, et al., "Managing Grain Protein in Wheat Using Remote Sensing", 12 pages, 2003.

(56) References Cited

OTHER PUBLICATIONS

"Malting Barley in Pennsylvania", Agronomy Facts 77, 6 pages, Code EE0179 Jun. 2016.
"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages,.
"Notice of Retraction Virtual simulation of plant with individual stem based on crop growth model", May 3, 2017, 7 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
"Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jarnevich et al., Forecasting Weed Distributions Using Climate Data: A Gis Early Warning Tool, Downloaded on Jul. 13, 2020, 12 pages.
Cutting and Feeding Mechanisms in the Southeast, By J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) By Steve Sick, FBN Breeding Project Lead Sep. 21, 2018, 8 pages.
Robertson et al., "Maize Stalk Lodging: Morphological Determinants of Stalk Strength" Mar. 2017, 10 pages.
Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells ,N., Reardon-Smith, K, Richardson, L, McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute, 11 pages.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings as filed Oct. 9, 2020, 63 pages.
U.S. Appl. No. 17/066,442 Application and Drawings as filed Oct. 8, 2020, 65 pages.
U.S. Appl. No. 16/380,550, filed Apr. 10, 2019, Application and Drawings, 47 pages.
U.S. Appl. No. 17/066,999 Application and Drawings as filed Oct. 9, 2020, 67 pages.
U.S. Appl. No. 17/066,444 Application and Drawings as filed Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Fuzzy Algorithm," 2010, Publisher: IEEE, 5 pages.
Dan et al., "On-the-go Throughput Prediction in a Combine Harvester Using Sensor Fusion," 2017, Publisher: IEEE, 6 pages.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
U.S. Appl. No. 16/432,557, filed Jun. 5, 2019, 61 pages.

(56) References Cited

OTHER PUBLICATIONS

European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6, 9 pages.
Yi et al., "An Efficient MAC Protocol With Adaptive Energy Harvesting for Machine-to-Machine Networks," 2015, vol. 3, Publisher: IEEE, 10 pages.
Application and Drawings for U.S. Appl. No. 16/171,978, filed Oct. 26, 2018, 53 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings as filed Apr. 10, 2019, 55 pages.
S. Veenadhari et al., "Machine Learning Approach For Forecasting Crop Yield Based on Climatic Parameters", 2014 International Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
U.S. Appl. No. 16/380,531 Application and Drawings as filed Apr. 10, 2019, 46 pages.
Extended European Search Report and Written Opinion issued in European Patent Application No. 20208171.7, dated May 11, 2021, in 05 pages.
Cordoba, M.A., Bruno, C.I. Costa, J.L. Peralta, N.R. and Balzarini, M.G., 2016, Protocol for multivariate homegeneous zone delineation in precision agriculture, biosystems engineering, 143, pp. 95-107.
Pioneer Estimator, "Corn Yield Estimator" accessed on Feb. 13, 2018, 1 page. Retrieved from: https://www.pioneer.com/home/site/us/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021. 4 pages.
Iowa State University Extension and Outreach, "Harvest Weed Seed Control", Dec. 13, 2018, 6 pages. https://crops.extension.iastate.edu/blog/bob-hanzler/harvest-weed-seed-control.
Getting Rid Of WeedsThrough Integrated Weed Management. accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybeansbean-handouts.pdf
Alternative Crop Guide, Published by the Jefferson Institute, "Buckwheat", Revised Jul. 2002, 4 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-Jie, X., Er-da, W. and Feng-yuan, X., Crop area yield risk evaluation and premium rates calculation—Based on nonparametric kernel density estimation. In 2009 International Conference on Management Science and Engineering, 7 pages.
Liu, R. and Bai, X., 2014, May. Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/171,978 dated Mar. 31, 2021, 6 pages.
Application and Drawings for U.S. Appl. No. 17/067,383, filed Oct. 9, 2020, 61 pages.

* cited by examiner

Figure 8A:
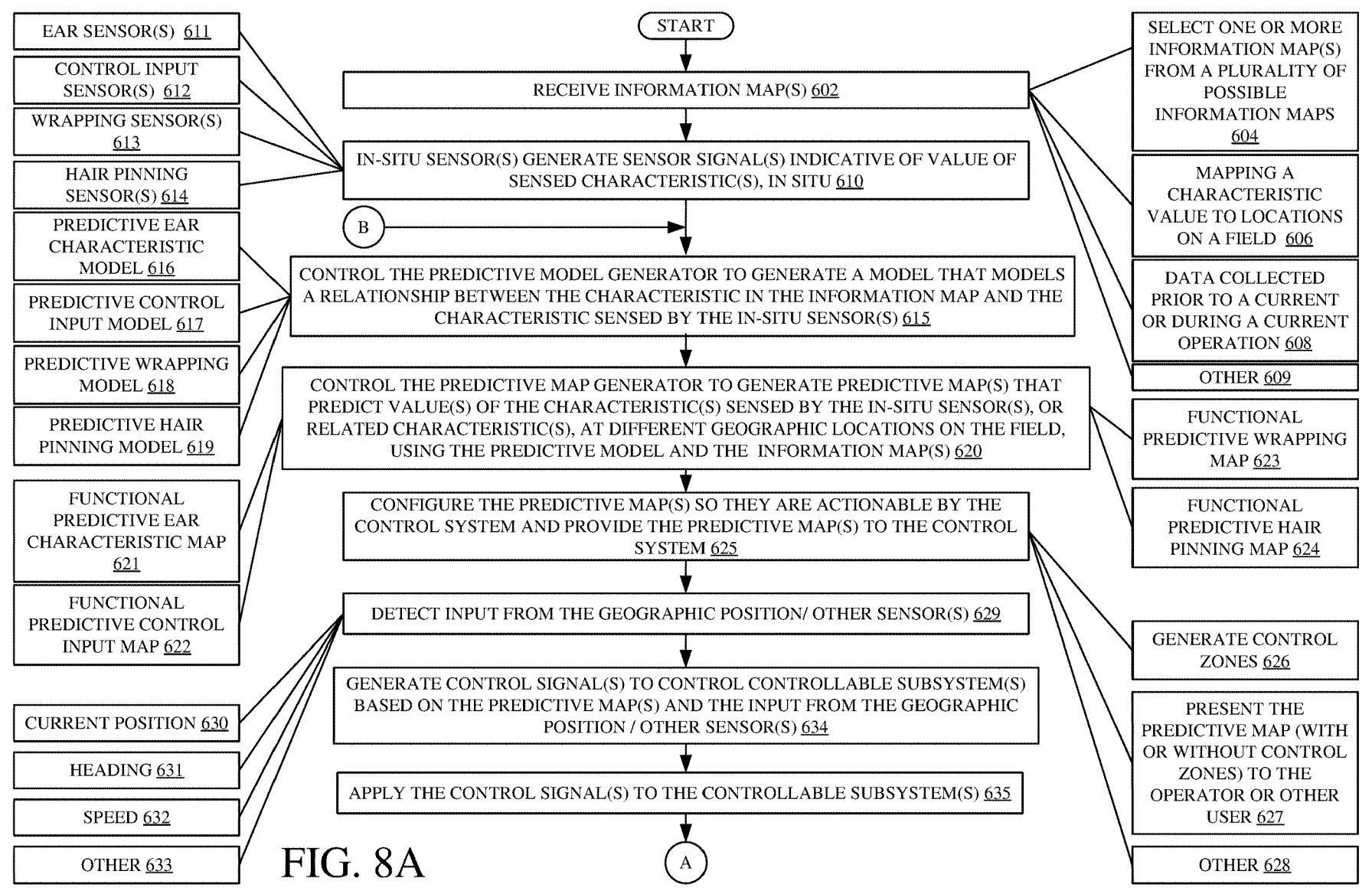

START

RECEIVE INFORMATION MAP(S) 602

SELECT ONE OR MORE INFORMATION MAP(S) FROM A PLURALITY OF POSSIBLE INFORMATION MAPS 604

MAPPING A CHARACTERISTIC VALUE TO LOCATIONS ON A FIELD 606

DATA COLLECTED PRIOR TO A CURRENT OR DURING A CURRENT OPERATION 608

OTHER 609

IN-SITU SENSOR(S) GENERATE SENSOR SIGNAL(S) INDICATIVE OF VALUE OF SENSED CHARACTERISTIC(S), IN SITU 610

EAR SENSOR(S) 611

CONTROL INPUT SENSOR(S) 612

WRAPPING SENSOR(S) 613

HAIR PINNING SENSOR(S) 614

B

CONTROL THE PREDICTIVE MODEL GENERATOR TO GENERATE A MODEL THAT MODELS A RELATIONSHIP BETWEEN THE CHARACTERISTIC IN THE INFORMATION MAP AND THE CHARACTERISTIC SENSED BY THE IN-SITU SENSOR(S) 615

PREDICTIVE EAR CHARACTERISTIC MODEL 616

PREDICTIVE CONTROL INPUT MODEL 617

PREDICTIVE WRAPPING MODEL 618

PREDICTIVE HAIR PINNING MODEL 619

CONTROL THE PREDICTIVE MAP GENERATOR TO GENERATE PREDICTIVE MAP(S) THAT PREDICT VALUE(S) OF THE CHARACTERISTIC(S) SENSED BY THE IN-SITU SENSOR(S), OR RELATED CHARACTERISTIC(S), AT DIFFERENT GEOGRAPHIC LOCATIONS ON THE FIELD, USING THE PREDICTIVE MODEL AND THE INFORMATION MAP(S) 620

FUNCTIONAL PREDICTIVE EAR CHARACTERISTIC MAP 621

FUNCTIONAL PREDICTIVE CONTROL INPUT MAP 622

FUNCTIONAL PREDICTIVE WRAPPING MAP 623

FUNCTIONAL PREDICTIVE HAIR PINNING MAP 624

CONFIGURE THE PREDICTIVE MAP(S) SO THEY ARE ACTIONABLE BY THE CONTROL SYSTEM AND PROVIDE THE PREDICTIVE MAP(S) TO THE CONTROL SYSTEM 625

GENERATE CONTROL ZONES 626

PRESENT THE PREDICTIVE MAP (WITH OR WITHOUT CONTROL ZONES) TO THE OPERATOR OR OTHER USER 627

OTHER 628

DETECT INPUT FROM THE GEOGRAPHIC POSITION/ OTHER SENSOR(S) 629

CURRENT POSITION 630

HEADING 631

SPEED 632

OTHER 633

GENERATE CONTROL SIGNAL(S) TO CONTROL CONTROLLABLE SUBSYSTEM(S) BASED ON THE PREDICTIVE MAP(S) AND THE INPUT FROM THE GEOGRAPHIC POSITION / OTHER SENSOR(S) 634

APPLY THE CONTROL SIGNAL(S) TO THE CONTROLLABLE SUBSYSTEM(S) 635

SYSTEMS AND METHODS FOR PREDICTIVE END DIVIDER CONTROL

FIELD OF THE DESCRIPTION

The present description relates agricultural harvesters. More particularly, the present description relates to predictively controlling end dividers on a head of an agricultural harvester.

BACKGROUND

There are several different types of agricultural harvesters. One type of agricultural harvester is a combine harvester which can have different heads attached to harvest different types of crops.

In one example, a corn head can be attached to a combine harvester in order to harvest corn. A corn head may have row dividers and gathering chains. The row dividers help to divide the rows of corn and the gathering chains pull the corn stalks into a set of snap rolls that separate the ears of the corn plant from the stalks. The ears are then moved by an auger toward the center of the corn head where the ears enter the feeder house of the combine harvester. The ears are then further processed within the combine harvester to remove the kernels of corn from the cobs.

The discussion above is merely provided for general background information and is not intended to be used as an aid in determining the scope of the claimed subject matter.

SUMMARY

A map is obtained by an agricultural system. The map maps values of a characteristic to different geographic locations in a field. A control system generates a control signal to control operation of one or more end dividers on an agricultural harvester based on the map.

Example 1 is an agricultural system comprising:

a control system that:

receives, from a geographic position sensor, a geographic position of an agricultural harvester in a field;

receives a map that maps values of a characteristic corresponding to different geographic locations in the field; and generates a control signal to control an end divider actuator on the agricultural harvester based on the map and the geographic position of the agricultural harvester.

Example 2 is the agricultural system of any or all previous examples, wherein the map comprises one or more maps, each map, of the one or more maps, mapping values of a respective characteristic corresponding to the different geographic locations in the field, wherein the one or more maps comprise one or more of:

a harvest coverage map that maps, as values of the respective characteristic, harvest coverage values to the different geographic locations in the field;

a genotype map that maps, as values of the respective characteristic, genotype values to the different geographic locations in the field;

a crop state map that maps, as values of the respective characteristic, crop state values to the different geographic locations in the field; and a weed map that maps, as values of the respective characteristic, weed values to the different geographic locations in the field.

Example 3 is the agricultural system of any or all previous examples, wherein the map comprises a functional predictive ear characteristic map that maps, as the values of the characteristic, predictive values of an ear characteristic, the agricultural system further comprising:

an in-situ sensor that detects a value of the ear characteristic corresponding to a geographic location in the field;

a predictive model generator that:

receives an information map that maps values of a characteristic to the different geographic locations in the field; and generates a predictive ear characteristic model that models a relationship between the characteristic mapped in the information map and the ear characteristic based on the value of the ear characteristic detected by the in-situ sensor corresponding to the geographic location and a value of the characteristic in the information map at the geographic location; and a predictive map generator that generates the functional predictive ear characteristic map that maps the predictive ear characteristic values to the different geographic locations in the field based on the values of the characteristic in the information map and based on the predictive ear characteristic model.

Example 4 is the agricultural system of any or all previous examples, wherein the map comprises a functional predictive control input map that maps, as the values of the characteristic, predictive control input values, the agricultural system further comprising:

an in-situ sensor that detects a control input value corresponding to a geographic location in the field;

a predictive model generator that:

receives an information map that maps values of a characteristic to the different geographic locations in the field; and generates a predictive control input model that models a relationship between the characteristic mapped in the information map and control input based on the value of the control input detected by the in-situ sensor corresponding to the geographic location and a value of the characteristic in the information map at the geographic location; and a predictive map generator that generates the functional predictive control input map that maps the predictive control input values to the different geographic locations in the field based on the values of the characteristic in the information map and based on the predictive control input model.

Example 5 is the agricultural system of any or all previous examples, wherein the map comprises a functional predictive hair pinning map that maps, as the values of the characteristic, predictive hair pinning values, the agricultural system further comprising:

an in-situ sensor that detects a hair pinning value corresponding to a geographic location in the field;

a predictive model generator that:

receives an information map that maps values of a characteristic to the different geographic locations in the field; and generates a predictive hair pinning model that models a relationship between the characteristic mapped in the information map and hair pinning based on the hair pinning value detected by the in-situ sensor corresponding to the geographic location and a value of the characteristic in the information map at the geographic location; and a predictive map generator that generates the functional predictive hair pinning map that maps the predictive hair pinning values to the different geographic locations in the field based on the values of the characteristic in the information map and based on the predictive hair pinning model.

Example 6 is the agricultural system of any or all previous examples, wherein the map comprises a functional predictive wrapping map that maps, as the values of the characteristic, predictive wrapping values, the agricultural system further comprising:

an in-situ sensor that detects a wrapping value corresponding to a geographic location in the field;

a predictive model generator that:

receives an information map that maps values of a characteristic to the different geographic locations in the field; and generates a predictive wrapping model that models a relationship between the characteristic mapped in the information map and wrapping based on the wrapping value detected by the in-situ sensor corresponding to the geographic location and a value of the characteristic in the information map at the geographic location; and a predictive map generator that generates the functional predictive wrapping map that maps the predictive wrapping values to the different geographic locations in the field based on the values of the characteristic in the information map and based on the predictive wrapping model.

Example 7 is the agricultural system of any or all previous examples, wherein the control system generates the control signal to control the end divider actuator raise an end divider on the agricultural harvester.

Example 8 is the agricultural system of any or all previous examples, wherein the control system generates the control signal to control the end divider actuator to lower an end divider on the agricultural harvester.

Example 9 is the agricultural system of any or all previous examples, wherein the control system generates the control signal to control the end divider actuator to adjust rotation of an end divider on the agricultural harvester.

Example 10 is a method of controlling an agricultural harvester comprising:

receiving a map that maps values of a characteristic to different geographic locations in a field;

identifying a geographic position of the agricultural harvester at the field; and controlling an end divider actuator on the agricultural harvester based on the map and the geographic position of the agricultural harvester.

Example 11 is the method of any or all previous examples, wherein receiving the map comprises receiving one or more maps, each map, of the one or more maps, mapping values of a respective characteristic corresponding to the different geographic locations in the field, wherein the one or more maps comprise one or more of:

a harvest coverage map that maps, as values of the respective characteristic, harvest coverage values to the different geographic locations in the field;

a genotype map that maps, as values of the respective characteristic, genotype values to the different geographic locations in the field;

a crop state map that maps, as values of the respective characteristic, crop state values to the different geographic locations in the field; and a weed map that maps, as values of the respective characteristic, weed values to the different geographic locations in the field.

Example 12 is the method of any or all previous examples, wherein receiving the map comprises receiving a functional predictive map that maps, as the values of the characteristic, predictive values of the characteristic to the different geographic locations in the field, wherein the method further comprises:

receiving an information map that maps values of an additional characteristic corresponding to the different geographic locations in the field;

detecting, with an in-situ sensor, a value of the characteristic corresponding to a geographic location;

generating a predictive model that models a relationship between the additional characteristic and the characteristic; and controlling a predictive map generator to generate the functional predictive map that maps the predictive values of characteristic to the different locations in the field based on the values of the additional characteristic in the information map and the predictive model.

Example 13 is the method of any or all previous examples, wherein controlling the end divider actuator comprises controlling the end divider actuator to adjust a position of an end divider on the agricultural machine.

Example 14 is the method of any or all previous examples, wherein controlling the end divider actuator comprises controlling the end divider actuator adjust rotation of an end divider on the agricultural machine.

Example 15 is the method of any or all previous examples, wherein controlling the end divider actuator comprises controlling:

a first end divider actuator to control a first end divider on the agricultural harvester; and a second end divider actuator to control a second end divider on the agricultural harvester.

Example 16 is the method of any or all previous examples and further comprising controlling an interface mechanism to display the map.

Example 17 is an agricultural harvester comprising:

a geographic position sensor that detect a geographic position of the agricultural harvester in a field;

a control system that:

receives a map that maps values of a characteristic to different geographic locations in the field; and generates a control signal to control an end divider subsystem of the agricultural harvester based on the map and the geographic location of the agricultural harvester.

Example 18 is the agricultural harvester of any or all previous examples, wherein the map comprises one of:

a harvest coverage map that maps, as values of the characteristic, harvest coverage values to the different geographic locations in the field;

a genotype map that maps, as values of the characteristic, genotype values to the different geographic locations in the field;

a crop state map that maps, as values of the characteristic, crop state values to the different geographic locations in the field; and a weed map that maps, as values of the characteristic, weed values to the different geographic locations in the field.

Example 19 is the agricultural harvester of any or all previous examples, wherein the map comprises a functional predictive map that maps, as the values of the characteristic, predictive values of the characteristic to the different geographic location;

wherein the functional predictive map is generated based on a predictive model that models a relationship between the characteristic and an additional characteristic; and wherein the predictive model models the relationship based on an in-situ value of the characteristic, detected by an in-situ sensor, corresponding to a geographic location and a value of the additional characteristic at the geographic location in an information map.

Example 20 is the agricultural harvester of any or all previous examples, wherein the control system generates the control signal to control an end divider actuator of the end divider subsystem to drive movement of an end divider of the agricultural harvester.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 8A-8B (collectively referred to herein as FIG. 8) show a flow diagram illustrating one example of operation of an agricultural system in generating a map.

DETAILED DESCRIPTION

Figure 1:
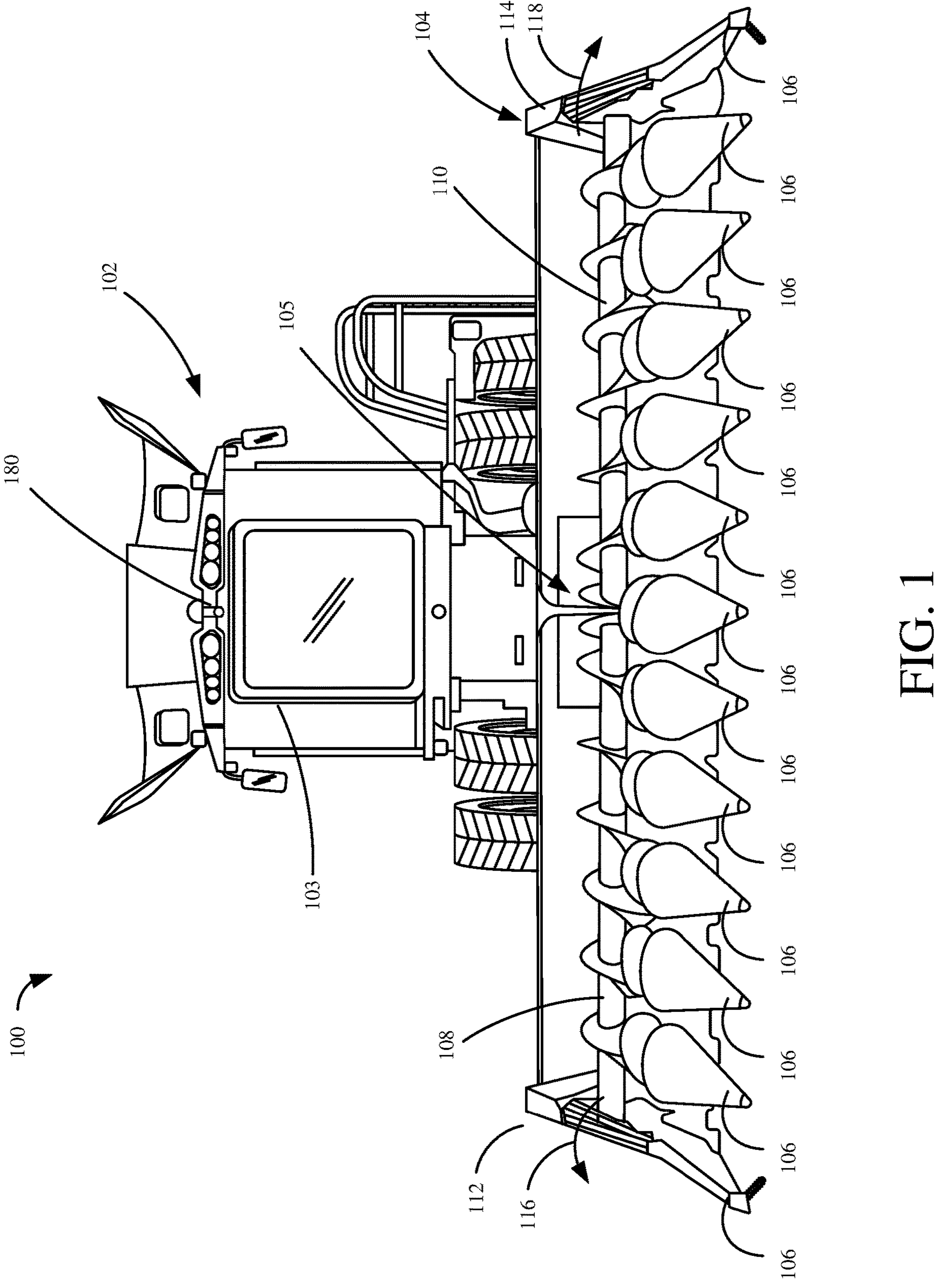
FIG. 1 is a pictorial illustration of an example agricultural harvester with a rigid head attached.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In one example, the present description relates to using in-situ data taken concurrently with an operation, in combination with prior or predicted data, such as prior or predicted data represented in a map, to generate a predictive model and a predictive map, such as a predictive ear characteristic model and predictive ear characteristic map. In some examples, the predictive ear characteristic map can be used to control a mobile machine.

As discussed above, agricultural harvesting machines, such as combine harvesters, can be attached to different types of heads for harvesting different types of crops. One such head is a corn head which can be attached to the combine harvester in order to harvest corn. A corn head may have row dividers and gathering chains. The row dividers help to divide the rows of corn and the gathering chains pull the corn stalks into a set of snap rolls that separate the ears of the corn plant from the stalks. The ears are then moved by an auger toward the center of the corn head where the ears enter the feeder house of the combine harvester. The ears are then further processed within the combine harvester to remove the kernels of corn from the cobs.

During the harvesting operation, after the ears of corn are separated from the stalk, the ears can bounce around on the head and can bounce off of the head onto the field and be lost. In order to address this type of loss, the corn head can be equipped with end dividers disposed on the ends of the corn head. The end dividers can be controllably positioned (e.g., raised, lowered, etc.) to inhibit ear loss over the sides of the corn head. In some examples, the end dividers can be controllably rotated (e.g., at variable speeds and/or variable directions of rotation).

In one example, the present description relates to obtaining a map such as a genotype map. The genotype map includes geolocated values of crop genotype across different locations at a field of interest. The crop genotype values may indicate genotype information for the crop at the field, for instance, in a corn field, there may be several different types (e.g., hybrids, cultivar, etc.) of corn plants. The genotype map may be derived from operator or user inputs that indicate the crop genotype information at different areas of the field. The genotype map may be derived from information, including sensor readings, from a planting operation occurring on the field earlier in the year. For instance, the planting machine (e.g., planter, seeder, etc.) may have data, including sensor data, that indicates the genotype of seed planted and the locations at which the seeds were planted. These are merely some examples. The genotype map can be generated in a variety of other ways.

In one example, the present description relates to obtaining a map such as a crop state map. The crop state map includes geolocated crop state values across different geographic locations at a field of interest. Without limitation, the crop state values may indicate a degree (magnitude) of downing (e.g., not down, partially down, fully down), as well as the direction (e.g., compass direction) in which the crops are downed. The crop state map may be derived from sensor readings taken during a prior operation, performed by a machine, at the field of interest (e.g., a prior spraying operation) or taken during an aerial survey of the field of interest (e.g., drone survey, plane survey, satellite survey, etc.). These machines may be outfitted with one or more different types of sensors, such as imaging systems (e.g., cameras), optical sensors, ultrasonic sensors, as well as sensors that detect one or more bands of electromagnetic radiation reflected by the plants on the field of interest. These are merely some examples. The crop state map can be generated in a variety of other ways.

In one example, the present description relates to obtaining a map such as a weed map. The weed map includes geolocated weed values across different geographic locations at a field of interest. The weed values may indicate one or more of weed intensity and weed type. Without limitation, weed intensity may include at least one of weed presence, weed population, weed growth stage, weed biomass, weed moisture, weed density, a height of weeds, a size of weed plants, an age of weeds, and health condition of weeds at locations in the field of interest. Without limitation, weed type may include weed genotype information (e.g., weed species) or more broad categorization of type, such as vine type weed and non-vine type weed. The weed map may derived from sensor readings taken during a prior operation, performed by a machine, at the field of interest (e.g., a prior spraying operation) or taken during an aerial survey of the field of interest (e.g., drone survey, plane survey, satellite survey, etc.). These machines may be outfitted with one or more different types of sensors, such as imaging systems (e.g., cameras), optical sensors, ultrasonic sensors, as well as sensors that detect one or more bands of electromagnetic radiation reflected by the plants on the field of interest. Alternatively, or additionally, the weed map may be derived from vegetative index values at the field of interest (such as vegetative index values in a vegetative index map). One example of a vegetative index is a normalize difference vegetation index (NDVI). There are many other vegetative indices that are within the scope of the present disclosure, including, but not limited to, a leaf area index (LAI). These are merely some examples. The weed map can be generated in a variety of other ways.

In one example, the present description relates to obtaining a map such as a harvest coverage map. The harvest coverage map includes geolocated harvest coverage values across different locations at a field of interest. The harvest coverage values indicate locations (or areas) of the field which have been harvested and locations (or areas) of the field which have not been harvested. The harvest coverage map may derived from sensor readings from sensors on the harvester taken during a harvesting operation, such as geographic position sensor readings, heading sensor readings, as well as sensor readings from sensors that sense operation of components of the harvester (such as the threshing rotor, cleaning system, clean grain elevator, the head auger, etc.) to determine locations (or areas) of the field which have been harvested. In other examples, the harvest coverage map may be derived from operator or user inputs that indicate locations (or areas) of the field that have been harvested. In other examples, the harvest coverage map may be derived from sensor readings of adjacent crop rows as the agricultural harvester 100 operates at the field, for instance images of adjacent crop rows may be captured to identify whether the crop in the adjacent rows are harvested or unharvested. These are merely some examples. The harvest coverage map can be generated in a variety of other ways.

In one example, the present description relates to obtaining in-situ data from in-situ sensors on the mobile agricultural machine taken concurrently with an operation. The in-situ sensor data can include ear characteristic data generated by ear characteristic sensors. The ear characteristic data and corresponding ear characteristic sensors can include one or more of: in-situ ear loss data generated by in-situ ear loss sensors; in-situ ear orientation data generated by in-situ ear orientation sensors; and other in-situ ear characteristic data generated by other in-situ ear characteristic sensors. In other examples, the in-situ sensor data can include in-situ wrapping data generated by in-situ wrapping sensors. In other examples, the in-situ sensor data can include in-situ hair pinning data generated by in-situ hair pinning sensors. In other example, the in-situ sensor data can include in-situ control input data generated by in-situ control input sensors. The various in-situ data is derived from various in-situ sensors on the mobile machine, as will be described in further detail herein. These are merely some examples of the in-situ data and in-situ sensors contemplated herein.

The present discussion proceeds, in some examples, with respect to systems that obtain one or more maps of a field, such as one or more of a genotype map, a crop state map, a weed map, a harvest coverage map, as well as various other types of maps and also use an in-situ sensor to detect a variable indicative of an agricultural characteristic value, such as an ear characteristic value (e.g., ear loss value, ear orientation value, etc.). The systems generate a model that models a relationship between the values on the obtained map(s) and the output values from the in-situ sensor. The model is used to generate a predictive map that predicts agricultural characteristic values, such as ear characteristic values, for example, one or more of ear loss values and ear orientation values. The predictive map, generated during an operation, can be presented to an operator or other user or used in automatically controlling a mobile agricultural machine during an operation or both. In some examples, the predictive map can be used to control one or more of a position of end dividers, a speed of rotation of end divers, a direction of rotation of end dividers, as well as various other parameters.

In some examples, the present discussion proceeds with respect to systems that obtain one or more maps of a field such as one or more of a genotype map, a crop state map, a weed map, a harvest coverage map, as well as various other types of maps and also use an in-situ sensor to detect a variable indicative of an agricultural characteristic value, such as wrapping value or a hair pinning value. The systems generate a model that models a relationship between the values on the obtained map(s) and the output values from the in-situ sensor(s). The model is used to generate a predictive map that predicts agricultural characteristic values, such as wrapping values or hair pinning values. The predictive map, generated during an operation, can be presented to an operator or other user or used in automatically controlling a mobile agricultural machine during an operation or both. In some examples, the predictive map can be used to control one or more of a position of end dividers, a speed of rotation of end divers, a direction of rotation of end dividers, as well as various other parameters.

In some examples, the present discussion proceeds with respect to systems that obtain one or more maps of a field such as one or more of a genotype map, a crop state map, a weed map, a harvest coverage map, as well as various other types of maps and also use an in-situ sensor to detect a variable indicative of an agricultural characteristic value, such as a control input value. The systems generate a model that models a relationship between the values on the obtained map(s) and the output values from the in-situ sensor(s). The model is used to generate a predictive map that predicts agricultural characteristic values, such as control input values. The predictive map, generated during an operation, can be presented to an operator or other user or used in automatically controlling a mobile agricultural machine during an operation or both. In some examples, the predictive map can be used to control one or more of a position of end dividers, a speed of rotation of end dividers, a direction of rotation of end dividers, as well as various other parameters.

The present discussion proceeds, in some examples, with respect to systems that obtain one or more maps of a field such as one or more of a genotype map, a crop state map, a weed map, a harvest coverage map, as well as various other types of maps and also use in-situ sensor data indicative of a geographic position of the agricultural harvester on the field. Based on the position of the agricultural harvester and the values on the one or more obtained maps, one or more parameters of the agricultural harvester can be controlled, such as one or more of a position of end dividers, a speed of rotation of end dividers, a direction of rotation of end dividers, as well as various other parameters.

While the various examples described herein proceed with respect to agricultural harvesters, particularly agricultural harvesters with a corn head, it will be appreciated that the systems and methods described herein are applicable to various other types of agricultural harvesters including, but not limited to, agricultural harvesters with other types of heads.

FIG. 1 s a pictorial illustration of one example of an agricultural harvester 100. Agricultural harvester 100 includes combine harvester 102 and head 104. Combine harvester 102 includes an operator's compartment 103 that has operator interface mechanisms that can be used by an operator to control combine harvester 102 and head 104. Some examples of operator interface mechanisms are described below (e.g., 218 in FIG. 4).

As shown, head 104 is a rigid head, meaning that head 104 is not foldable. Head 104 has a plurality of row dividers 106 and augers 108 and 110. Row dividers 106 separate the corn rows as agricultural harvester 100 moves through a field. The stalks are guided between row dividers 106 where gathering chains move the stalks into a set of snap rolls that remove the ears from the stalks. The ears are then moved toward a central portion 105 of head 104 by augers 108 and 110, where the ears enter a feeder house, which feeds the ears into the combine harvester 102 for further processing.

As discussed above, after the ears are separated from the stalks, the ears can bounce around on head 104 and bounce over the end 112 of head 104 in the direction indicated by arrow 116. The ears can also bounce over end 114 of head 104 in the direction indicated by arrow 118. If the ears bounce over either end 112 or end 114, the ears fall to the ground and are lost.

As illustrated in FIG. 1, agricultural harvester 100 can include an observation sensor system 180. Observation sensor system 180 illustratively detects one or more characteristics at the field. For example, observation sensor system 180 may detect one or more of one or more ear characteristics, such as ear loss and/or ear orientation, wrapping, hair pinning, as well as various other characteristics. In some examples, observation sensor system 180 includes one or more sensors, such as one or more different types of sensors or one or more different types of sensors, or both. For example, observation sensor system 180 may include one or more of one or more imaging systems (e.g., cameras, such as stereo cameras), one or more optical sensors (e.g., lidar, radar, etc.), one or more ultrasonic sensors, as well as various other sensors. Observation sensor system 180 may have a field of view that includes an area of the field around (e.g., ahead of, to the sides of, and/or behind) head 104 or that includes head 104, or both. While observation sensor system 180 is shown at a particular location in FIG. 1, it will be appreciated that observation sensor system 180 can be at various other locations, including on combine 102 or head 104. In other examples, agricultural harvester 100 can include more than one observation sensor system 180, with each disposed at a different location.

Figure 2:
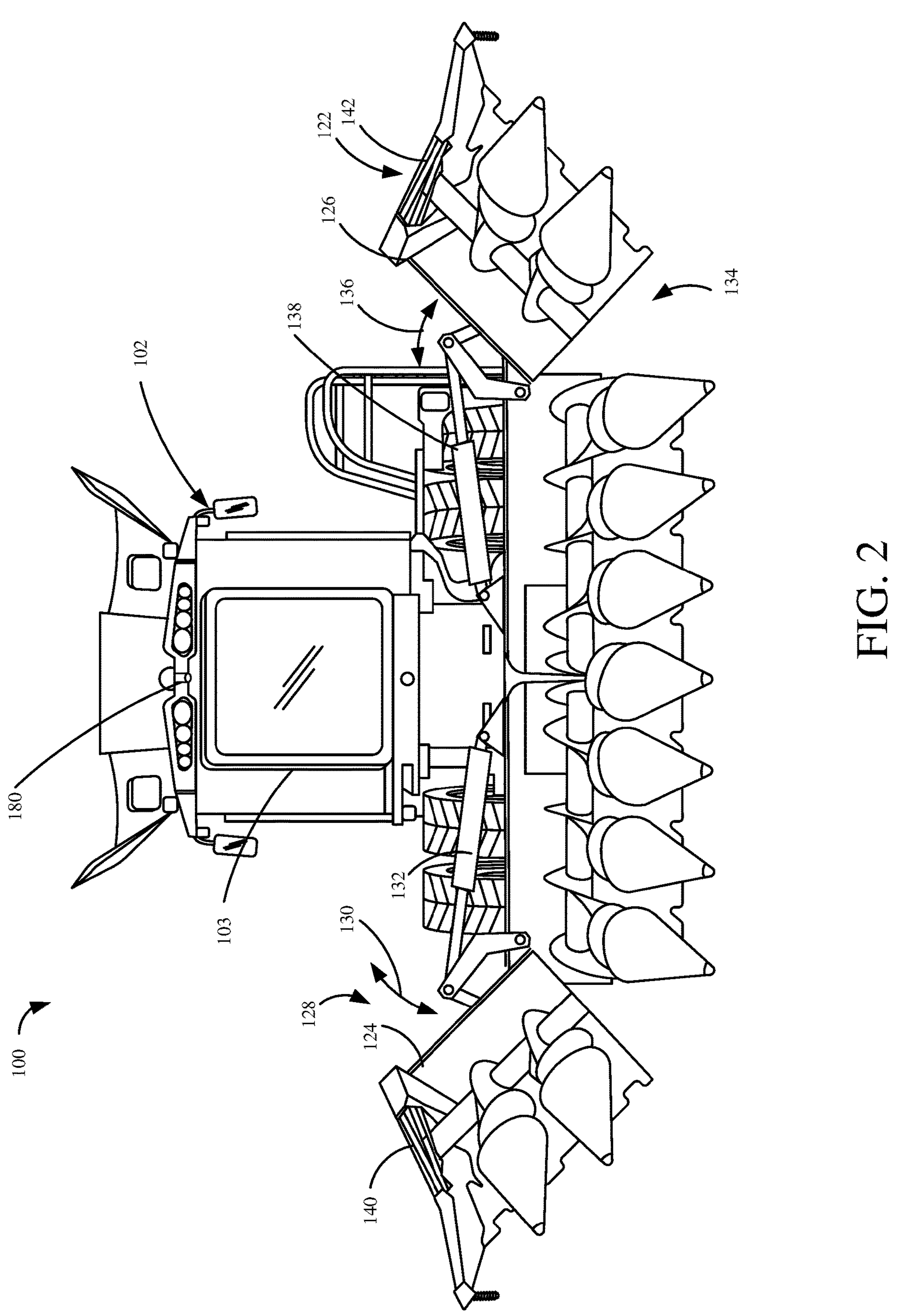
FIG. 2 is a pictorial illustration of an example agricultural harvester with a foldable head attached.

FIG. 2 is a pictorial illustration of another example of an agricultural harvester 100. In the example of FIG. 2, agricultural harvester 100 includes combine harvester 102 attached to a head 122. In the example shown in FIG. 2, head 122 is a foldable corn head. Therefore, the head includes opposite end sections 124 and 126 which can be moved between a deployed position and a folded position. In one example, end portion 124 is foldable about a pivot 128. End portion 124 folds about pivot 128 in the direction indicated by arrow 130. The movement of end portion 124 is driven by an actuator 132 which, in the example shown in FIG. 2, is illustrated as a hydraulic actuator. End portion 126 can be moved between a deployed position and a folded position. Similarly, end portion 126 can rotate about pivot 134 generally in the direction indicated by arrow 136. The movement of end portion 126 can be driven by actuator 138. In the example shown in FIG. 2, actuator 138 is a hydraulic actuator.

Head 122 has opposite ends 140 and 142. Once ears of corn are separated from the stalks by the head 122 shown in FIG. 2, the ears can bounce around on head 122 and bounce over the ends 140 or 142 and thus be lost.

As illustrated in FIG. 2, agricultural harvester 100 can include an observation sensor system 180. Observation sensor system 180 illustratively detects one or more characteristics at the field. For example, observation sensor system 180 may detect one or more of one or more ear characteristics, such as ear loss and/or ear orientation, wrapping, hair pinning, as well as various other characteristics. In some examples, observation sensor system 180 includes one or more sensors, such as one or more different types of sensors or one or more different types of sensors, or both. For example, observation sensor system 180 may include one or more of one or more imaging systems (e.g., cameras, such as stereo cameras), one or more optical sensors (e.g., lidar, radar, etc.), one or more ultrasonic sensors, as well as various other sensors. Observation sensor system 180 may have a field of view that includes an area of the field ahead of head 122 or that includes head 122, or both. While observation sensor system 180 is shown at a particular location in FIG. 2, it will be appreciated that observation sensor system 180 can be at various other locations, including on combine 102 or head 122. In other examples, agricultural harvester 100 can include more than one observation sensor system 180, with each disposed at a different location.

Figure 3A:
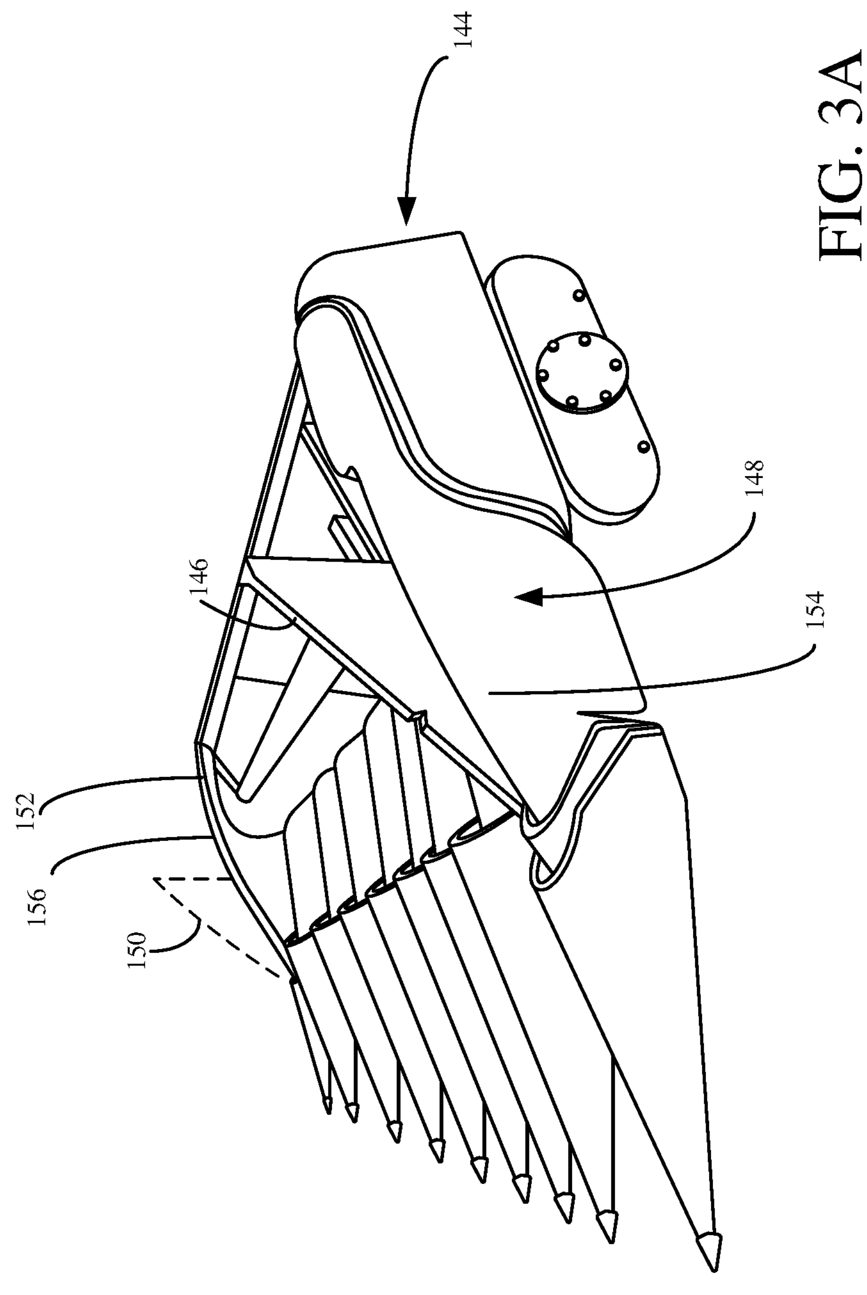
FIG. 3A is a perspective view of an example head that can be used with an agricultural harvester.

FIG. 3A shows another view of a head 144. Head 144 can be a part of agricultural harvester 100. In one example, head 144 can be a rigid head, and can thus be similar to head 104. In another example, head 144 can be a foldable head, and can thus be similar to head 122. In order to address the problem of ears of corn being lost over the ends of the head of agricultural harvester 100, head 144 is fitted with a first end divider 146 disposed at a first end 148 of head 144. Head also has a second end divider 150 (shown in phantom in FIG.

3A) disposed at a second end 152 of head 144. End dividers 146 and 150 are movable between a retracted position, and a raised position. In the example shown in FIG. 3A, end divider 146 is shown in the raised position and end divider 150 is shown in phantom in the raised position. When end divider 146 is in the retracted position, end divider 146 is retracted within a housing 154. When end divider 150 is in the retraced position, end divider 150 is retracted within a housing 156.

The end dividers 146 and 150 are automatically or semi-automatically (such as by operator input into an operator input mechanism) movable between the fully retracted position and the fully raised position. In some examples, positions of the end dividers 146 and 150 are selectable to any of a plurality of different positions between the fully retracted position and the fully raised position. Also, in some examples, the end dividers 146 and 150 are movable to a position based upon an operator input, such as an operator input made from within the operator compartment 103 of the combine harvester 102. Also, in some examples, the position of the end dividers 146 and 150 is automatically controlled based upon maps (and values therein), sensor inputs, operator inputs, or other inputs.

Figure 4:
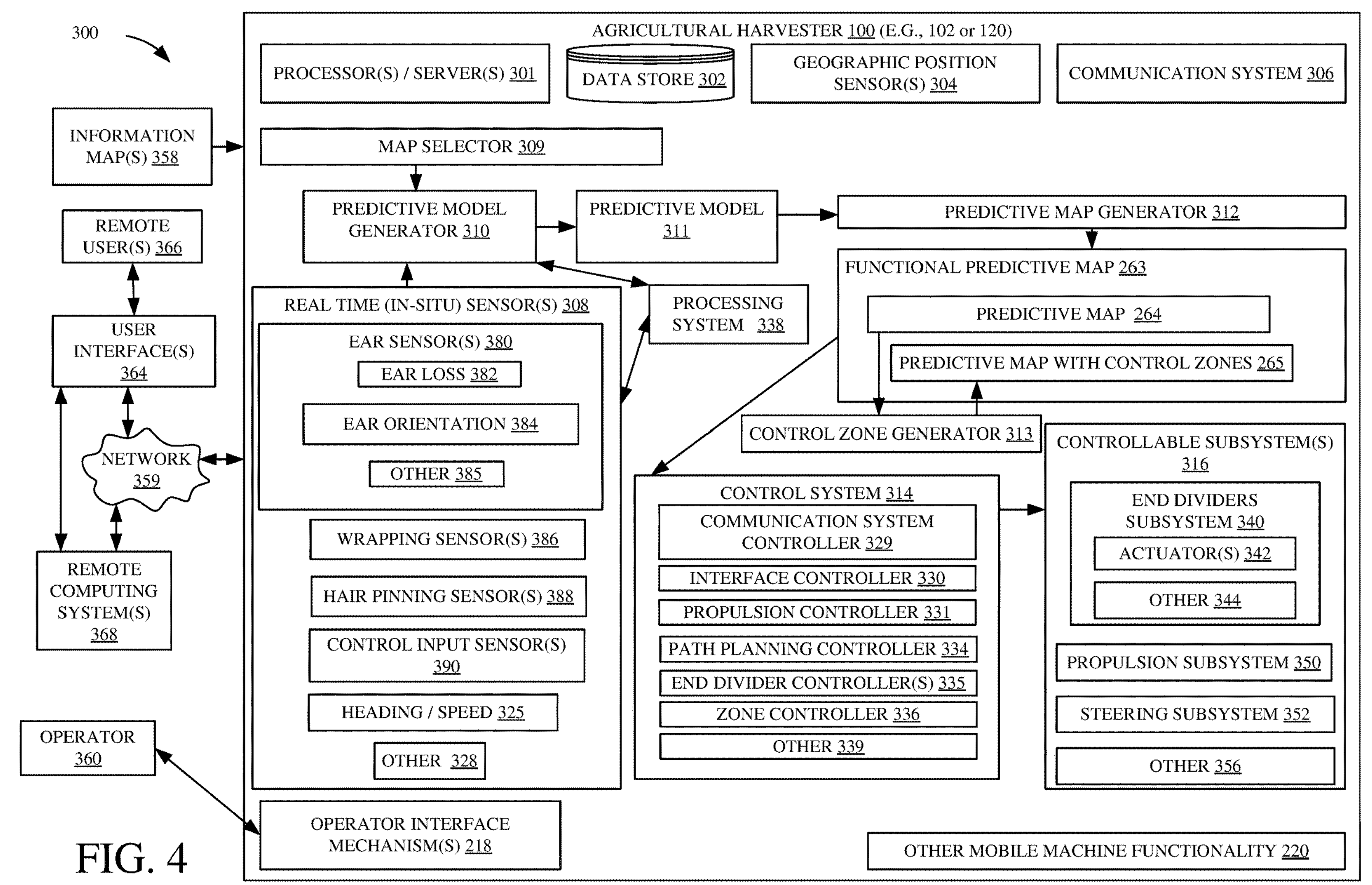
FIG. 4 is a block diagram shown some portions of an agricultural system, including an agricultural harvester, in more detail, according to some examples of the present disclosure.

End divider 146 is moveable between the retracted position and the raised position by an actuator (e.g., 342 shown in FIG. 4). End divider 150 is moveable between the retracted position and the raised position by an actuator (e.g., 342 shown in FIG. 4). Example actuators within the scope of the present description include a linear actuator, a rotary actuator, a hydraulic actuator, an electric actuator, or a pneumatic actuator. In other implementations, the actuators may other types of actuators.

An end divider controller (e.g., 335 shown in FIG. 4) generates control signals to control actuator(s) based upon inputs from one or more input mechanisms. In some examples, each end divider 146, 150 may have a respective end divider controller. An operator may provide an input through operator interface mechanism(s) to command end divider 146, or end divider 150, or both end dividers 146 and 150, to move to a desired position. The operator input mechanisms may detect the command from the operator and provide an indication of the command to the end divider controller(s). The end divider controller(s) generate control signals to control actuator(s) to control the position of end divider 146 or end divider 150, or both, in response to the provided command indication. In some instances, end divider 146 and end divider 150 are independently controllable relative to one another. Therefore, in some implementations, the position of end divider 146 is independently controllable relative to the position of end divider 150.

Also, in some examples, the end divider controller(s) can automatically generate control signals to control actuator(s) to control the position of end divider 146 or end divider 150, or both, based on maps, as will be discussed in more detail below.

Figure 3B:
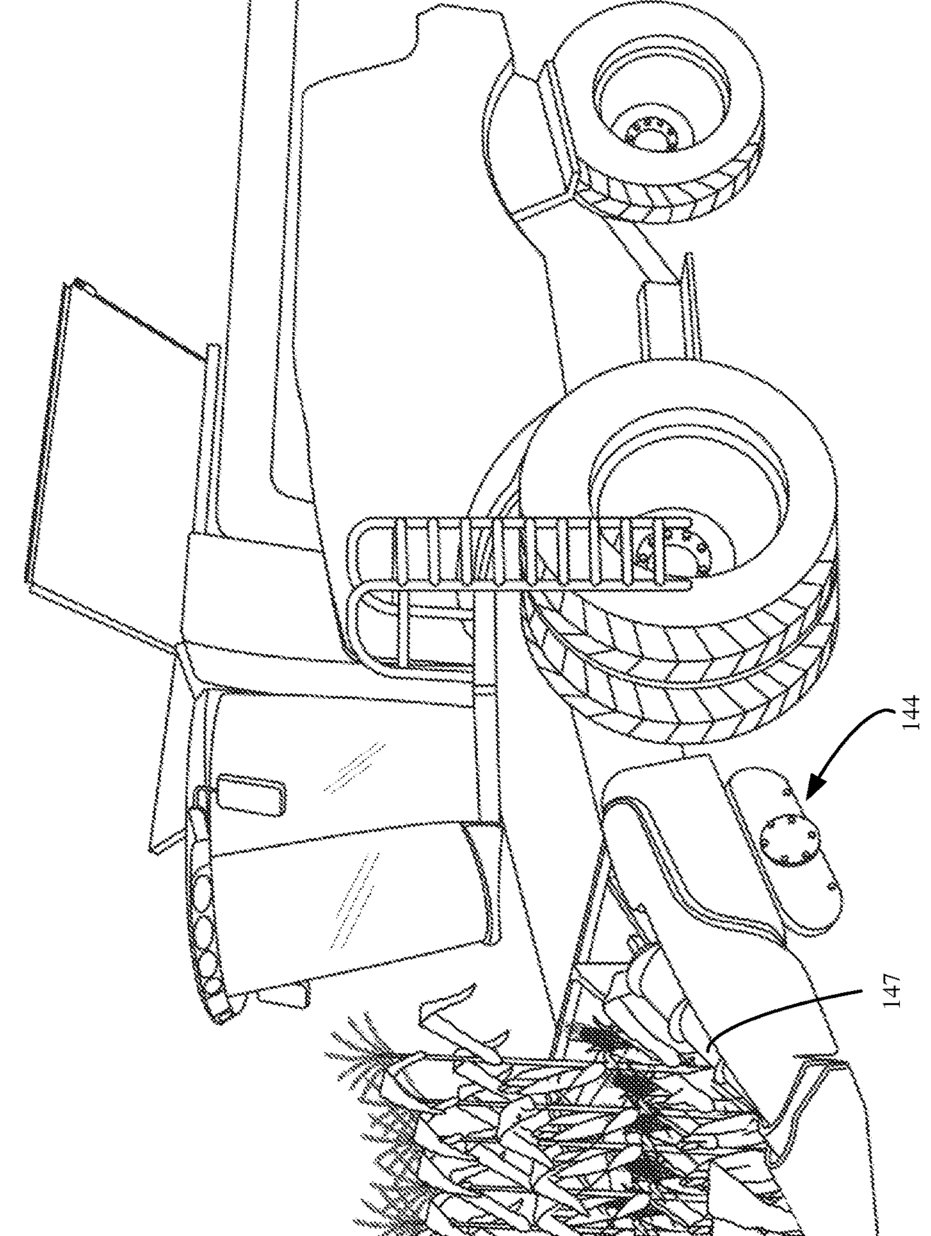
FIG. 3B is a perspective view of an example agricultural harvester.

FIG. 3B shows a view of another example head 144. In the example of FIG. 3B, head 144 includes an active end divider 147 instead of end divider 146. This type of end divider 147 is rotationally driven by an actuator that is controlled by an end divider controller. The actuators may include motors, such as hydraulic motors or electric motors. Other types of actuators are also within the scope of the present description. The rotational speed and rotational direction of end divider 147 can be controlled via the end divider controller. While only one end divider 147 is shown, there may be one or more active end dividers on both sides of head 144, such as another active end divider 147 on the opposite side of head 144 in place of end divider 150.

An end divider controller (e.g., 335 shown in FIG. 4) generates control signals to control actuator(s) based upon inputs from one or more input mechanisms. In some examples, each end divider 147 may have a respective end divider controller. An operator may provide an input through operator interface mechanism(s) to command the rotational speed or rotational direction, or both, of one or more end dividers 147. The operator input mechanisms may detect the command from the operator and provide an indication of the command to the end divider controller(s). The end divider controller(s) generate control signals to control actuator(s) to control the rotational speed or the rotational direction, or both, of one or more end dividers 147 in response to the provided command indication. In some instances, each end divider 147 is independently controllable relative to one another. Therefore, in some implementations, the position of end divider 146 is independently controllable relative to the position of end divider 150.

Also, in some examples, the end divider controller(s) can automatically generate control signals to control actuator(s) to control the rotational speed or rotational direction, or both, of one or more end dividers 147 based on maps, as will be discussed in more detail below.

FIG. 4 is a block diagram showing some portions of an agricultural harvesting system architecture 300. FIG. 4 shows that agricultural harvesting system architecture 300 includes agricultural harvester 100, one or more remote computing systems 368, an operator 360, one or more remote users 366, one or more remote user interfaces 364, network 359, and one or more information maps 358. Agricultural harvester 100, itself, illustratively includes one or more processors or servers 301, data store 302, geographic position sensor 304, communication system 306, one or more in-situ sensors 308 that sense one or more characteristics of a worksite concurrent with an operation, and a processing system 338 that processes the sensors data (e.g., sensor signals, images, etc.) generated by in-situ sensors 308 to generate processed sensor data. The in-situ sensors generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine can also include a wide variety of other machine functionality 320.

The in-situ sensors 308 can be on-board mobile machine 100, remote from mobile machine, such as deployed at fixed locations on the worksite or on another machine operating in concert with mobile machine 100, such as an aerial vehicle, and other types of sensors, or a combination thereof. In-situ sensors 308 sense characteristics of a worksite during the course of an operation. In-situ sensors 308 illustratively include ear sensors 380, wrapping sensors 386, hair pinning sensors 388, control input sensors, heading/speed sensors 325, and can include various other sensors 328. Ear sensors 380 illustratively include one or more ear loss sensors 382, one or more ear orientation sensors 384, and can include other types of ear sensors 385. Ear sensors 380 illustratively detect ear characteristics, such as ear orientation or ear loss, or both, at the field.

Ear loss sensors 382 illustratively detect ear loss, that is ears bouncing out of a head (e.g., 144) of agricultural harvester 100 as well as ears being dislodged from plants in rows adjacent to agricultural harvester 100, such as ears knocked off of adjacent plants by the head, or a component of the head. Ear loss sensors 382 can include imaging systems, such as cameras (e.g., stereo camera, mono camera, etc.), optical sensors, such as radar or lidar, ultrasonic sensors, as well as various other sensors, including but not limited to, sensors that detect one or more wavelengths of electromagnetic radiation emitted (or reflected) from the plants. In some examples, observation sensor system 180 is or includes ear loss sensors 382. In some examples, ear loss sensors 382 have a field of view that includes the head, and area(s) around the head (e.g., one or more of area(s) adjacent to head, such as to the side(s) of head, as well ahead of the head). In some examples, one ear loss sensor may observe one end of the head of agricultural harvester 100 while another ear loss sensor observes the opposite side of the head agricultural harvester 100.

Ear orientation sensors 384 illustratively detect the orientation of ears on corn plants at the field. Corn ears on corn plants stand erect on the corn plant, that is, they are pointing more upwards (e.g., closer to parallel with the corn stalk, closer to perpendicular with the ground), that is, the angle between the corn stalk and the corn ear is a smaller acute angle (e.g., 20°). For a variety of reasons, corn ears may not be erect or may "droop" that is, the corn ears point out from the stalk such that the angle between the ear and the stalk is a greater degree of acuteness (e.g., 60°), or perhaps even a right angle or an obtuse angle. In such scenarios, the ear may jut out from its crop row and into an adjacent row and/or sticks out from the stalk enough to be hit by the head of the agricultural harvester 100 when the agricultural harvester 100 is harvesting an adjacent row. Ear orientation sensors 384 thus illustratively detect the magnitude of and direction of leaning of the ears on the corn plants at the field. Ear orientation sensors 384 can include imaging systems, such as cameras (e.g., stereo camera, mono camera, etc.), optical sensors, such as radar or lidar, ultrasonic sensors, as well as various other sensors, including but not limited to, sensors that detect one or more wavelengths of electromagnetic radiation emitted (or reflected) from the plants. In some examples, observation sensor system 180 is or includes ear orientation sensors 384. In some examples, ear orientation sensors 384 have a field of view that includes the head, and area(s) around the head (e.g., one or more of area(s) adjacent to head, such as to the side(s) of head, as well ahead of the head). In some examples, one ear orientation sensor may observe one end of the head of agricultural harvester 100 while another ear orientation sensor observes the opposite side of the head of agricultural harvester 100.

Wrapping sensors 386 illustratively detect wrapping of plant material (e.g., crop material, weed material, etc.) around active end dividers, such as active end dividers 147. As the active end dividers rotate it may be that plant material from adjacent rows or from the row being harvested gets caught in active end dividers 147. Such wrapping can not only affect the performance of end dividers 147 (e.g., affect rotation speed, power requirements, etc.), but also can have a deleterious effect on the harvesting operation, such as by knocking ears off of plants in adjacent rows, knocking ears off prior to reaching the snap rolls, pulling plants down in adjacent rows, damaging the crop plants, including damaging the ears, impeding material flow, as well as various other effects. Thus, wrapping of plant material on end dividers 147 may indicate undesirable contact between end dividers 147 and plants on the field. Wrapping sensors 386 can include imaging systems, such as cameras (e.g., stereo camera, mono camera, etc.), optical sensors, such as radar or lidar, ultrasonic sensors, as well as various other sensors, including but not limited to, sensors that detect one or more wavelengths of electromagnetic radiation emitted (or reflected) from plant material on end dividers 147. In some examples, observation sensor system 180 is or includes wrapping sensors 386. In some examples, wrapping sensors 386 have a field of view that includes the head, and area(s) around the head (e.g., one or more of area(s) adjacent to head, such as to the side(s) of head, as well ahead of the head). In some examples, one wrapping sensor may observe one end of the head of agricultural harvester 100 while another wrapping sensor observes the opposite side of the head of agricultural harvester 100.

Hair pinning sensors 388 illustratively detect hair pinning on end dividers, that is the accumulation of plant material (e.g., crop material, weed material, etc.) on an edge of the end dividers (e.g., front edge, etc.). As the agricultural harvester 100 moves through the field, the end dividers may contact plant material from the row which agricultural harvester 100 is harvesting or form adjacent rows. This plant material may accumulate on an edge of the end dividers. Such hair pinning may not only affect the performance of the end dividers (e.g., prevent movement of the end dividers, require more power to move the end dividers, etc.) but also can have deleterious effect(s) on the harvesting operation. For instance, hair pinning may result in undesired contact with crop plants at the field which may result in knocking ears off of plants in adjacent rows, knocking ears off prior to reaching snap rolls, pulling plants down in adjacent rows, damaging the crop plants, including damaging the ears, impeding material flow, as well as various other effects. Hair pinning sensors 388 can include imaging systems, such as cameras (e.g., stereo camera, mono camera, etc.), optical sensors, such as radar or lidar, ultrasonic sensors, as well as various other sensors, including but not limited to, sensors that detect one or more wavelengths of electromagnetic radiation emitted (or reflected) from plant material on the end dividers. In some examples, observation sensor system 180 is or includes hair pinning sensors 388. In some examples, hair pinning sensors 388 have a field of view that includes the head, and area(s) around the head (e.g., one or more of area(s) adjacent to head, such as to the side(s) of head, as well ahead of the head). In some examples, one hair pinning sensor may observe one end of the head of agricultural harvester 100 while another hair pinning sensor observes the opposite side of the head of agricultural harvester 100.

As described above, observation sensor system 180 may include or comprise one or more of ear sensors 380, wrapping sensors 386, and hair pinning sensors 388. It will be noted that one or more of ear loss, ear orientation, wrapping, and hair pinning can be detected by one or more of the same type of sensor. For instance, an imaging system, such as a camera, or an optical sensor, may generate sensor data that is indicative of one or more of ear loss, ear orientation, wrapping, and hair pinning. For example, an image (or a set of images) captured by an imaging system may show one or more of ear loss, ear orientation, wrapping, and hair pinning. Thus it will be understood that each of ear loss, ear orientation, wrapping, and hair pinning may be detected by respective sensors or one or more of ear loss, ear orientation, wrapping, and hair pinning may be detected by one or more of the same type of sensor.

Control input sensors 390 illustratively detect control inputs that are used to control one or more items of agricultural harvester 100, such as one or more controllable subsystems 316. Control input sensors 390 may detect, as a control input, an operator input into an operator input mechanism 218. For example, agricultural harvester 100 may include one or more input mechanisms, actuatable/interactable by the operator 360, to control operation of a controllable subsystem 316, for instance to control end divider subsystem 340 to control movement of end dividers of agricultural harvester 100. Control input sensors 390 may detect, as a control input, a user input into a user interface mechanism 364. For example, user interface mechanisms 364 may include one or more input mechanisms, actuatable/interactable by a user 366, to control operation of a controllable subsystem 316, for instance to control end divider subsystem 340 to control movement of end dividers of agricultural harvester 100. Control input sensors 390 may detect, as a control input, a control signal generated by control system 314. For example, control system 314 may generate control signals to control one or more controllable subsystems 316, for instance to control end divider subsystem 340 to control movement of end dividers of agricultural harvester 100. The control inputs may command an operation setting of a controllable subsystem, such as a position end divider(s), a speed of rotation of end divider(s), a direction of rotation of end divider(s), a travel speed of agricultural harvester 100, a heading of agricultural harvester 100, as well as various other operation settings. Control input sensors 390 thus generate control input values indicative of the operation settings commanded by the control inputs.

Heading/speed sensors 325 detect a heading and speed at which agricultural harvester 100 is traversing the worksite during the operation. This can include sensors that sense the movement of ground-engaging elements (e.g., wheels or tracks of agricultural harvester 100) or can utilize signals received from other sources, such as geographic position sensors 304, thus, while heading/speed sensors 325 as described herein are shown as separate from geographic position sensors 304, in some examples, machine heading/speed is derived from signals received from geographic positions sensors 304 and subsequent processing. In other examples, heading/speed sensors 325 are separate sensors and do not utilize signals received from other sources.

Other in-situ sensors 328 may be any of a wide variety of other sensors, including, but not limited, sensors that detect various other characteristics at the field, such as characteristics of the field, characteristics of the plants at the field, and characteristics of the agricultural harvester 100, such as operating parameters. Other in-situ sensors 328 can be on-board agricultural harvester 100 or can be remote from agricultural harvester 100, such as other in-situ sensors 328 on-board another mobile machine that capture in-situ data of the worksite or sensors at fixed locations throughout the worksite. The remote data from remote sensors can be obtained by agricultural harvester 100 via communication system 206 over network 359.

In-situ data includes data taken from a sensor on-board the agricultural harvester 100 or taken by any sensor where the data are detected during the operation of agricultural harvester 100 at a worksite.

Processing system 338 processes the sensor data (e.g., sensor signals, images, etc.) generated by in-situ sensors 308 to generate processed sensor data indicative of one or more characteristics. For example, processing system generates processed sensor data indicative of characteristic values based on the sensor data generated by in-situ sensors 308, such as ear characteristic values based on sensor data generated by ear sensors 380, for instance one or more of ear loss values based on sensor data generated by ear loss sensors 382, ear orientation values based on sensor data generated by ear orientation sensors 384, well as various other ear characteristic values based on sensor data generated by various other ear sensors 385. Processing system 338 also processes sensor signals generated by other in-situ sensors 308 to generate processed sensor data indicative of other characteristic values, for instance one or more of wrapping values based on sensor data generated by wrapping sensors 386, hair pinning values based on sensor data generated by hair pinning sensors 388, control input values based on sensor data generated by control input sensors 390, machine speed (travel speed, acceleration, deceleration, etc.) values based on sensor data generated by heading/speed sensors 325, machine heading values based on sensor data generated by heading/speed sensors 325, as well as various other values based on sensors data generated by various other in-situ sensors 328.

It will be understood that processing system 338 can be implemented by one or more processers or servers, such as processors or servers 301. Additionally, processing system 338 can utilize various filtering techniques, noise filtering techniques, sensor signal categorization, aggregation, normalization, as well as various other processing functionality. Similarly, processing system 338 can utilize various image processing techniques such as, sequential image comparison, RGB, edge detection, black/white analysis, machine learning, neural networks, pixel testing, pixel clustering, shape detection, as well any number of other suitable image processing and data extraction functionality.

FIG. 4 also shows remote users 366 interacting with agricultural harvester 100 or remote computing systems 368, or both, through user interfaces mechanisms 364 over network 359. Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, agricultural harvester 100 can be controlled remotely by remote computing systems 368 or by remote users 366, or both. As will be described below, in some examples, one or more of the components shown being disposed on agricultural harvester can be located elsewhere, such as at remote computing systems 368.

FIG. 4 also shows that an operator 360 may operate agricultural harvester 100. The operator 360 interacts with operator interface mechanisms 218. In some examples, operator interface mechanisms 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 360 may interact with operator interface mechanisms 218 using touch gestures. These examples described above are provided as illustrative examples and are not intended to limit the scope of the present disclosure. Consequently, other types of operator interface mechanisms 218 may be used and are within the scope of the present disclosure. Operator 360 may be local to agricultural harvester 100, such as in an operator compartment 103 or may be remote from agricultural harvester 100.

FIG. 4 also shows that agricultural harvester 100 can obtain one or more information maps 358. As described herein, the information maps 358 include, for example, a genotype map, a crop state map, a weed map, a harvest coverage map, as well as various other maps. However, information maps 358 may also encompass other types of data, such as other types of data that were obtained prior to a harvesting operation or a map from a prior operation. In other examples, information maps 358 can be generated during a current operation, such a map generated by predictive map generator 312 based on a predictive model 311 generated by predictive model generator 310 or map generated based on sensor data generated during the current operation, such as harvest coverage map generated during the current harvesting operation that indicates areas of the field that have been harvested and areas of the field that have not yet been harvested.

Information maps 358 may be downloaded onto mobile machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

Geographic position sensors 304 illustratively sense or detect the geographic position or location of agricultural harvester 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors.

Predictive model generator 310 generates a model that is indicative of a relationship between the values sensed by the in-situ sensors 308 and values mapped to the field by the information maps 358. For example, if the information map 358 maps genotype values to different locations in the worksite, and the in-situ sensors 308 are sensing values indicative of ear characteristics (e.g., one or more of ear loss and ear orientation), then model generator 310 generates a predictive ear characteristic model that models the relationship between the genotype values and the ear characteristic values. In another example, if the information map 358 maps weed values to different locations in the worksite, and the in-situ sensors 308 are sensing values indicative of wrapping, then model generator 310 generates a predictive model that models the relationship between the weed values and the wrapping values. These are merely some examples.

In some examples, the predictive map generator 312 uses the predictive models generated by predictive model generator 310 to generate functional predictive maps that predict the value of a characteristic, such as an ear characteristic (e.g., ear loss or ear orientation), wrapping, hair pinning, or control input, sensed by the in-situ sensors 308 at different locations in the worksite based upon one or more of the information maps 358. For example, where the predictive model is a predictive ear characteristic model that models a relationship between one or more ear characteristics (e.g., ear loss, ear orientation, etc.) sensed by in-situ sensors 308 and one or more of genotype values from a genotype map, crop state values from a crop state map, and weed values from a weed map, then predictive map generator 312 generates a functional predictive ear characteristic map that predicts values of one or more ear characteristics at different locations at the worksite based on one or more of the mapped values at those locations and the predictive ear characteristic model. This is merely an example.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As shown in FIG. 4, predictive map 264 predicts the value of a sensed characteristic (sensed by in-situ sensors 308), or a characteristic related to the sensed characteristic, at various locations across the worksite based upon one or more information values in one or more information maps 358 at those locations and using the predictive model 311. For example, if predictive model generator 310 has generated a predictive model indicative of a relationship between crop state values and control input values, then, given the crop state value at different locations across the worksite, predictive map generator 312 generates a predictive map 264 that predicts control input values at different locations across the worksite. The crop state value, obtained from the crop state map, at those locations and the relationship between crop state values and the control input values, obtained from the predictive model 311, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be a genotype map, and the variable sensed by the in-situ sensors 308 may be hair pinning. The predictive map 264 may then be a predictive hair pinning map that maps predictive hair pinning values to different geographic locations in the in the worksite.

Also, in some examples, the data type in the information map 358 is different from the data type sensed by in-situ sensors 308, and the data type in the predictive map 264 is different from both the data type in the information map 358 and the data type sensed by the in-situ sensors 308.

In some examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a genotype map generated during a previous planting/seeding operation on the field, and the variable sensed by the in-situ sensors 308 may be an ear characteristic. The predictive map 264 may then be a predictive ear characteristic map that maps predictive ear characteristic values to different geographic locations in the worksite. This is merely an example.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be an ear characteristic map generated during a previous year, and the variable sensed by the in-situ sensors 308 may be an ear characteristic. The predictive map 264 may then be a predictive ear characteristic map that maps predictive values of the ear characteristic to different geographic locations in the field. In such an example, the relative ear characteristic differences in the georeferenced information map 358 from the prior year can be used by predictive model generator 310 to generate a predictive model that models a relationship between the relative ear characteristic differences on the information map 358 and the ear characteristic values sensed by in-situ sensors 308 during the current operation. The predictive model is then used by predictive map generator 310 to generate a predictive ear characteristic map. This is merely an example.

In another example, the information map 358 may be a weed map generated during a prior operation in the same year, such as a spraying operation performed by a spraying machine, and the variable sensed by the in-situ sensors 308 during the current harvesting operation may be an ear characteristic. The predictive map 264 may then be a predictive ear characteristic map that maps predictive ear characteristic values to different geographic locations in the worksite. In such an example, a map of the weed values at time of the spraying operation is geo-referenced, recorded, and provided to agricultural harvester 100 as an information map 358 of weed values. In-situ sensors 308 during a current operation can detect an ear characteristic at geographic locations in the field and predictive model generator 310 may then build a predictive model that models a relationship between the ear characteristic at time of the current operation and weed values at the time of the spraying operation. This is because the weed values at the time of the spraying operation are likely to be the same as at the time of the current operation or may be more accurate or otherwise may be more reliable than weed values obtained in other ways. This is merely an example.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265.

It will also be appreciated that control zone generator 313 can cluster values to generate control zones and the control zones can be added to predictive control zone map 265, or a separate map, showing only the control zones that are generated. In some examples, the control zones may be used for controlling or calibrating agricultural harvester 100 or both. In other examples, the control zones may be presented to the operator 360 and used to control or calibrate agricultural harvester 100, and, in other examples, the control zones may be presented to the operator 360 or another user, such as a remote user 366, or stored for later use.

Predictive map 264 or predictive control zone map 265, or both, are provided to control system 314, which generates control signals based upon the predictive map 264 or predictive control zone map 265 or both. In some examples, communication system controller 329 controls communication system 306 to communicate the predictive map 264 or predictive control zone map 265 or control signals based on the predictive map 264 or predictive control zone map 265 to other mobile machines that are operating at the same field or in the same operation. In some examples, communication system controller 329 controls the communication system 306 to send the predictive map 264, predictive control zone map 265, or both to other remote systems, such as remote computing systems 368.

Control system 314 includes communication system controller 329, interface controller 330, propulsion controller 331, path planning controller 334, end divider controllers 335, zone controller 336, and control system 314 can include other items 339. Controllable subsystems 316 end dividers subsystem 340, propulsion subsystem 350, steering subsystem 352, and subsystems 316 can include a wide variety of other controllable subsystems 356.

Interface controller 330 is operable to generate control signals to control interface mechanisms, such as operator interface mechanisms 318 or user interfaces 364, or both. The interface controller 330 is also operable to present the predictive map 264 or predictive control zone map 265 or other information derived from or based on the predictive map 264, predictive control zone map 265, or both to operator 360 or a remote user 366, or both. As an example, interface controller 330 generates control signals to control a display mechanism to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation.

Path planning controller 334 illustratively generates control signals to control steering subsystem 352 to steer agricultural harvester 100 according to a desired path or according to desired parameters, such as desired steering angles. Path planning controller 334 can control a path planning system to generate a route for mobile machine 100 and can control propulsion subsystem 350 and steering subsystem 352 to steer mobile machine 100 along that route. Path planning controller 334 can generate control signals based on one or more of predictive map 264, predictive map with control zones 265, information maps 365, or control inputs, such as by an operator or user.

Propulsion controller 331 illustratively generates control signals to control propulsion subsystem 350 to control a speed characteristic of mobile machine 100, such as one or more of travel speed, acceleration, and deceleration. Propulsion subsystem 350 may include various power train components of mobile machine 100, such as, but not limited to, an engine or motor, and a transmission (or gear box). Propulsion controller 331 can generate control signals based on one or more of predictive map 264, predictive map with control zones 265, information maps 365, or control inputs, such as by an operator or user.

End divider controllers 335 illustratively generate control signals to control one or more operating parameters of the end dividers (e.g., 146, 150 or 147). For example, each end divider controller 335 can generate control signals to control a respective end divider, or a single end divider controller 335 can control multiple end dividers. End divider controllers 335 generate control signals to control end divider actuators 342. For instance an end divider actuator 342 may control the movement (e.g., extension/retraction of an end divider or the speed of rotation of an end divider and/or the direction of rotation of the end divider). In some examples, each end divider has its own respective actuator(s) 342. In some examples, a single actuator 342 may control an operational parameter of multiple end dividers. End divider controllers 335 can generate control signals based on one or more of predictive map 264, predictive map with control zones 265, information maps 365, or control inputs, such as by an operator or user.

Zone controller 336 illustratively generates control signals to control one or more controllable subsystems 316 to control operation of the one or more controllable subsystems 316 based on the predictive control zone map 265.

Other controllers 339 included on the mobile machine 100, or at other locations in agricultural system 300, can control other subsystems 316 based on the predictive map 264 or predictive control zone map 265 or both as well.

While the illustrated example of FIG. 4 shows that various components of agricultural harvesting system architecture 300 are located on agricultural harvester 100, it will be understood that in other examples one or more of the components illustrated on agricultural harvester 100 in FIG. 4 can be located at other locations, such as one or more remote computing systems 368. For instance, one or more of data stores 302, map selector 309, predictive model generator 310, predictive model 311, predictive map generator 312, functional predictive maps (e.g., 264 and 265), control zone generator 313, and control system 314 can be located remotely from mobile machine 100 but can communicate with (or be communicated to) agricultural harvester 100 via communication system 306 and network 359. Thus, the predictive models 311 and functional predictive maps 263 may be generated at remote locations away from agricultural harvester 100 and communicated to mobile machine 100 over network 302, for instance, communication system 306 can download the predictive models 311 and functional predictive maps 263 from the remote locations and store them in data store 302. In other examples, agricultural harvester 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations.

Similarly, where various components are located remotely from agricultural harvester 100, those components can receive data from components of agricultural harvester 100 over network 359. For example, where predictive model generator 310 and predictive map generator 312 are located remotely from agricultural harvester 100, such as at remote computing systems 368, data generated by in-situ sensors 308 and geographic position sensors 304, for instance, can be communicated to the remote computing systems 368 over network 359. Additionally, information maps 358 can be obtained by remote computing systems 368 over network 359 or over another network.

Similarly, the remote systems may include a respective control system or control signal generator that generates control output (e.g., control signals) that are communicated to agricultural harvester 100 and used by the local control system 314 for the control of agricultural harvester 100.

Figure 5:
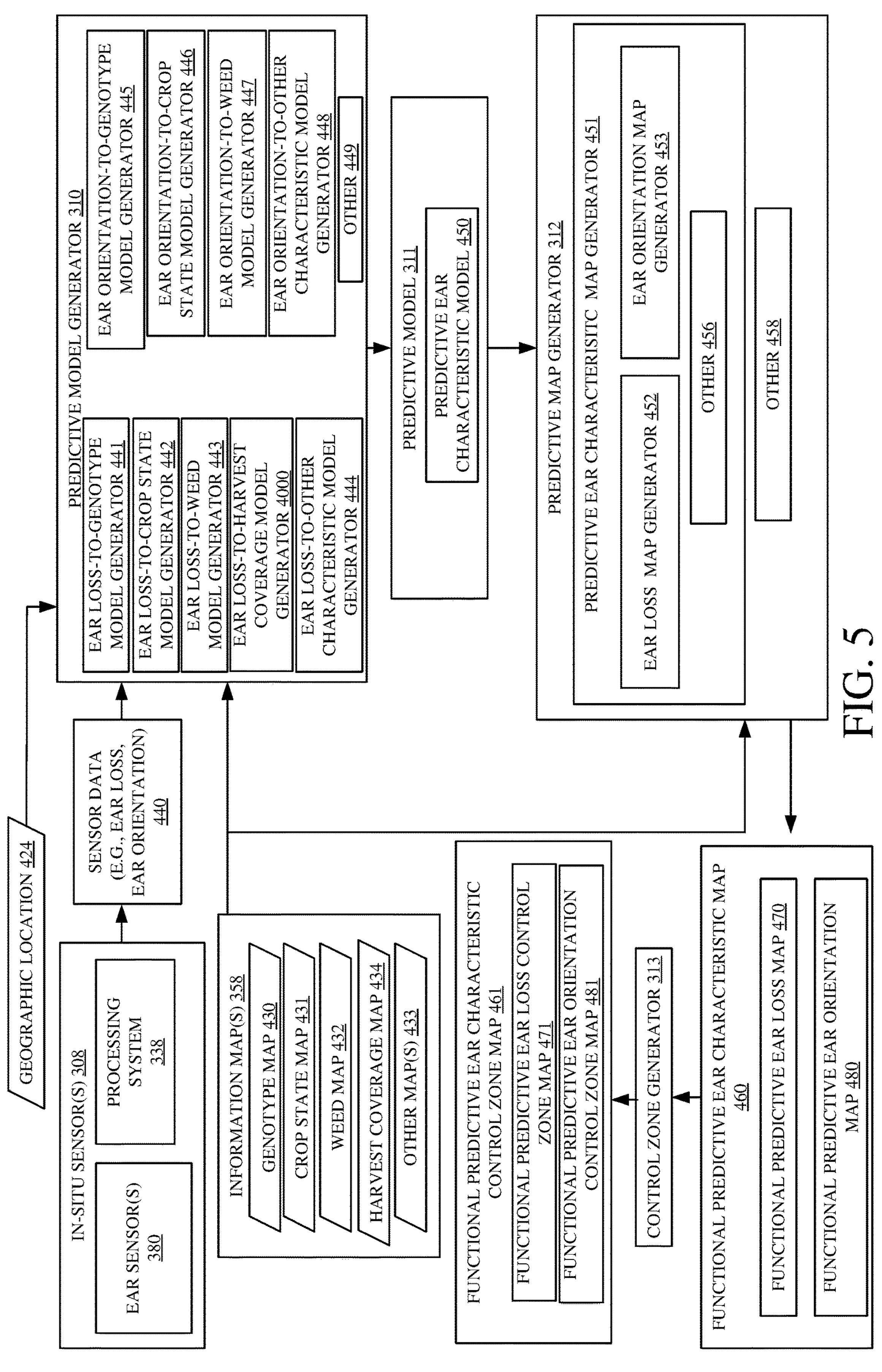
FIG. 5 is a block diagram showing one example of a predictive model generator and predictive map generator.

FIG. 5 is a block diagram of a portion of the agricultural system architecture 300 shown in FIG. 4. Particularly, FIG. 5 shows, among other things, examples of the predictive model generator 310 and the predictive map generator 312 in more detail. FIG. 5 also illustrates information flow among the various components shown. The predictive model generator 310 receives one or more of a genotype map 430, a crop state map 431, a weed map 432, a harvest coverage map, and another type of map 433. Predictive model generator 310 also receives a geographic location 424, or an indication of a geographic location, such as from geographic position sensors 304. Geographic location 424 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively include ear characteristic sensors 380, such as ear loss sensors 382 and ear orientation sensors 384, as well as processing system 338. In some examples, processing system 338 is separate from in-situ sensors 308 (such as the example shown in FIG. 4). In some instances, ear sensors 380 may be located on-board agricultural harvester 100. The processing system 338 processes sensor data generated from ear sensor 380 to generate processed sensor data 440 indicative of ear characteristic values, such as one or more of ear loss values and ear orientation values.

As shown in FIG. 5, the example predictive model generator 310 includes an ear loss-to-genotype model generator 441, an ear loss-to-crop state model generator 442, an ear loss-to-weed model generator 443, an ear loss-to-harvest coverage model generator 4000, an ear loss-to-other characteristic model generator 444, an ear orientation-to-genotype model generator 445, an ear orientation-to-crop state model generator 446, an ear orientation-to-weed model generator 447, and an ear orientation-to-other characteristic model generator 448. In other examples, the predictive model generator 310 may include additional, fewer, or different components than those shown in the example of FIG. 5. Consequently, in some examples, the predictive model generator 310 may include other items 449 as well, which may include other types of predictive model generators to generate other types of ear characteristic models.

Ear loss-to-genotype model generator 441 identifies a relationship between ear loss value(s) detected in in-situ sensor data 440, at geographic location(s) to which the ear loss value(s), detected in the in-situ sensor data 440, correspond, and genotype values from the genotype map 430 corresponding to the same geographic location(s) to which the detected ear loss value(s) correspond. Based on this relationship established by ear loss-to-genotype model generator 441, ear loss-to-genotype model generator 441 generates a predictive ear characteristic model (e.g., a predictive ear loss model). The predictive ear characteristic model is used by ear loss map generator 452 to predict ear loss at different locations in the field based upon the georeferenced genotype values contained in the genotype map 430 at the same locations in the field. Thus, for a given location in the field, an ear loss value can be predicted at the given location based on the predictive ear characteristic model and the genotype value, from the genotype map 430, at that given location.

Ear loss-to-crop state model generator 442 identifies a relationship between ear loss value(s) detected in in-situ sensor data 440, at geographic location(s) to which the ear loss value(s), detected in the in-situ sensor data 440, correspond, and crop state values from the crop state map 431 corresponding to the same geographic location(s) to which the detected ear loss value(s) correspond. Based on this relationship established by ear loss-to-crop state model generator 442, ear loss-to-crop state model generator 442 generates a predictive ear characteristic model (e.g., a predictive ear loss model). The predictive ear characteristic model is used by ear loss map generator 452 to predict ear loss at different locations in the field based upon the georeferenced crop state values contained in the crop state map 431 at the same locations in the field. Thus, for a given location in the field, an ear loss value can be predicted at the given location based on the predictive ear characteristic model and the crop state value, from the crop state map 431, at that given location.

Ear loss-to-weed model generator 443 identifies a relationship between ear loss value(s) detected in in-situ sensor data 440, at geographic location(s) to which the ear loss value(s), detected in the in-situ sensor data 440, correspond, and weed values from the weed map 432 corresponding to the same geographic location(s) to which the detected ear loss value(s) correspond. Based on this relationship established by ear loss-to-weed model generator 443, ear loss-to-weed model generator 443 generates a predictive ear characteristic model (e.g., a predictive ear loss model). The predictive ear characteristic model is used by ear loss map generator 452 to predict ear loss at different locations in the field based upon the georeferenced weed values contained in the weed map 432 at the same locations in the field. Thus, for a given location in the field, an ear loss value can be predicted at the given location based on the predictive ear characteristic model and the weed value, from the weed map 432, at that given location.

Ear loss-to-harvest coverage model generator 4000 identifies a relationship between ear loss value(s) detected in in-situ sensor data 440, at geographic location(s) to which the ear loss value(s), detected in the in-situ sensor data 440, correspond, and harvest coverage values from the harvest coverage map 4000 corresponding to the same geographic location(s) to which the detected ear loss value(s) correspond. Based on this relationship established by ear loss-to-harvest coverage model generator 4000, ear loss-to-harvest coverage model generator 4000 generates a predictive ear characteristic model (e.g., a predictive ear loss model). The predictive ear characteristic model is used by ear loss map generator 452 to predict ear loss at different locations in the field based upon the georeferenced harvest coverage values contained in the harvest coverage map 434 at the same locations in the field. Thus, for a given location in the field, an ear loss value can be predicted at the given location based on the predictive ear characteristic model and the harvest coverage value, from the harvest coverage map 434, at that given location.

Ear loss-to-other characteristic model generator 444 identifies a relationship between ear loss value(s) detected in in-situ sensor data 440, at geographic location(s) to which the ear loss value(s), detected in the in-situ sensor data 440, correspond, and values of an other characteristic from an other map 433 corresponding to the same geographic location(s) to which the detected ear loss value(s) correspond. Based on this relationship established by ear loss-to-other characteristic model generator 444, ear loss-to-other characteristic model generator 444 generates a predictive ear characteristic model (e.g., a predictive ear loss model). The predictive ear characteristic model is used by ear loss map generator 452 to predict ear loss at different locations in the field based upon the georeferenced values of the other characteristic contained in the other map 433 at the same locations in the field. Thus, for a given location in the field, an ear loss value can be predicted at the given location based on the predictive ear characteristic model and the value of the other characteristic, from the other map 433, at that given location.

Ear orientation-to-genotype model generator 445 identifies a relationship between ear orientation value(s) detected in in-situ sensor data 440, at geographic location(s) to which the ear orientation value(s), detected in the in-situ sensor data 440, correspond, and genotype values from the genotype map 430 corresponding to the same geographic location(s) to which the detected ear orientation value(s) correspond. Based on this relationship established by ear orientation-to-genotype model generator 445, ear orientation-to-genotype model generator 445 generates a predictive ear characteristic model (e.g., a predictive ear orientation model). The predictive ear characteristic model is used by ear orientation map generator 453 to predict ear orientation at different locations in the field based upon the georeferenced genotype values contained in the genotype map 430 at the same locations in the field. Thus, for a given location in the field, an ear orientation value can be predicted at the given location based on the predictive ear characteristic model and the genotype value, from the genotype map 430, at that given location.

Ear orientation-to-crop state model generator 446 identifies a relationship between ear orientation value(s) detected in in-situ sensor data 440, at geographic location(s) to which the ear orientation value(s), detected in the in-situ sensor data 440, correspond, and crop state values from the crop state map 431 corresponding to the same geographic location(s) to which the detected ear orientation value(s) correspond. Based on this relationship established by ear orientation-to-crop state model generator 446, ear orientation-to-crop state model generator 446 generates a predictive ear characteristic model (e.g., a predictive ear orientation model). The predictive ear characteristic model is used by ear orientation map generator 453 to predict ear orientation at different locations in the field based upon the georeferenced crop state values contained in the crop state map 431 at the same locations in the field. Thus, for a given location in the field, an ear orientation value can be predicted at the given location based on the predictive ear characteristic model and the crop state value, from the crop state map 431, at that given location.

Ear orientation-to-weed model generator 447 identifies a relationship between ear orientation value(s) detected in in-situ sensor data 440, at geographic location(s) to which the ear orientation value(s), detected in the in-situ sensor data 440, correspond, and weed values from the weed map 432 corresponding to the same geographic location(s) to which the detected ear orientation value(s) correspond. Based on this relationship established by ear orientation-to-weed model generator 447, ear orientation-to-weed model generator 447 generates a predictive ear characteristic model (e.g., a predictive ear orientation model). The predictive ear characteristic model is used by ear orientation map generator 453 to predict ear orientation at different locations in the field based upon the georeferenced weed values contained in the weed map 432 at the same locations in the field. Thus, for a given location in the field, an ear orientation value can be predicted at the given location based on the predictive ear characteristic model and the weed value, from the weed map 432, at that given location.

Ear orientation-to-other characteristic model generator 448 identifies a relationship between ear orientation value(s) detected in in-situ sensor data 440, at geographic location(s) to which the ear orientation value(s), detected in the in-situ sensor data 440, correspond, and values of an other characteristic from an other map 433 corresponding to the same geographic location(s) to which the detected ear orientation value(s) correspond. Based on this relationship established by ear orientation-to-other characteristic model generator 448, ear orientation-to-other characteristic model generator 448 generates a predictive ear characteristic model (e.g., a predictive ear orientation model). The predictive ear characteristic model is used by ear orientation map generator 453 to predict ear orientation at different locations in the field based upon the georeferenced values of the other characteristic contained in the other map 433 at the same locations in the field. Thus, for a given location in the field, an ear orientation value can be predicted at the given location based on the predictive ear characteristic model and the value of the other characteristic, from the other map 433, at that given location.

In light of the above, the predictive model generator 310 is operable to produce a plurality of predictive ear characteristic models, such as one or more of the predictive ear characteristic models generated by model generators 441, 442, 443, 444, 4000, 445, 446, 447, 448, and 449. In another example, two or more of the predictive models described above may be combined into a single predictive ear characteristic model, such as a predictive ear characteristic model that predicts one or more ear characteristics (e.g., one or more of ear loss and ear orientation) based upon two or more of the genotype values, the crop state value, the weed values, the harvest coverage values, and the other characteristic values at different locations in the field. Any of these ear characteristic models, or combinations thereof, are represented collectively by predictive ear characteristic model 450 in FIG. 5.

The predictive ear characteristic model 450 is provided to predictive map generator 312. In the example of FIG. 5, predictive map generator 312 includes ear characteristic map generator 451. In other examples, predictive map generator 312 may include additional or different map generators. Thus, in some examples, predictive map generator 312 may include other items 458 which may include other types of map generators to generate other types of maps.

Ear characteristic map generator 451 receives one or more of the genotype map 430, the crop state map 431, the weed map 432, the harvest coverage map 434, and an other map 433, along with the predictive ear characteristic model 450 which predicts one or more ear characteristics (e.g., one or more of ear loss and ear orientation) based upon one or more of genotype value, a crop state value, a weed value, a harvest coverage value, and an other characteristic value, and generates a predictive map that predicts one or more ear characteristics at different locations in the field, such as functional predictive ear characteristic map 460.

Ear characteristic map generator 451, itself, includes ear loss map generator 452 and ear orientation map generator 453. In other examples, ear characteristic map generator 451 may include additional or different map generators. Thus, in some examples, ear characteristic map generator 451 may include other items 456 which may include other types of ear characteristic map generator to generate other types of ear characteristic maps.

Ear loss map generator 452 receives one or more of the genotype map 430, the crop state map 431, the weed map 432, the harvest coverage map 4000, and an other map 433, along with the predictive characteristic model 450 which predicts ear loss based upon one or more of a genotype value, a crop state value, a weed value, a harvest coverage value, and an other characteristic value, and generates a predictive map that predicts ear loss at different locations in the field, such as functional predictive ear loss map 470, as a functional predictive ear characteristic map 460.

Ear orientation map generator 453 receives one or more of the genotype map 430, the crop state map 431, the weed map 432, and an other map 433, along with the predictive characteristic model 450 which predicts ear orientation based upon one or more of a genotype value, a crop state value, a weed value, and an other characteristic value, and generates a predictive map that predicts ear orientation at different locations in the field, such as functional predictive ear orientation map 480, as a functional predictive ear characteristic map 460.

Predictive map generator 312 thus outputs a functional predictive ear characteristic map 460 that is predictive of one or more ear characteristics (e.g., one or more of ear loss or ear orientation). Functional predictive ear characteristic map 460 is a predictive map 264. The functional predictive ear characteristic map 460, in one example, predicts one or more ear characteristics (e.g., one or more of ear loss and ear orientation) at different locations in a field. The functional predictive ear characteristic map 460 may be provided to control zone generator 313, control system 314, or both. Control zone generator 313 generates control zones and incorporates those control zones into the functional predictive ear characteristic map 460 to produce a predictive control zone map 265, that is a functional predictive ear characteristic control zone map 461. For example, functional predictive ear loss map 470 can provided to control zone generator 313 to produce, as functional predictive ear characteristic control zone map 461, a functional predictive ear loss control zone map 471, In another example, functional predictive ear orientation map 480 can be provided to control zone generator 313 to produce, as a functional predictive ear characteristic control zone map 461, a functional predictive ear orientation control zone map 481.

One or both of functional predictive ear characteristic map 460 and functional predictive ear characteristic control zone map 461 may be provided to control system 314, which generates control signals to control one or more of the controllable subsystems 316 based upon the functional predictive ear characteristic map 460, the functional predictive ear characteristic control zone map 461, or both.

Figure 6:
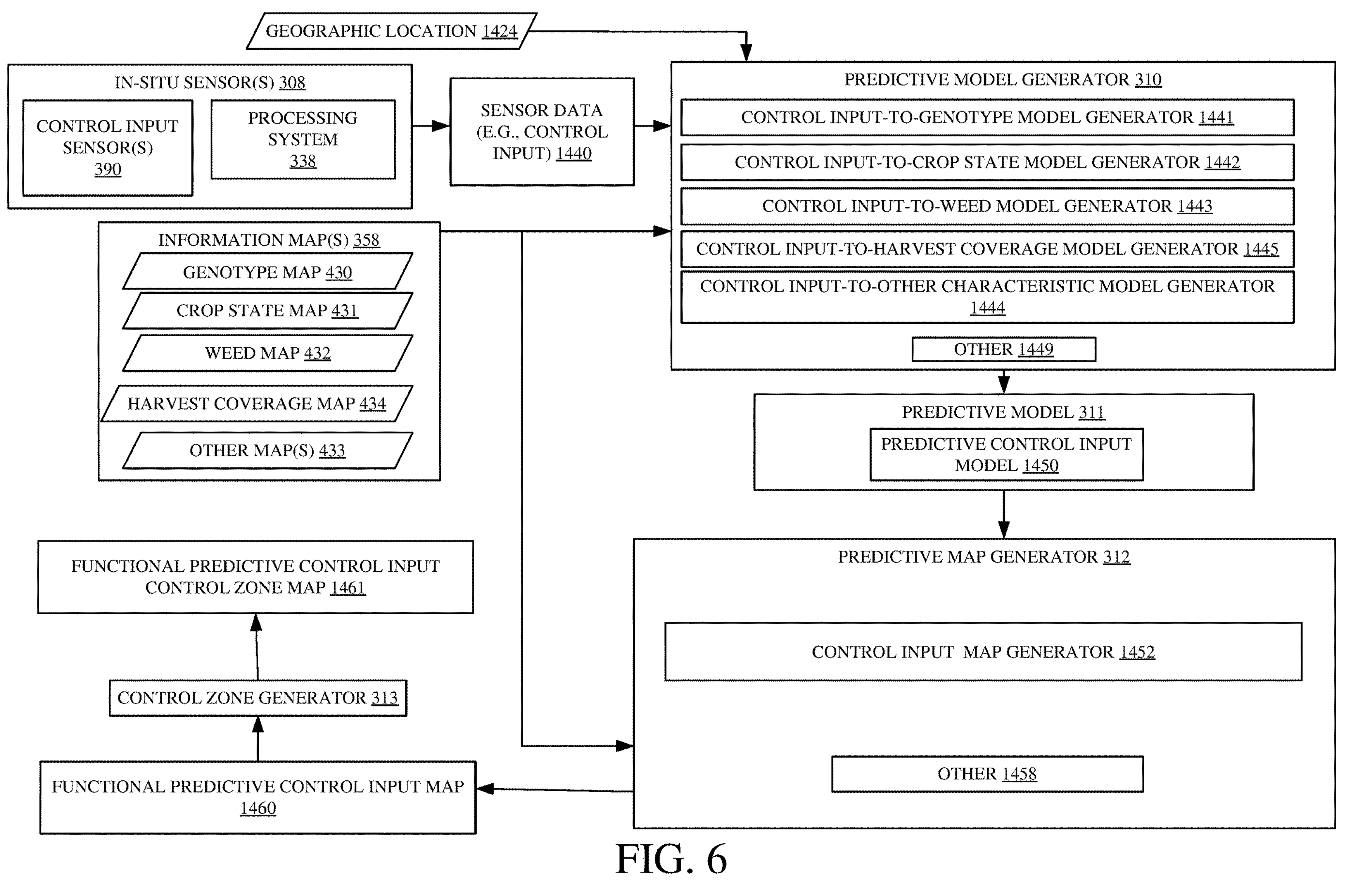
FIG. 6 is a block diagram showing one example of a predictive model generator and predictive map generator.

FIG. 6 is a block diagram of a portion of the agricultural system architecture 300 shown in FIG. 4. Particularly, FIG. 6 shows, among other things, examples of the predictive model generator 310 and the predictive map generator 312 in more detail. FIG. 6 also illustrates information flow among the various components shown. The predictive model generator 310 receives one or more of a genotype map 430, a crop state map 431, a weed map 432, a harvest coverage map, and another type of map 433. Predictive model generator 310 also receives a geographic location 1424, or an indication of a geographic location, such as from geographic position sensors 304. Geographic location 1424 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds. For example, in the context of a control input value detected by control input sensors 390, geographic location 1424 may indicate the geographic location of the component of the agricultural harvester, that is controlled by the detected control input.

In-situ sensors 308 illustratively include control input sensors 390, as well as processing system 338. In some examples, processing system 338 is separate from in-situ sensors 308 (such as the example shown in FIG. 4). In some instances, control input sensors 390 may be located on-board agricultural harvester 100. The processing system 338 processes sensor data generated from control input sensors 390 to generate processed sensor data 1440 indicative of control input values.

As shown in FIG. 6, the example predictive model generator 310 includes a control input-to-genotype model generator 1441, a control input-to-crop state model generator 1442, a control input-to-weed model generator 1443, a control input-to-harvest coverage model generator 1445, and a control input-to-other characteristic model generator 1444. In other examples, the predictive model generator 310 may include additional, fewer, or different components than those shown in the example of FIG. 6. Consequently, in some examples, the predictive model generator 310 may include other items 1449 as well, which may include other types of predictive model generators to generate other types of control input models.

Control input-to-genotype model generator 1441 identifies a relationship between control input value(s) detected in in-situ sensor data 1440, at geographic location(s) to which the control input value(s), detected in the in-situ sensor data 1440, correspond, and genotype values from the genotype map 430 corresponding to the same geographic location(s) to which the detected control input value(s) correspond. Based on this relationship established by control input-to-genotype model generator 1441, control input-to-genotype model generator 1441 generates a predictive control input model. The predictive control input model is used by control input map generator 1452 to predict control input at different locations in the field based upon the georeferenced genotype values contained in the genotype map 430 at the same locations in the field. Thus, for a given location in the field, a control input value can be predicted at the given location based on the predictive control input model and the genotype value, from the genotype map 430, at that given location.

Control input-to-crop state model generator 1442 identifies a relationship between control input value(s) detected in in-situ sensor data 1440, at geographic location(s) to which the control input value(s), detected in the in-situ sensor data 1440, correspond, and crop state values from the crop state map 431 corresponding to the same geographic location(s) to which the detected control input value(s) correspond. Based on this relationship established by control input-to-crop state model generator 1442, control input-to-crop state model generator 1442 generates a predictive control input model. The predictive control input model is used by control input map generator 1452 to predict control input at different locations in the field based upon the georeferenced crop state values contained in the crop state map 431 at the same locations in the field. Thus, for a given location in the field, a control input value can be predicted at the given location based on the predictive control input model and the crop state value, from the crop state map 431, at that given location.

Control input-to-weed model generator 1443 identifies a relationship between control input value(s) detected in in-situ sensor data 1440, at geographic location(s) to which the control input value(s), detected in the in-situ sensor data 1440, correspond, and weed values from the weed map 432 corresponding to the same geographic location(s) to which the detected control input value(s) correspond. Based on this relationship established by control input-to-weed model generator 1443, control input-to-weed model generator 1443 generates a predictive control input model. The predictive control input model is used by control input map generator 1452 to predict control input at different locations in the field based upon the georeferenced weed values contained in the weed map 432 at the same locations in the field. Thus, for a given location in the field, a control input value can be predicted at the given location based on the predictive control input model and the weed value, from the weed map 432, at that given location.

Control input-to-harvest coverage model generator 1445 identifies a relationship between control input value(s) detected in in-situ sensor data 1440, at geographic location(s) to which the control input value(s), detected in the in-situ sensor data 1440, correspond, and harvest coverage values from the harvest coverage map 434 corresponding to the same geographic location(s) to which the detected control input value(s) correspond. Based on this relationship established by control input-to-harvest coverage model generator 1445, control input-to-harvest coverage model generator 1445 generates a predictive control input model. The predictive control input model is used by control input map generator 1452 to predict control input at different locations in the field based upon the georeferenced harvest coverage values contained in the weed map 432 at the same locations in the field. Thus, for a given location in the field, a control input value can be predicted at the given location based on the predictive control input model and the harvest coverage value, from the harvest coverage map 434, at that given location.

Control input-to-other characteristic model generator 1444 identifies a relationship between control input value(s) detected in in-situ sensor data 1440, at geographic location (s) to which the control input value(s), detected in the in-situ sensor data 1440, correspond, and values of an other characteristic from an other map 433 corresponding to the same geographic location(s) to which the detected control input value(s) correspond. Based on this relationship established by control input-to-other characteristic model generator 1444, control input-to-other characteristic model generator 1444 generates a predictive control input model. The predictive control input model is used by control input map generator 1452 to predict control input at different locations in the field based upon the georeferenced values of the other characteristic contained in the other map 433 at the same locations in the field. Thus, for a given location in the field, a control input value can be predicted at the given location based on the predictive control input model and the value of the other characteristic, from the other map 433, at that given location.

In light of the above, the predictive model generator 310 is operable to produce a plurality of predictive control input models, such as one or more of the predictive control input models generated by model generators 1441, 1442, 1443, 1444, 1445, and 1449. In another example, two or more of the predictive models described above may be combined into a single predictive control input model, such as a predictive control input model that predicts control input based upon two or more of the genotype values, the crop state value, the weed values, the harvest coverage values, and the other characteristic values at different locations in the field. Any of these control input models, or combinations thereof, are represented collectively by predictive control input model 1450 in FIG. 6.

The predictive control input model 1450 is provided to predictive map generator 312. In the example of FIG. 6, predictive map generator 312 includes control input map generator 1452. In other examples, predictive map generator 312 may include additional or different map generators. Thus, in some examples, predictive map generator 312 may include other items 1458 which may include other types of map generators to generate other types of maps.

Control input map generator 1452 receives one or more of the genotype map 430, the crop state map 431, the weed map 432, the harvest coverage map 434, and an other map 433, along with the predictive control input model 1450 which predicts control input based upon one or more of genotype value, a crop state value, a weed value, and an other characteristic value, and generates a predictive map that predicts control input at different locations in the field, such as functional predictive control input map 1460.

Predictive map generator 312 thus outputs a functional predictive control input map 1460 that is predictive of control input. Functional predictive control input map 1460 is a predictive map 264. The functional predictive control input map 1460, in one example, predicts control input at different locations in a field. The functional predictive control input map 1460 may be provided to control zone generator 313, control system 314, or both. Control zone generator 313 generates control zones and incorporates those control zones into the functional predictive control input map 1460 to produce a predictive control zone map 265, that is a functional predictive control input control zone map 1461.

One or both of functional predictive control input map 1460 and functional predictive control input control zone map 1461 may be provided to control system 314, which generates control signals to control one or more of the controllable subsystems 316 based upon the functional predictive control input map 1460, the functional predictive control input control zone map 1461, or both.

Figure 7:
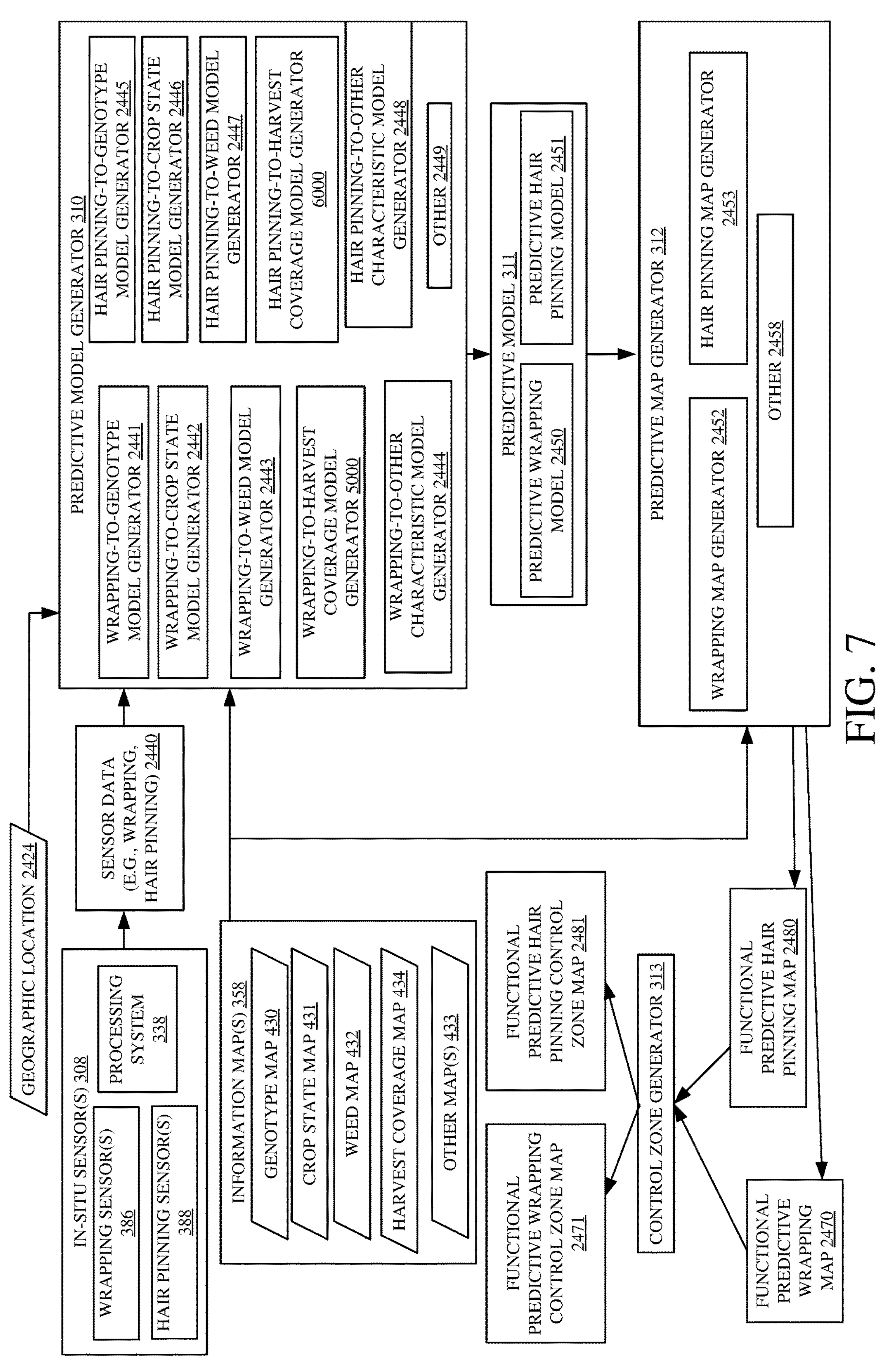
FIG. 7 is a block diagram showing one example of a predictive model generator and predictive map generator.

FIG. 7 is a block diagram of a portion of the agricultural system architecture 300 shown in FIG. 4. Particularly, FIG. 7 shows, among other things, examples of the predictive model generator 310 and the predictive map generator 312 in more detail. FIG. 7 also illustrates information flow among the various components shown. The predictive model generator 310 receives one or more of a genotype map 430, a crop state map 431, a weed map 432, a harvest coverage map 434, and another type of map 433. Predictive model generator 310 also receives a geographic location 2424, or an indication of a geographic location, such as from geographic position sensors 304. Geographic location 2424 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively include wrapping sensors 386 and hair pinning sensors 388, as well as processing system 338. In some examples, processing system 338 is separate from in-situ sensors 308 (such as the example shown in FIG. 4). In some instances, wrapping sensors 386 or hair pinning sensors 388, or both, may be located on-board agricultural harvester 100. The processing system 338 processes sensor data generated from wrapping sensors 386 and hair pinning sensors 388 to generate processed sensor data 2440 indicative of wrapping values and hair pinning values.

As shown in FIG. 7, the example predictive model generator 310 includes a wrapping-to-genotype model generator 2441, a wrapping-to-crop state model generator 2442, a wrapping-to-weed model generator 2443, a wrapping-to-harvest coverage model generator 5000, a wrapping-to-other characteristic model generator 2444, a hair pinning-to-genotype model generator 2445, a hair pinning-to-crop state model generator 2446, a hair pinning-to-weed model generator 2447, a hair pinning-to-harvest coverage model generator 6000, and a hair pinning-to-other characteristic model generator 2448. In other examples, the predictive model generator 310 may include additional, fewer, or different components than those shown in the example of FIG. 7. Consequently, in some examples, the predictive model generator 310 may include other items as well, which may include other types of predictive model generators to generate other types of models.

Wrapping-to-genotype model generator 2441 identifies a relationship between wrapping value(s) detected in in-situ sensor data 2440, at geographic location(s) to which the wrapping value(s), detected in the in-situ sensor data 2440, correspond, and genotype values from the genotype map 430 corresponding to the same geographic location(s) to which the detected wrapping value(s) correspond. Based on this relationship established by wrapping-to-genotype model generator 2441, wrapping-to-genotype model generator 2441 generates a predictive wrapping model. The predictive wrapping model is used by wrapping map generator 2452 to predict wrapping at different locations in the field based upon the georeferenced genotype values contained in the genotype map 430 at the same locations in the field. Thus, for a given location in the field, a wrapping value can be predicted at the given location based on the predictive wrapping model and the genotype value, from the genotype map 430, at that given location.

Wrapping-to-crop state model generator 2442 identifies a relationship between wrapping value(s) detected in in-situ sensor data 2440, at geographic location(s) to which the wrapping value(s), detected in the in-situ sensor data 2440, correspond, and crop state values from the crop state map 431 corresponding to the same geographic location(s) to which the detected wrapping value(s) correspond. Based on this relationship established by wrapping-to-crop state model generator 2442, wrapping-to-crop state model generator 2442 generates a predictive wrapping model. The predictive wrapping model is used by wrapping map generator 2452 to predict wrapping at different locations in the field based upon the georeferenced crop state values contained in the crop state map 431 at the same locations in the field. Thus, for a given location in the field, a wrapping value can be predicted at the given location based on the predictive wrapping model and the crop state value, from the crop state map 431, at that given location.

Wrapping-to-weed model generator 2443 identifies a relationship between wrapping value(s) detected in in-situ sensor data 2440, at geographic location(s) to which the wrapping value(s), detected in the in-situ sensor data 2440, correspond, and weed values from the weed map 432 corresponding to the same geographic location(s) to which the detected wrapping value(s) correspond. Based on this relationship established by wrapping-to-weed model generator 2443, wrapping-to-weed model generator 2443 generates a predictive wrapping model. The predictive wrapping model is used by wrapping map generator 2452 to predict wrapping at different locations in the field based upon the georeferenced weed values contained in the weed map 432 at the same locations in the field. Thus, for a given location in the field, a wrapping value can be predicted at the given location based on the predictive wrapping model and the weed value, from the weed map 432, at that given location.

Wrapping-to-harvest coverage model generator 5000 identifies a relationship between wrapping value(s) detected in in-situ sensor data 2440, at geographic location(s) to which the wrapping value(s), detected in the in-situ sensor data 2440, correspond, and harvest coverage values from the harvest coverage map 434 corresponding to the same geographic location(s) to which the detected wrapping value(s) correspond. Based on this relationship established by wrapping-to-harvest coverage model generator 5000, wrapping-to-harvest coverage model generator 5000 generates a predictive wrapping model. The predictive wrapping model is used by wrapping map generator 2452 to predict wrapping at different locations in the field based upon the georeferenced harvest coverage values contained in the harvest coverage map 434 at the same locations in the field. Thus, for a given location in the field, a wrapping value can be predicted at the given location based on the predictive wrapping model and the harvest coverage value, from the harvest coverage map 434, at that given location.

Wrapping-to-other characteristic model generator 2444 identifies a relationship between wrapping value(s) detected in in-situ sensor data 2440, at geographic location(s) to which the wrapping value(s), detected in the in-situ sensor data 2440, correspond, and values of an other characteristic from an other map 433 corresponding to the same geographic location(s) to which the detected wrapping value(s) correspond. Based on this relationship established by wrapping-to-other characteristic model generator 2444, wrapping-to-other characteristic model generator 2444 generates a predictive wrapping model. The predictive wrapping model is used by wrapping map generator 2452 to predict wrapping at different locations in the field based upon the georeferenced values of the other characteristic contained in the other map 433 at the same locations in the field. Thus, for a given location in the field, a wrapping value can be predicted at the given location based on the predictive wrapping model and the value of the other characteristic, from the other map 433, at that given location.

In light of the above, the predictive model generator 310 is operable to produce a plurality of predictive wrapping models, such as one or more of the predictive wrapping models generated by model generators 2441, 2442, 2443, 2444, 5000 and 2449. In another example, two or more of the predictive models described above may be combined into a single predictive wrapping model, such as a predictive wrapping model that predicts wrapping based upon two or more of the genotype values, the crop state value, the weed values, the harvest coverage values, and the other characteristic values at different locations in the field. Any of these wrapping models, or combinations thereof, are represented collectively by predictive wrapping model 2450 in FIG. 7.

The predictive wrapping model 2450 is provided to predictive map generator 312. In the example of FIG. 7, predictive map generator 312 includes wrapping map generator 2452. In other examples, predictive map generator 312 may include additional or different map generators. Thus, in some examples, predictive map generator 312 may include other items 2458 which may include other types of map generators to generate other types of maps.

Wrapping map generator 2452 receives one or more of the genotype map 430, the crop state map 431, the weed map 432, the harvest coverage map 434, and an other map 433, along with the predictive wrapping model 2450 which predicts wrapping based upon one or more of a genotype value, a crop state value, a weed value, a harvest coverage value, and an other characteristic value, and generates a predictive map that predicts wrapping at different locations in the field, such as functional predictive wrapping map 2470.

Predictive map generator 312 thus outputs a functional predictive wrapping map 2470 that is predictive of wrapping. Functional predictive wrapping map 2470 is a predictive map 264. The functional predictive wrapping map 2470, in one example, predicts wrapping at different locations in a field. The functional predictive wrapping map 2470 may be provided to control zone generator 313, control system 314, or both. Control zone generator 313 generates control zones and incorporates those control zones into the functional predictive wrapping map 2470 to produce a predictive control zone map 265, that is a functional predictive wrapping control zone map 2471.

One or both of functional predictive wrapping map 2470 and functional predictive wrapping control zone map 2471 may be provided to control system 314, which generates control signals to control one or more of the controllable subsystems 316 based upon the functional predictive wrapping map 2470, the functional predictive wrapping control zone map 2471, or both.

Hair pinning-to-genotype model generator 2445 identifies a relationship between hair pinning value(s) detected in in-situ sensor data 2440, at geographic location(s) to which the hair pinning value(s), detected in the in-situ sensor data 2440, correspond, and genotype values from the genotype map 430 corresponding to the same geographic location(s) to which the detected hair pinning value(s) correspond. Based on this relationship established by hair pinning-to-genotype model generator 2445, hair pinning-to-genotype model generator 2445 generates a predictive hair pinning model. The predictive hair pinning model is used by hair pinning map generator 2453 to predict hair pinning at different locations in the field based upon the georeferenced genotype values contained in the genotype map 430 at the same locations in the field. Thus, for a given location in the field, a hair pinning value can be predicted at the given location based on the predictive hair pinning model and the genotype value, from the genotype map 430, at that given location.

Hair pinning-to-crop state model generator 2446 identifies a relationship between hair pinning value(s) detected in in-situ sensor data 2440, at geographic location(s) to which the hair pinning value(s), detected in the in-situ sensor data 2440, correspond, and crop state values from the crop state map 431 corresponding to the same geographic location(s) to which the detected hair pinning value(s) correspond. Based on this relationship established by hair pinning-to-crop state model generator 2446, hair pinning-to-crop state model generator 2446 generates a predictive hair pinning model. The predictive hair pinning model is used by hair pinning map generator 2453 to predict hair pinning at different locations in the field based upon the georeferenced crop state values contained in the crop state map 431 at the same locations in the field. Thus, for a given location in the field, a hair pinning value can be predicted at the given location based on the predictive hair pinning model and the crop state value, from the crop state map 431, at that given location.

Hair pinning-to-weed model generator 2447 identifies a relationship between hair pinning value(s) detected in in-situ sensor data 2440, at geographic location(s) to which the hair pinning value(s), detected in the in-situ sensor data 2440, correspond, and weed values from the weed map 432 corresponding to the same geographic location(s) to which the detected hair pinning value(s) correspond. Based on this relationship established by hair pinning-to-weed model generator 2447, hair pinning-to-weed model generator 2447 generates a predictive hair pinning model. The predictive hair pinning model is used by hair pinning map generator 2453 to predict hair pinning at different locations in the field based upon the georeferenced weed values contained in the weed map 432 at the same locations in the field. Thus, for a given location in the field, a hair pinning value can be predicted at the given location based on the predictive hair pinning model and the weed value, from the weed map 432, at that given location.

Hair pinning-to-harvest coverage model generator 6000 identifies a relationship between hair pinning value(s) detected in in-situ sensor data 2440, at geographic location(s) to which the hair pinning value(s), detected in the in-situ sensor data 2440, correspond, and harvest coverage values from the harvest coverage map 434 corresponding to the same geographic location(s) to which the detected hair pinning value(s) correspond. Based on this relationship established by hair pinning-to-harvest coverage model generator 6000, hair pinning-to-harvest coverage model generator 6000 generates a predictive hair pinning model. The predictive hair pinning model is used by hair pinning map generator 2453 to predict hair pinning at different locations in the field based upon the georeferenced harvest coverage values contained in the harvest coverage map 434 at the same locations in the field. Thus, for a given location in the field, a hair pinning value can be predicted at the given location based on the predictive hair pinning model and the harvest coverage value, from the harvest coverage map 434, at that given location.

Hair pinning-to-other characteristic model generator 2448 identifies a relationship between hair pinning value(s) detected in in-situ sensor data 2440, at geographic location(s) to which the hair pinning value(s), detected in the in-situ sensor data 2440, correspond, and values of an other characteristic from an other map 433 corresponding to the same geographic location(s) to which the detected hair pinning value(s) correspond. Based on this relationship established by hair pinning-to-other characteristic model generator 2448, hair pinning-to-other characteristic model generator 2448 generates a predictive hair pinning model. The predictive hair pinning model is used by hair pinning map generator 2453 to predict hair pinning at different locations in the field based upon the georeferenced values of the other characteristic contained in the other map 433 at the same locations in the field. Thus, for a given location in the field, a hair pinning value can be predicted at the given location based on the predictive hair pinning model and the value of the other characteristic, from the other map 433, at that given location.

In light of the above, the predictive model generator 310 is operable to produce a plurality of predictive hair pinning models, such as one or more of the predictive hair pinning models generated by model generators 2445, 2446, 2447, 2448, 6000 and 2449. In another example, two or more of the predictive models described above may be combined into a single predictive hair pinning model, such as a predictive hair pinning model that predicts hair pinning based upon two or more of the genotype values, the crop state value, the weed values, the harvest coverage values, and the other characteristic values at different locations in the field. Any of these hair pinning models, or combinations thereof, are represented collectively by predictive hair pinning model 2451 in FIG. 7.

The predictive hair pinning model 2451 is provided to predictive map generator In the example of FIG. 7, predictive map generator 312 includes hair pinning map generator 2453. In other examples, predictive map generator 312 may include additional or different map generators. Thus, in some examples, predictive map generator 312 may include other items 2458 which may include other types of map generators to generate other types of maps.

Hair pinning map generator 2453 receives one or more of the genotype map 430, the crop state map 431, the weed map 432, the harvest coverage map 434, and an other map 433, along with the predictive hair pinning model 2451 which predicts hair pinning based upon one or more of a genotype value, a crop state value, a weed value, a harvest coverage value, and an other characteristic value, and generates a predictive map that predicts hair pinning at different locations in the field, such as functional predictive hair pinning map 2480.

Predictive map generator 312 thus outputs a functional predictive hair pinning map that is predictive of hair pinning. Functional predictive hair pinning map 2480 is a predictive map 264. The functional predictive hair pinning map 2480, in one example, predicts hair pinning at different locations in a field. The functional predictive hair pinning map 2480 may be provided to control zone generator 313, control system 314, or both. Control zone generator 313 generates control zones and incorporates those control zones into the functional predictive hair pinning map to produce a predictive control zone map 265, that is a functional predictive hair pinning control zone map 2481.

One or both of functional predictive hair pinning map 2480 and functional predictive hair pinning control zone map 2481 may be provided to control system 314, which generates control signals to control one or more of the controllable subsystems 316 based upon the functional predictive hair pinning map 2480, the functional predictive hair pinning control zone map 2481, or both.

Figure 8B:
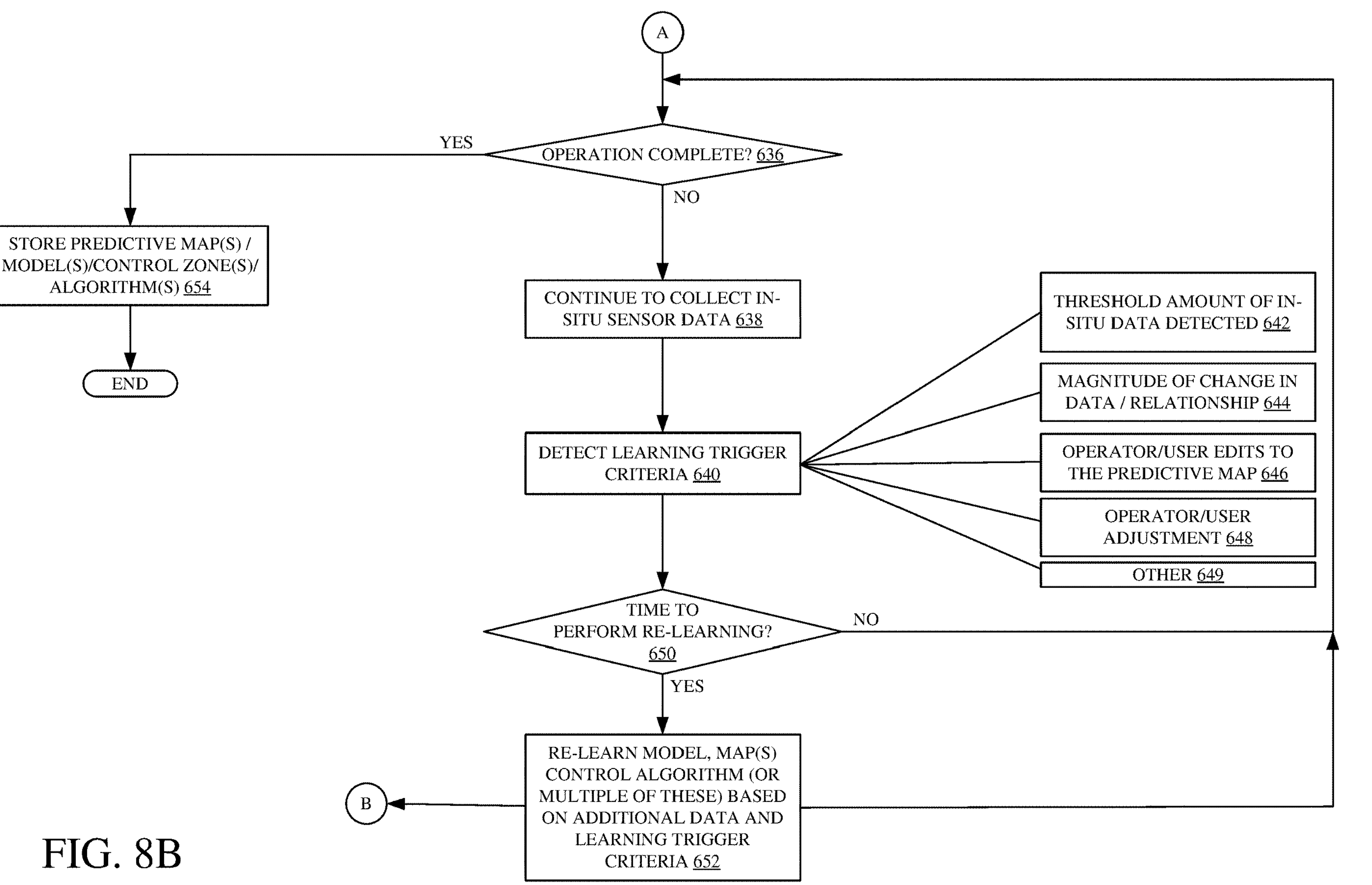

FIGS. 8A-8B (collectively referred to herein as FIG. 8) show a flow diagram illustrating one example of the operation of agricultural harvesting system architecture 300 in generating a predictive model and a predictive map At block 602, agricultural system 300 receives one or more information maps 358. Examples of information maps 358 or receiving information maps 358 are discussed with respect to blocks 604, 606, 608, and 609. As discussed above, information maps 358 map values of a variable, corresponding to a characteristic, to different locations in the field, as indicated at block 606. As indicated at block 604, receiving the information maps 358 may involve selecting one or more of a plurality of possible information maps 358 that are available. For instance, one information map 358 may be a genotype map, such as genotype map 430. Another information map 358 may be a crop state map, such as crop state map 431. Another information map 358 may be a weed map, such as weed map 432. Another information map may be a harvest coverage map, such as harvest coverage map 434. Information maps 358 may include various other types of maps that map various other characteristics, such as other maps 433. The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed operating parameters during a previous seeding operation or sensed characteristics during a spraying operation earlier in the year may be used as data to generate the information maps 358. In other examples, and as described above, the information maps 358 may be predictive maps having predictive values. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 609 in the flow diagram of FIG. 8.

As agricultural harvester 100 is operating, in-situ sensors 308 generate sensor signals indicative of one or more in-situ data values indicative of a characteristic. For example, ear sensors 380 generate sensor data indicative of one or more in-situ data values indicative of one or more ear characteristics, as indicated by block 611. For example, ear sensors 380 can include one or more of ear loss sensors 382 that sense one or more in-situ data values of ear loss as an ear characteristic and ear orientation sensors 384 that sense one or more in-situ data values of ear orientation as an ear characteristic. Control input sensors 390 generate sensor data indicative of one or more in-situ data values indicative of one or more control inputs, as indicated by block 612. Wrapping sensors 386 generate sensor data indicative of one or more in-situ data values indicative of one or more wrapping values, as indicated by block 613. Hair pinning sensors 388 generate sensor data indicative of one or more in-situ data values indicative of one or more hair pinning values, as indicated by block 614.

In some examples, data from in-situ sensors 308 is georeferenced using position, heading, or speed data, as well as machine dimension information, sensor position information, etc.

In one example, at block 615, predictive model generator 310 controls one or more of the model generators 441, 442, 443, 4000, 444, 445, 446, 447, 448 and 449 to generate a model that models the relationship between the mapped values, such as the genotype values, the crop state values, the weed values, the harvest coverage values, and the other characteristic values contained in the respective information map and the in-situ values of the one or more ear characteristics (e.g., one or more of ear loss and ear orientation) sensed by the in-situ sensors 308. Predictive model generator 310 generates a predictive ear characteristic model 450 that predicts values of one or more ear characteristics based on one or more of genotype values, crop state values, weed values, harvest coverage values, and other characteristic values, as indicated by block 616.

In one example, at block 615, predictive model generator 310 controls one or more of the model generators 1441,

1442, 1443, 1444, 1445, and 1449 to generate a model that models the relationship between the mapped values, such as the genotype values, the crop state values, the weed values, the harvest coverage values, and the other characteristic values contained in the respective information map and the in-situ control input values sensed by the in-situ sensors 308. Predictive model generator 310 generates a predictive control input model 1450 that predicts control input values based on one or more of genotype values, crop state values, weed values, harvest coverage values, and other characteristic values, as indicated by block 617.

In one example, at block 615, predictive model generator 310 controls one or more of the model generators 2441, 2442, 2443, 5000, 2444, and 2449 to generate a model that models the relationship between the mapped values, such as the genotype values, the crop state values, the weed values, the harvest coverage values, and the other characteristic values contained in the respective information map and the in-situ wrapping values sensed by the in-situ sensors 308. Predictive model generator 310 generates a predictive wrapping model 2450 that predicts wrapping values based on one or more of genotype values, crop state values, weed values, harvest coverage values, and other characteristic values, as indicated by block 618.

In one example, at block 615, predictive model generator 310 controls one or more of the model generators 2445, 2446, 2447, 6000, 2448, and 2449 to generate a model that models the relationship between the mapped values, such as the genotype values, the crop state values, the weed values, the harvest coverage values, and the other characteristic values contained in the respective information map and the in-situ hair pinning values sensed by the in-situ sensors 308. Predictive model generator 310 generates a predictive hair pinning model 2451 that predicts hair pinning values based on one or more of genotype values, crop state values, weed values, harvest coverage values, and other characteristic values, as indicated by block 619.

At block 620, the relationship(s) or model(s) generated by predictive model generator 310 are provided to predictive map generator 312. In one example, at block 620, predictive map generator 312 generates a functional predictive ear characteristic map 460 that predicts values of one or more ear characteristics (or sensor values indicative of the one or more ear characteristics), such as one or more of ear loss and ear orientation, at different geographic locations in a field at which agricultural harvester 100 is operating using the predictive ear characteristic model 450 and one or more of the information maps 358, such as genotype map 430, crop state map 431, weed map 432, harvest coverage map 434, and an other map 433. Generating a predictive ear characteristic map, such as functional predictive ear characteristic map 460, is indicated by block 621.

It should be noted that, in some examples, the functional predictive ear characteristic map 460 may include two or more different map layers. Each map layer may represent a different data type, for instance, a functional predictive ear characteristic map 460 that provides two or more of a map layer that provides predictive ear loss or ear orientation, or both, based on genotype values from genotype map 430, a map layer that provides predictive ear loss or ear orientation, or both, based on crop state values from crop state map 431, a map layer that provides predictive ear loss or ear orientation, or both, based on weed values from weed map 432, a map layer that provides predictive ear loss based on values from harvest coverage map 434, and a map layer that provides predictive ear loss or ear orientation, or both, based on values from an other map 433. Additionally, functional predictive ear characteristic map 460 can include a map layer that provides one or more of predictive ear loss and predictive ear orientation based on one or more of genotype values from genotype map 430, crop state values from crop state map 431, weed values from weed map 432, harvest coverage values from harvest coverage map 434, and values of an other characteristic from an other map 433.

In one example, at block 620, predictive map generator 312 generates a functional predictive control input map 1460 that predicts values of control input (or sensor values indicative of control input) at different geographic locations in a field at which agricultural harvester 100 is operating using the predictive control input model 1450 and one or more of the information maps 358, such as genotype map 430, crop state map 431, weed map 432, harvest coverage map 434, and an other map 433. Generating a predictive control input map, such as functional predictive control input map 1460, is indicated by block 622.

It should be noted that, in some examples, the functional predictive control input map 1460 may include two or more different map layers. Each map layer may represent a different data type, for instance, a functional predictive control input map 1460 that provides two or more of a map layer that provides predictive control input based on genotype values from genotype map 430, a map layer that provides predictive control input based on crop state values from crop state map 431, a map layer that provides predictive control input based on weed values from weed map 432, a map layer that provides predictive control input based on harvest coverage values from harvest coverage map 434, and a map layer that provides predictive control input based on values from an other map 433. Additionally, functional predictive control input map 1460 can include a map layer that provides predictive control input based on one or more of genotype values from genotype map 430, crop state values from crop state map 431, weed values from weed map 432, harvest coverage values from harvest coverage map 434, and values of an other characteristic from an other map 433.

In one example, at block 620, predictive map generator 312 generates a functional predictive wrapping map 2470 that predicts wrapping values (or sensor values indicative of wrapping) at different geographic locations in a field at which agricultural harvester 100 is operating using the predictive wrapping model 2450 and one or more of the information maps 358, such as genotype map 430, crop state map 431, weed map 432, harvest coverage map 434, and an other map 433. Generating a predictive wrapping map, such as functional predictive wrapping map 2470, is indicated by block 623.

It should be noted that, in some examples, the functional predictive wrapping map 2470 may include two or more different map layers. Each map layer may represent a different data type, for instance, a functional predictive wrapping map 2470 that provides two or more of a map layer that provides predictive wrapping based on genotype values from genotype map 430, a map layer that provides predictive wrapping based on crop state values from crop state map 431, a map layer that provides predictive wrapping based on weed values from weed map 432, a map layer that provides predictive wrapping based on harvest coverage values from harvest coverage map 434, and a map layer that provides predictive wrapping based on values from an other map 433. Additionally, functional predictive wrapping map 2470 can include a map layer that provides predictive wrapping based on one or more of genotype values from genotype map 430, crop state values from crop state map

431, weed values from weed map 432, harvest coverage values from harvest coverage map 434, and values of an other characteristic from an other map 433.

In one example, at block 620, predictive map generator 312 generates a functional predictive hair pinning map 2480 that predicts hair pinning values (or sensor values indicative of hair pinning) at different geographic locations in a field at which agricultural harvester 100 is operating using the predictive hair pinning model 2451 and one or more of the information maps 358, such as genotype map 430, crop state map 431, weed map 432, harvest coverage map 434, and an other map 433. Generating a predictive hair pinning map, such as functional predictive hair pinning map 2480, is indicated by block 624.

It should be noted that, in some examples, the functional predictive hair pinning map 2480 may include two or more different map layers. Each map layer may represent a different data type, for instance, a functional predictive hair pinning map 2480 that provides two or more of a map layer that provides predictive hair pinning based on genotype values from genotype map 430, a map layer that provides predictive hair pinning based on crop state values from crop state map 431, a map layer that provides predictive hair pinning based on weed values from weed map 432, a map layer that provides predictive hair pinning based on harvest coverage values from harvest coverage map 434, and a map layer that provides predictive hair pinning based on values from an other map 433. Additionally, functional predictive hair pinning map 2480 can include a map layer that provides predictive hair pinning based on one or more of genotype values from genotype map 430, crop state values from crop state map 431, weed values from weed map 432, harvest coverage values from harvest coverage map 434, and values of an other characteristic from an other map 433.

At block 625, predictive map generator 312 configures one or more of the functional predictive ear characteristic map 460, the functional predictive control input map 1460, the functional predictive wrapping map 2470, and the functional predictive hair pinning map 2480 so that the one or more maps 460, 1460, 2470, and 2480 are actionable (or consumable) by control system 314. Predictive map generator 312 can provide one or more of the functional predictive ear characteristic map 460, the functional predictive control input map 1460, the functional predictive wrapping map 2470, and the functional predictive hair pinning map 2480 to the control system 314 or to control zone generator 313, or both. Some examples of the different ways in which the one or more maps 460, 1460, 2470, and 2480 can be configured or output are described with respect to blocks 625, 626, 627, and 628. For instance, predictive map generator 312 configures one or more of the functional predictive ear characteristic map 460, the functional predictive control input map 1460, the functional predictive wrapping map 2470, and the functional predictive hair pinning map 2480 so that the one or more maps 460, 1460, 2470, and 2480 include values that can be read by control system 314 and used as the basis for generating control signals for one or more of the different controllable subsystems 316 of mobile machine 100, as indicated by block 625.

In one example, at block 626, control zone generator 313 can divide the functional predictive ear characteristic map 460 into control zones based on the values on the functional predictive ear characteristic map 460 to generate functional predictive ear characteristic control zone map 461. In one example, at block 626, control zone generator 313 can divide the functional predictive control input map 1460 into control zones based on the values on the functional predictive control input map 1460 to generate functional predictive control input control zone map 1461. In one example, at block 626, control zone generator 313 can divide the functional predictive wrapping map 2470 into control zones based on the values on the functional wrapping map 2470 to generate functional predictive wrapping control zone map 2471. In one example, at block 626, control zone generator 313 can divide the functional predictive hair pinning map 2480 into control zones based on the values on the functional predictive hair pinning map 2480 to generate functional predictive hair pinning control zone map 2481. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 314, the controllable subsystems 316, based on wear considerations, or on other criteria.

At block 627, predictive map generator 312 configures one or more of the functional predictive ear characteristic map 460, the functional predictive control input map 1460, the functional predictive wrapping map 2470, and the functional predictive hair pinning map 2480 for presentation to an operator or other user. At block 622, control zone generator 313 can configure one or more of the functional predictive ear characteristic control zone map 461, the functional predictive control input control zone map 1461, the functional predictive wrapping control zone map 2471, and the functional predictive hair pinning control zone map 2481 for presentation to an operator or other user. When presented to an operator or other user, the presentation of the one or more maps 460, 1460, 2470, and 2480 or of the one or more maps 461, 1461, 2471, and 2481, or both, may contain one or more of the predictive values on the one or more functional predictive maps 460, 1460, 2470, and 2480 correlated to geographic location, the control zones of the one or more functional control zone maps 461, 1461, 2471, and 2481 correlated to geographic location, and settings values or control parameters that are used based on the predicted values on the one or more functional predictive maps 460, 1460, 2470, and 2480 or control zones on the one or more functional predictive control zone maps 461, 1461, 2471, and 2481. The presentation can, in another example, include more abstracted information or more detailed information. The presentation can also include a confidence level that indicates an accuracy with which the predictive values on the one or more maps 460, 1460, 2470, and 2480 or the control zones the one or more maps 461, 1461, 2471, and 2481 conform to measured values that may be measured by sensors on agricultural harvester 100 as agricultural harvester 100 operates at the field. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the one or more functional predictive maps 460, 1460, 2470, and 2480 or make any changes to machine operation. A supervisor, such as a supervisor at a remote location, however, may be able to see the one or more functional predictive maps 460, 1460, 2470, and 2480 on the display but be prevented from making any changes. A manager, who may be at a separate remote location, may be able to see all of the elements on the one or more functional predictive maps 460, 1460, 2470, and 2480 and also be able to change the one or more functional predictive maps 460, 1460, 2470, and 2480. In some instances, the one or more functional predictive maps 460, 1460, 2470, and 2480 accessible and changeable by a manager located remotely may be used in machine control. This is one example of an authorization hierarchy that may be implemented. The one or more functional predictive maps 460, 1460, 2470, and 2480 or the one or more functional predictive control zone maps 461, 1461, 2471, and 2481, or both, can be configured in other ways as well, as indicated by block 628.

At block 629, input from geographic position sensors 304 and other in-situ sensors are received by the control system 314. Particularly, at block 630, control system 314 detects an input from the geographic position sensors 304 identifying a geographic location of agricultural harvester 100. Block 631 represents receipt by the control system 314 of sensor inputs indicative of trajectory or heading of agricultural harvester 100, and block 632 represents receipt by the control system 314 of a speed of agricultural harvester 100. Block 633 represents receipt by the control system 314 of other information from various in-situ sensors 308.

At block 634, control system 314 generates control signals to control the controllable subsystems 316 based on one or more of the functional predictive maps 460, 1460, 2470, and 2480 or one or more of the functional predictive control zone maps 461, 1461, 2471, and 2481, or both, and the input from the geographic position sensor 304 and any other in-situ sensors 308. At block 635, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of the one or more functional predictive maps 460, 1460, 2470, and 2480 or the one or more functional predictive control zone maps 461, 1461, 2471, and 2481, or both, that are being used. Similarly, the control signals that are generated and the controllable subsystems 316 that are controlled and the timing of the control signals can be based on various latencies of agricultural harvester 100 and the responsiveness of the controllable subsystems 316.

By way of example, propulsion controller 331 of control system 314 can generate control signals to control propulsion subsystem 350 to control one or more propulsion parameters of agricultural harvester 100, such as one or more of the speed at which the agricultural harvester 100 travels, the deceleration of agricultural harvester 100, and the acceleration of agricultural harvester 100, based on one or more of the functional predictive maps 460, 1460, 2470, and 2480 or one or more of the functional predictive control zone maps 461, 1461, 2471, and 2481 or both.

In another example, path planning controller 334 of control system 314 can generate control signals to control steering subsystem 352 to control a route parameter of agricultural harvester 100, such as one or more of a commanded path at the field over which agricultural harvester 100 travels, and the steering of agricultural harvester 100, based on one or more of the functional predictive maps 460, 1460, 2470, and 2480 or one or more of the functional predictive control zone maps 461, 1461, 2471, and 2481 or both, In another example, one or more end divider controllers 335 of control system 314 can generate control signals to control end divider subsystem 340 to control one or more end dividers (e.g., 146 and 150 or 147), based on one or more functional predictive maps 460, 1460, 2470, and 2480 or the one or more functional predictive control zone maps 461, 1461, 2471, and or both. For example, an end divider controller 335 can generate control signals to control one or more end divider actuators 342 to control movement of one or more end dividers, for instance to extend or retract one or more of end dividers 146 and 150, to control the speed of rotation of one or more end dividers 147, or to control the direction of rotation of one or more end dividers 147, based on one or more of the functional predictive maps 460, 1460, 2470, and 2480 or the one or more of the functional predictive control zone maps 461, 1461, 2471, and 2481, or both.

In another example, interface controller 330 of control system 314 can generate control signals to control an interface mechanism (e.g., 218 or 364) to generate a display, alert, notification, or other indication based on or indicative of the one or more functional predictive maps 460, 1460, 2470, and 2480 or the one or more functional predictive control zone maps 461, 1461, 2471, and 2481, or both.

In another example, communication system controller 329 of control system 314 can generate control signals to control communication system 306 to communicate one or more of the functional predictive maps 460, 1460, 2470, and 2480 or one or more of the functional predictive control zone maps 461, 1461, 2471, and 2481, or both, to another item of agricultural system 300 (e.g., remote computing systems 368 or user interfaces 364).

These are merely examples. Control system 314 can generate various other control signals to control various other items of mobile machine 100 (or agricultural system 300) based on one or more of the functional predictive maps 460, 1460, 2470, and 2480 or one or more of the functional predictive control zone maps 461, 1461, 2471, and 2481, or both, At block 636, a determination is made as to whether the operation has been completed. If the operation is not completed, the processing advances to block 638 where in-situ sensor data from geographic position sensor 304 and in-situ sensors 308 (and perhaps other sensors) continue to be read.

In some examples, at block 640, agricultural system 300 can also detect learning trigger criteria to perform machine learning on one or more of the functional predictive maps 460, 1460, 2470, and 2480, one or more of the functional predictive control zone maps 461, 1461, 2471, and 2481, one or more of the predictive models 450, 1450, 2450, and 2451 the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 642, 644, 646, 648, and 649. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as agricultural harvester 100 continues an operation, receipt of the threshold amount of in-situ sensor data from the in-situ sensors 308 triggers the creation of a new relationship represented by a new predictive model (e.g., one or more of new model 450, new model 1450, new model 2450, and new model 2451) generated by predictive model generator 310. Further, one or more new functional predictive maps 460, 1460, 2470, and 2480 or one or more new functional predictive control zone maps 461, 1461, 2471, and 2481, or both, can be generated using the respective new models 450, 1450, 2450, and 2451. Block 642 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive map, a new functional predictive control zone map, or both. However, if variations within the in-situ sensor data are outside of the selected range, are greater than the defined amount, or are above the threshold value, for example, then the predictive model generator 310 generates a new model using all or a portion of the newly received in-situ sensor data that the predictive map generator 312 uses to generate a new functional predictive map which can be provided to control zone generator 313 for the creation of a new functional predictive control zone map. At block 644, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive model, a new functional predictive map, and a new functional predictive control zone map. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of agricultural harvester 100 to a different topography or to a different control zone may be used as learning trigger criteria as well.

In some instances, operator 360 or user 366 can also edit the one or more functional predictive maps 460, 1460, 2470, and 2480 or the one or more functional predictive control zone maps 461, 1461, 2471, and 2481 or both. The edits can change value(s) on the one or more functional predictive maps 460, 1460, 2470, and 2480, change a size, shape, position, or existence of control zone(s) on the one or more functional predictive control zone maps 461, 1461, 2471, and 2481, or both. Block 646 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to generate a new model, predictive map generator 312 to generate a new functional predictive map, control zone generator 313 to generate one or more new control zones on a functional predictive control zone map, and control system 314 to relearn a control algorithm or to perform machine learning on one or more of the controller components 329 through 339 in control system 314 based upon the adjustment by the operator 360 or user 366, as shown in block 648. Block 649 represents the use of other triggered learning criteria.

In other examples, relearning may be performed periodically or intermittently based, for example, upon a selected time interval such as a discrete time interval or a variable time interval, as indicated by block 650.

If relearning is triggered, whether based upon learning trigger criteria or based upon passage of a time interval, as indicated by block 650, then one or more of the predictive model generator 310, predictive map generator 312, control zone generator 313, and control system 314 performs machine learning to generate one or more new predictive models, one or more new predictive maps, one or more new control zones, and one or more new control algorithms, respectively, based upon the learning trigger criteria. The new predictive model(s), the new predictive map(s), the new control zone(s), and the new control algorithm(s) are generated using any additional data that has been collected since the last learning operation was performed. Performing relearning is indicated by block 652.

If the operation has been completed, operation moves from block 652 to block 654 where one or more of the functional predictive map(s), functional predictive control zone map(s), the predictive model(s), the control zone(s), and the control algorithm(s), are stored. The functional predictive map(s), functional predictive control zone map(s), predictive model(s), control zone(s), and control algorithm(s), may be stored locally on data store 302 or sent to a remote system using communication system 306 for later use.

If the operation has not been completed, operation moves from block 652 to block such that the one or more of the new predictive model(s), the new functional predictive map(s), the new functional predictive control zone map(s), the new control zone(s), and the new control algorithm(s) can be used in the control of agricultural harvester 100.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop genotype, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic, such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in areas of the worksite (which have not yet been operated on in the current operation, such as unharvested areas) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a genotype map, a crop state map, a weed map, and another type of map.

In-situ sensors generate sensor data indicative of in-situ characteristic values, such as in-situ values of one or more ear characteristics (e.g., one or more of ear loss and ear orientation).

A predictive model generator generates one or more predictive models based on the one or more obtained maps and the in-situ sensor data, such as a predictive ear characteristic model.

A predictive map generator generates one or more functional predictive maps based on a model generated by the predictive model generator and the one or more obtained maps. For example, the predictive map generator may generate a functional predictive ear characteristic map that maps predictive values of one or more ear characteristics to one or more locations on the worksite based on a predictive ear characteristic model and the one or more obtained maps.

Control zones, which include machine settings values, can be incorporated into the functional predictive ear characteristic map to generate a functional predictive ear characteristic map with control zones.

As another example, without limitation, consider an instance of the paradigm described herein which is parameterized as follows.

One or more maps of the field are obtained, such as one or more of a genotype map, a crop state map, a weed map, and another type of map.

In-situ sensors generate sensor data indicative of in-situ characteristic values, such as in-situ control input values.

A predictive model generator generates one or more predictive models based on the one or more obtained maps and the in-situ sensor data, such as a predictive control input model.

A predictive map generator generates one or more functional predictive maps based on a model generated by the predictive model generator and the one or more obtained maps. For example, the predictive map generator may generate a functional predictive control input map that maps predictive control input values to one or more locations on the worksite based on a predictive control input model and the one or more obtained maps.

Control zones, which include machine settings values, can be incorporated into the functional predictive control input map to generate a functional predictive control input map with control zones.

As another example, without limitation, consider an instance of the paradigm described herein which is parameterized as follows.

One or more maps of the field are obtained, such as one or more of a genotype map, a crop state map, a weed map, and another type of map.

In-situ sensors generate sensor data indicative of in-situ characteristic values, such as in-situ wrapping values.

A predictive model generator generates one or more predictive models based on the one or more obtained maps and the in-situ sensor data, such as a predictive wrapping model.

A predictive map generator generates one or more functional predictive maps based on a model generated by the predictive model generator and the one or more obtained maps. For example, the predictive map generator may generate a functional predictive wrapping map that maps predictive wrapping values to one or more locations on the worksite based on a predictive wrapping model and the one or more obtained maps.

Control zones, which include machine settings values, can be incorporated into the functional predictive wrapping map to generate a functional predictive wrapping map with control zones.

As another example, without limitation, consider an instance of the paradigm described herein which is parameterized as follows.

One or more maps of the field are obtained, such as one or more of a genotype map, a crop state map, a weed map, and another type of map.

In-situ sensors generate sensor data indicative of in-situ characteristic values, such as in-situ hair pinning values.

A predictive model generator generates one or more predictive models based on the one or more obtained maps and the in-situ sensor data, such as a predictive hair pinning model.

A predictive map generator generates one or more functional predictive maps based on a model generated by the predictive model generator and the one or more obtained maps. For example, the predictive map generator may generate a functional predictive hair pinning map that maps predictive hair pinning values to one or more locations on the worksite based on a predictive hair pinning model and the one or more obtained maps.

Control zones, which include machine settings values, can be incorporated into the functional predictive hair pinning map to generate a functional predictive hair pinning map with control zones.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained map(s). The functional predictive map(s) or the functional predictive control zone map(s), or both, are then revised based on the revised model(s) and the values in the obtained map(s).

Figure 9:
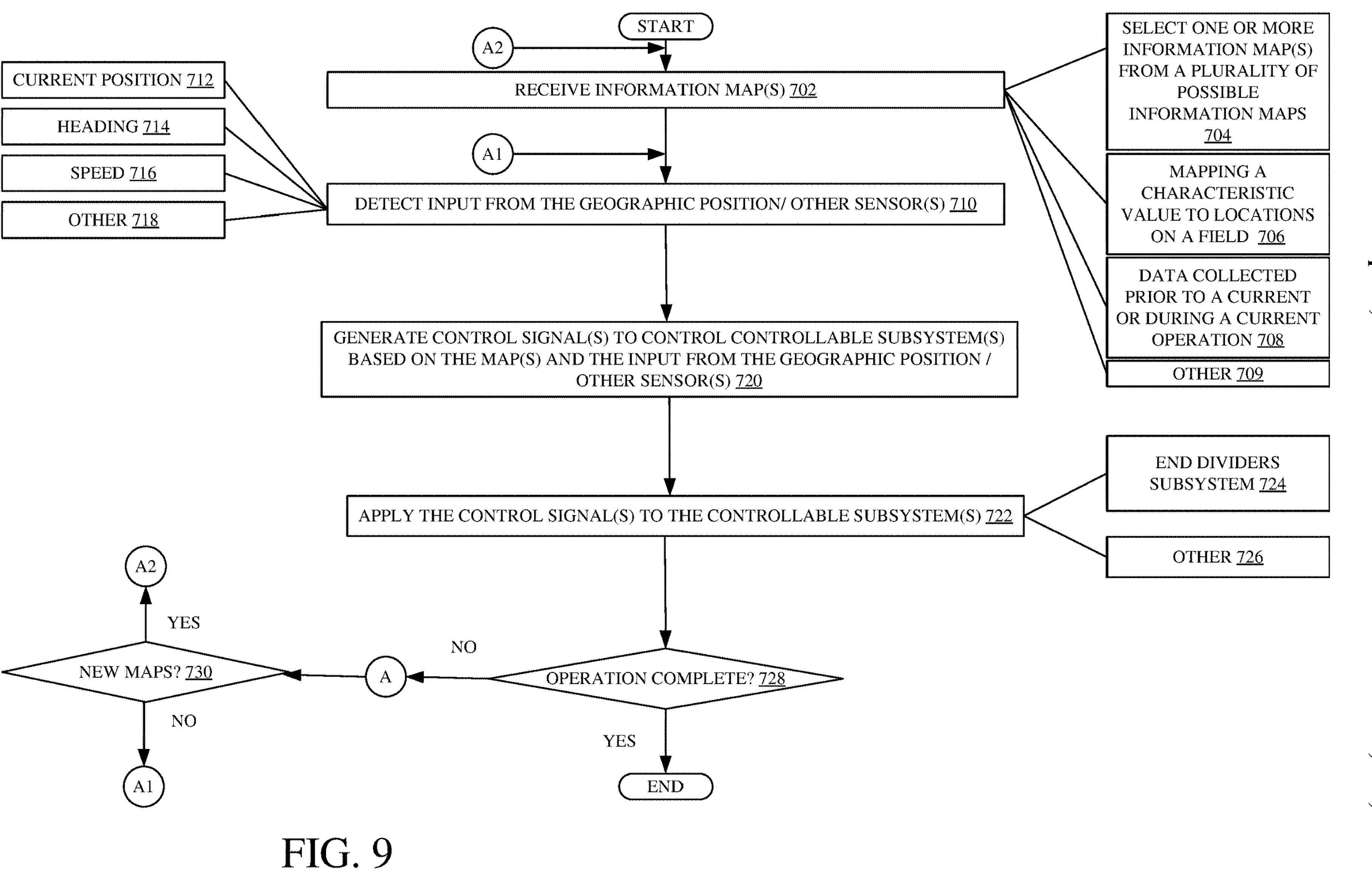
FIG. 9 shows a flow diagram illustrating one example operation of controlling an agricultural harvester.

FIG. 9 is shows a flow diagram illustrating one example of the operation of controlling agricultural harvester 100.

At block 702, agricultural system 300 receives one or more information maps 358. Examples of information maps 358 or receiving information maps 358 are discussed with respect to blocks 704, 706, 708, and 709. As discussed above, information maps 358 map values of a variable, corresponding to a characteristic, to different locations in the field, as indicated at block 706. As indicated at block 704, receiving the information maps 358 may involve selecting one or more of a plurality of possible information maps 358 that are available. For instance, one information map 358 may be a genotype map, such as genotype map 430. Another information map 358 may be a crop state map, such as crop state map 431. Another information map 358 may be a weed map, such as weed map 432. Another information map may be a harvest coverage map, such as harvest coverage map 434. Information maps 358 may include various other types of maps that map various other characteristics, such as other maps 439. The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed operating parameters during a previous seeding operation or sensed characteristics during a spraying operation earlier in the year may be used as data to generate the information maps 358. In some examples, the sensed operating parameters during a previous harvesting operation in the same year may be used as data to generate the information map, for instance, sensed parameters of a harvester that partially harvested the field earlier in the year may be used as the basis for generation of a harvest coverage map. In other examples, the information maps may be generated during the current operation, for instance, obtaining sensor data, tracking the geographic location(s) and the operation(s) of one or more agricultural harvesters as the one or more agricultural harvesters move across the field can be used as the basis for the generation of the harvest coverage map, which can be continuously updated throughout the current operation. In other examples, and as described above, the information maps 358 may be predictive maps having predictive values. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 709 in the flow diagram of FIG. 9.

At block 710, input from geographic position sensors 304 and other in-situ sensors 308 are received by control system 314. Particularly, at block 712, control system 314 detects an input from geographic position sensors 304 identifying a geographic location of agricultural harvester 100. Block 714 represents receipt by the control system 314 of sensor inputs indicative of trajectory or heading of agricultural harvester 100, and block 716 represents receipt by the control system 314 of a speed of agricultural harvester 100. Block 718 represents receipt by the control system 314 of other information from various in-situ sensors 308.

At block 720, control system 314 generates control signals to control the controllable subsystems based on one or more of the information maps 358, such as one or more of the genotype map 430, the crop state map 431, the weed map 432, the harvest coverage map 434, and an other map 433, and the input from the geographic position sensors 304, and any other input, such as, but not limited to, the speed and heading/trajectory of agricultural harvester 100. At block 722, control system 314 applies the control signals to the controllable subsystems 316, such as end dividers subsystem 340, as indicated by block 724, or any of wide variety of other controllable subsystems 316, as indicated by block 726. It will be appreciated that the particular control signals that are generated, and the particular controllable subsystems 316 that are controlled, may vary based upon one or more different things. For example, the control signals that are generated and the controllable subsystems 316 that are controlled may be based on the type of the one or more information maps 358 that are being used. Similarly, the control signals that are generated and the controllable subsystems 316 that are controlled and the timing of the control signals can be based on various latencies of agricultural harvester 100 and the responsiveness of the controllable subsystems 316.

By way of example, end divider controllers 335 of control system 314 can generate control signals to control the operation of one or more end dividers of agricultural harvester 100.

For example, the information map 358 may be a harvest coverage map, such as harvest coverage map 434. The harvest coverage map may indicate that a row adjacent to the head of agricultural harvester 100 has been harvested. In such a case, an end divider controller 335 can generate a control signal to control an end divider actuator 342 to extend or raise the end divider (146 or 150) on the side of head 144 adjacent to the harvested row. In another example, an end divider controller 335 can generate a control signal to control an end divider actuator 342 to initiate or speed up the rotation of the end divider 147 on the side of head 144 adjacent to the harvested row. Where the harvest coverage map indicates that the rows adjacent to each side of head 144 are harvested, the end divider on each side can be controlled in similar fashion.

In another example, the harvest coverage map may indicate that a row adjacent to the head 144 of agricultural harvester 100 is unharvested. In such a case, an end divider controller 335 can generate a control signal to control an end divider actuator to retract or lower the end divider (146 or 150) on the side of head 144 adjacent to the unharvested row. In another example, an end divider controller 335 can generate a control signal to control an end divider actuator 342 to stop or slow down rotation of the end divider 147 on the side of head 144 adjacent to the unharvested row. Where the harvest coverage map indicates that the rows adjacent to each side of head 144 are unharvested, the end divider on each side can be controlling similar fashion.

Further, where the adjacent row next to one side of head 144 is unharvested and the adjacent row next to the opposite side of head 144 is harvested, the respective end divider on each side can be controlled differently and separately, as detailed above.

In another example, the information map 358 may be a crop state map. The crop state map may indicate that the plants (e.g., crops and/or weeds) ahead of, adjacent to, or in the area of head 144 are down or partially down. In such a case, end divider controller(s) 335 can generate control signal(s) to control end divider actuator(s) 342 to retract or lower end divider(s) (e.g., 146 or 150, or both). Where the crop state map indicates that the plants ahead of, adjacent to, or in the area of head 144 are down or partially down only partially across the width of head 144, it may be that the end divider closer to the down or partially down plants is retracted or lowered. In another example, end divider controller(s) 335 can generate control signal(s) to control end divider actuator(s) 342 to start or speed up rotation of end divider(s) 147 where the crop state maps indicate that the plants ahead of, adjacent to, or in the area of head 144 are down or partially down. Where the crop state map indicates that the plants ahead of or in the area of head 144 are down or partially down only partially across the width of head 144, it may be that only the end divider 147 closer to the down or partially down plants is controlled to start or speed up rotation.

In another example, the information map 358 may be a weed map. The weed map may indicate the intensity or type of weeds ahead of, adjacent to, or in the area of head 144. For example, where the weeds are more intense (relative to a threshold level), end divider controller(s) 335 can generate control signal(s) to retract or lower end divider(s) (e.g., 146 or 150, or both), such as to prevent hair pinning. In another example, where the weeds are less intense (relative to a threshold level), end divider end divider controller(s) 335 can generate control signal(s) to extend or raise end divider(s) (e.g., 146 or 150, or both) as the risk of hair pinning may be reduced. Where the weed map indicates that the weeds ahead of or in the area of head 144 are more intense (relative to a threshold level) only partially across the width of head 144, it may be that only the end divider 146 or 150 closer to the more intense weeds is controlled to retract or lower. Similarly, where the weed map indicates that the weeds ahead of or in the area of head 144 are less intense (relative to a threshold level) only partially across the width of head 144, it may be that only the end divider 146 or 150 closer to the less intense weeds is controlled to extend or raise.

In another example, where the weed map indicates that the weed type of the weeds ahead of, adjacent to, or in the area of head 144 are or include vine type weeds (or another type of weed more likely to wrap), end divider controller(s) 335 can generate control signal(s) to stop or slow rotation of end divider(s) 147, such as to prevent wrapping. In another example, where the weeds are non-vine type (or another type of weed less likely to wrap) end divider end divider controller(s) 335 can generate control signal(s) to start or speed up rotation of end divider(s) 147, as the risk of wrapping may be reduced. Where the weed map indicates that the type of weeds ahead of or in the area of head 144 are more likely to wrap but only partially across the width of head 144, it may be that only the rotation of end divider 147 closer to the more intense weeds is stopped or slowed.

In another example, the information map 358 may be a genotype map. The genotype map may indicate that the crop ahead of, adjacent to, or in the area of head 144 is of a certain genotype. Each genotype of crop may have different characteristics such that the control of agricultural harvester for each genotype may be different. For instance, one genotype may be more likely to have non-erect or drooping ears, and thus, end dividers 146 or 150 may be retracted or lowered to prevent knocking off the ears. One genotype may be more likely to have erect ears, and thus, end dividers 146 or 150 may be extended or raised due to the reduced risk of knocking off ears. In another example, ear loss from bouncing in the head 144 may be less likely for a given genotype, and thus, end dividers 146 or 150 may be retracted or lowered to prevent hair pinning without risking increased ear loss or rotation of end dividers 147 may be stopped or slowed to prevent wrapping without risking increased ear loss. Ear loss from bouncing in the head 144 may be more likely for a given genotype, and thus, end dividers 146 or 150 may be extended or raised or rotation of end dividers 147 may be initiated or sped up. These are merely some examples.

In some examples, values from more than one information map 358 may be used by control system 314 in controlling the controllable subsystems 316. For example, the harvest coverage map may indicate that the row adjacent to a side of head 144 is unharvested (such that the end divider on that side should be raised), however the crop state map may indicate that the plants ahead of or in the area of head 144 are down (such that the end divider should be retracted or lowered). Where there are conflicting controls, control system 314 may prioritize one over the other. The prioritization can be set by an operator or user, based on historical performance, stored in a data store, manufacturer recommended, as well as a wide variety of other sources. In another example, the harvest coverage map may indicate that the row adjacent to the side of head 144 is unharvested (such that the end divider on that side should be lowered) but the genotype map indicates that the crop genotype in the area adjacent to that side of head is more likely to have erect (as opposed to drooping) ears, thus control system 314 may only partially lower the end divider rather than fully retract the end divider. These are merely some examples.

Additionally, in some examples, control system 314 may perform machine learning. For instance, it may be that an operator or user provides a control input (via an interface mechanism) to control a controllable subsystem, such as end dividers subsystem 340, in an area of the field with a given characteristic as indicated by an information map 358. Control system 314 may then implement that same control in other areas of the field with that given characteristic. The operator or user may override or adjust that control, which can be used as learning trigger by the control system to adjust the control algorithm. For instance, the operator or user may provide an input to lower or retract end divider(s) in areas of the field where the crop state map indicates that the plants are down. Control system 314 may then automatically control the end dividers to retract or lower in other areas of the field where the crop state map indicates that the plants are down. This is merely an example.

It will be understood that the thresholds described above may be provided by an operator or user, already stored in a data store, manufacture recommended, based on historical performance, as well as from a wide variety of other sources.

At block 728 it is determined if the harvesting operation is complete. If the harvesting operation is not completed, the operation proceeds to block 730 where it is determined if new or updated information maps 358 have been generated. If new or updated maps have been generated, operation proceeds to block 702 where the new or updated maps are obtained. If no new or updated maps have been generated, operation proceeds to block 710.

If, at block 728, it is determined that the harvesting operation is completed then processing ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 10:
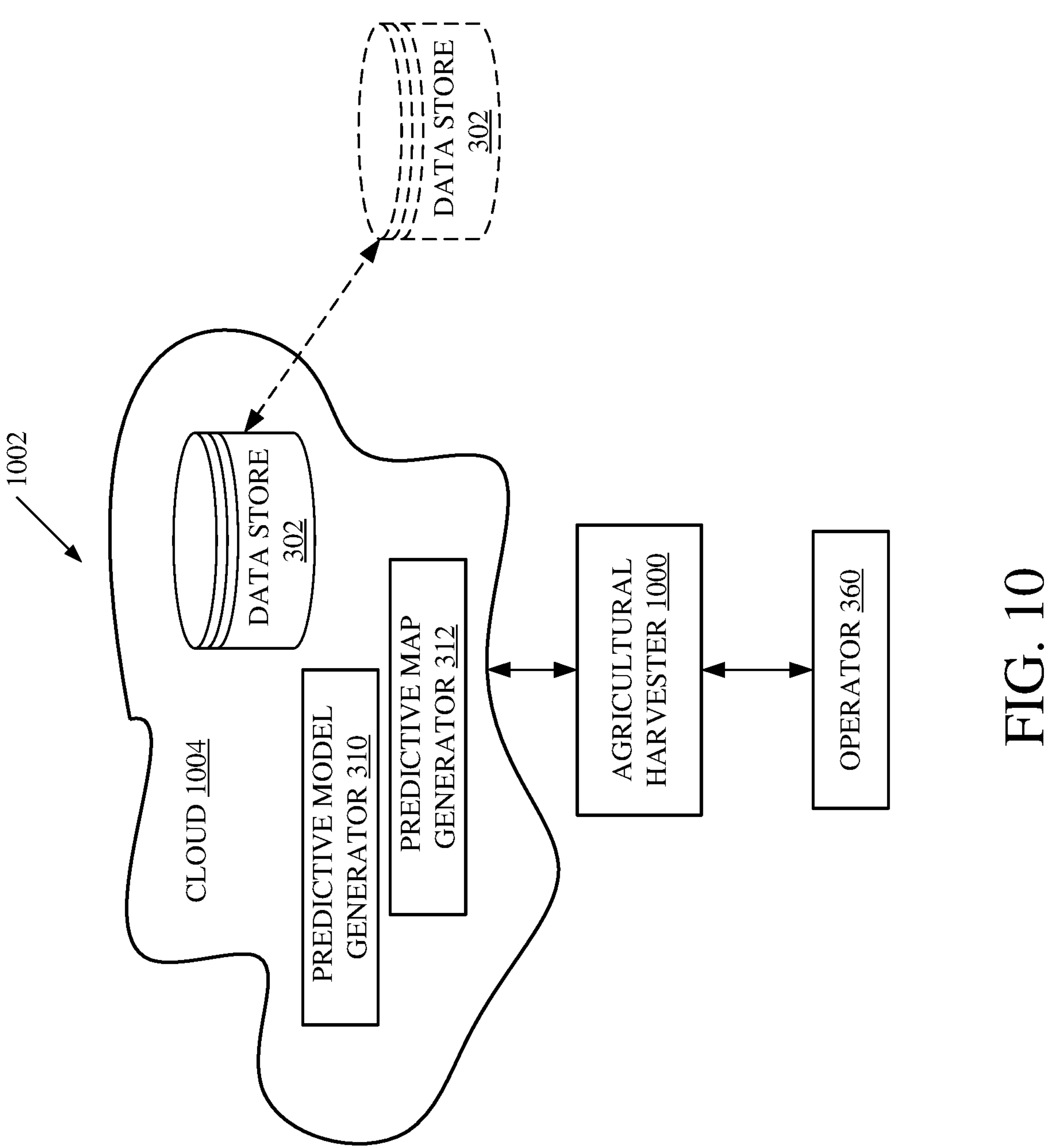
FIG. 10 is a block diagram showing one example of an agricultural harvester in communication with a remote server environment.

FIG. 10 is a block diagram of agricultural harvester 1000, which may be similar to agricultural harvester 100 shown in FIG. 4. The agricultural harvester 1000 communicates with elements in a remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 4 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 10, some items are similar to those shown in FIG. 4 and those items are similarly numbered. FIG. 10 specifically shows that predictive model generator 310 or predictive map generator 312, or both, may be located at a server location 1004 that is remote from the agricultural harvester 1000. Therefore, in the example shown in FIG. 10, agricultural harvester 1000 accesses systems through remote server location 1004. In other examples, various other items may also be located at server location 1004, such as data store 302, map selector 309, predictive model 311, functional predictive maps 263 (including predictive maps 264 and predictive control zone maps 265), control zone generator 313, control system 314, and processing system 338.

FIG. 10 also depicts another example of a remote server architecture. FIG. 10 shows that some elements of FIG. 4 may be disposed at a remote server location 1104 while others may be located elsewhere. By way of example, data store 302 may be disposed at a location separate from location 1004 and accessed via the remote server at location 1004. Regardless of where the elements are located, the elements can be accessed directly by agricultural harvester 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the agricultural harvester 1000 comes close to the machine containing the information collection system, such as a fuel truck prior to fueling, the information collection system collects the information from the agricultural harvester 1000 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the agricultural harvester 1000 until the agricultural harvester 1000 enters an area having wireless communication coverage. The agricultural harvester 1000, itself, may send the information to another network.

It will also be noted that the elements of FIG. 4, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 11:
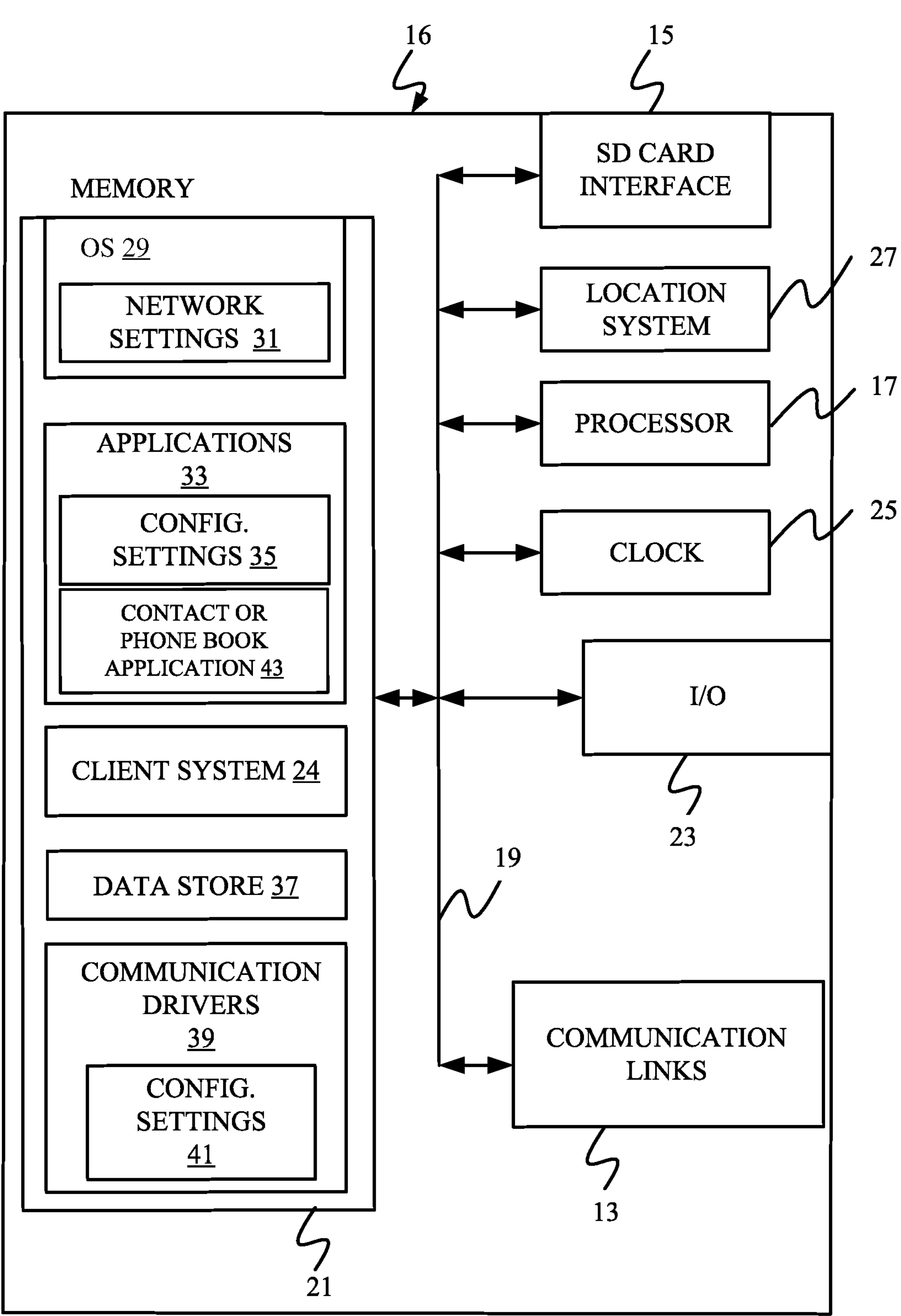
FIGS. 11-13 show examples of mobile devices that can be used in an agricultural harvester.
Figure 12:
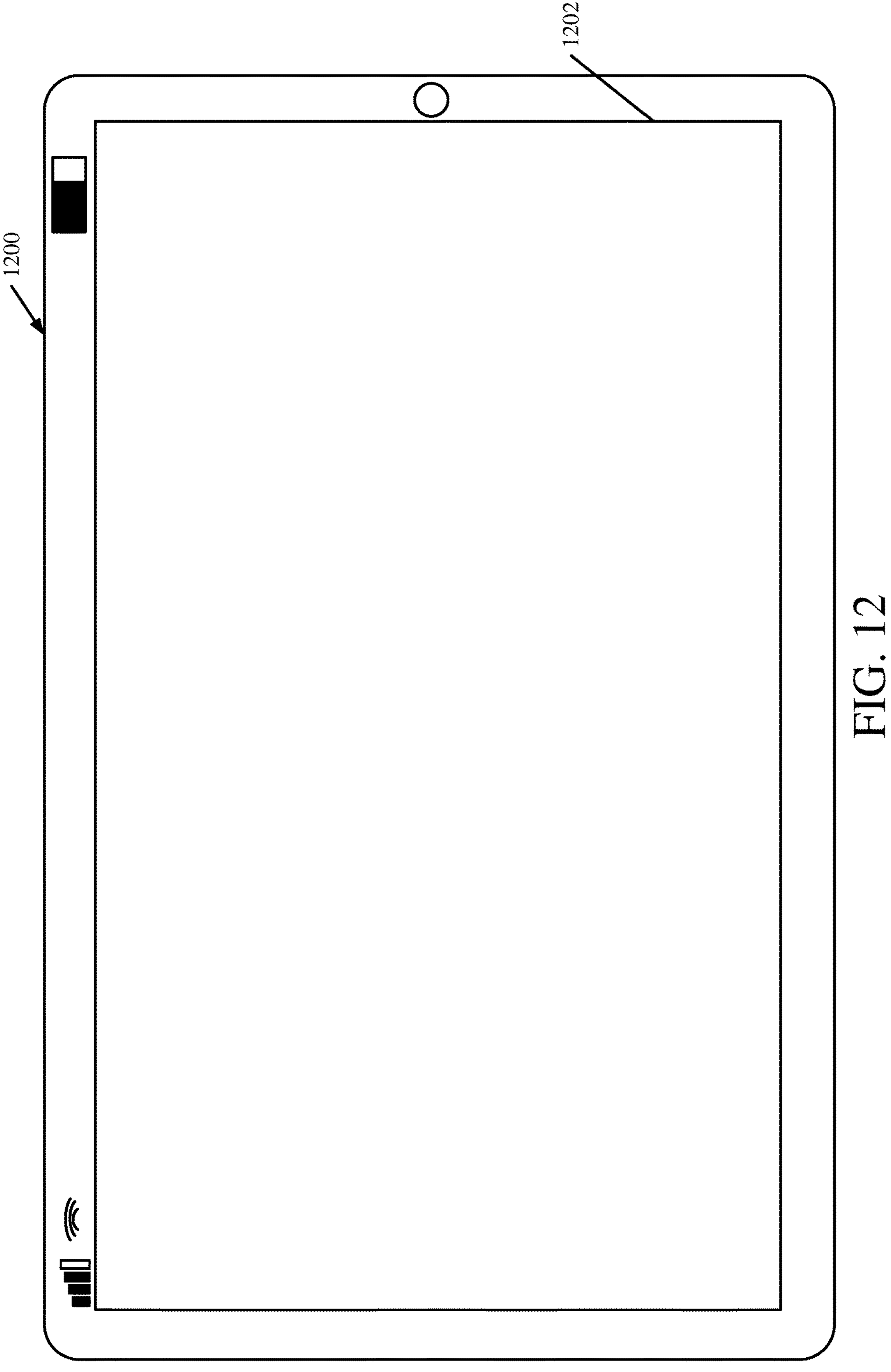
Figure 13:
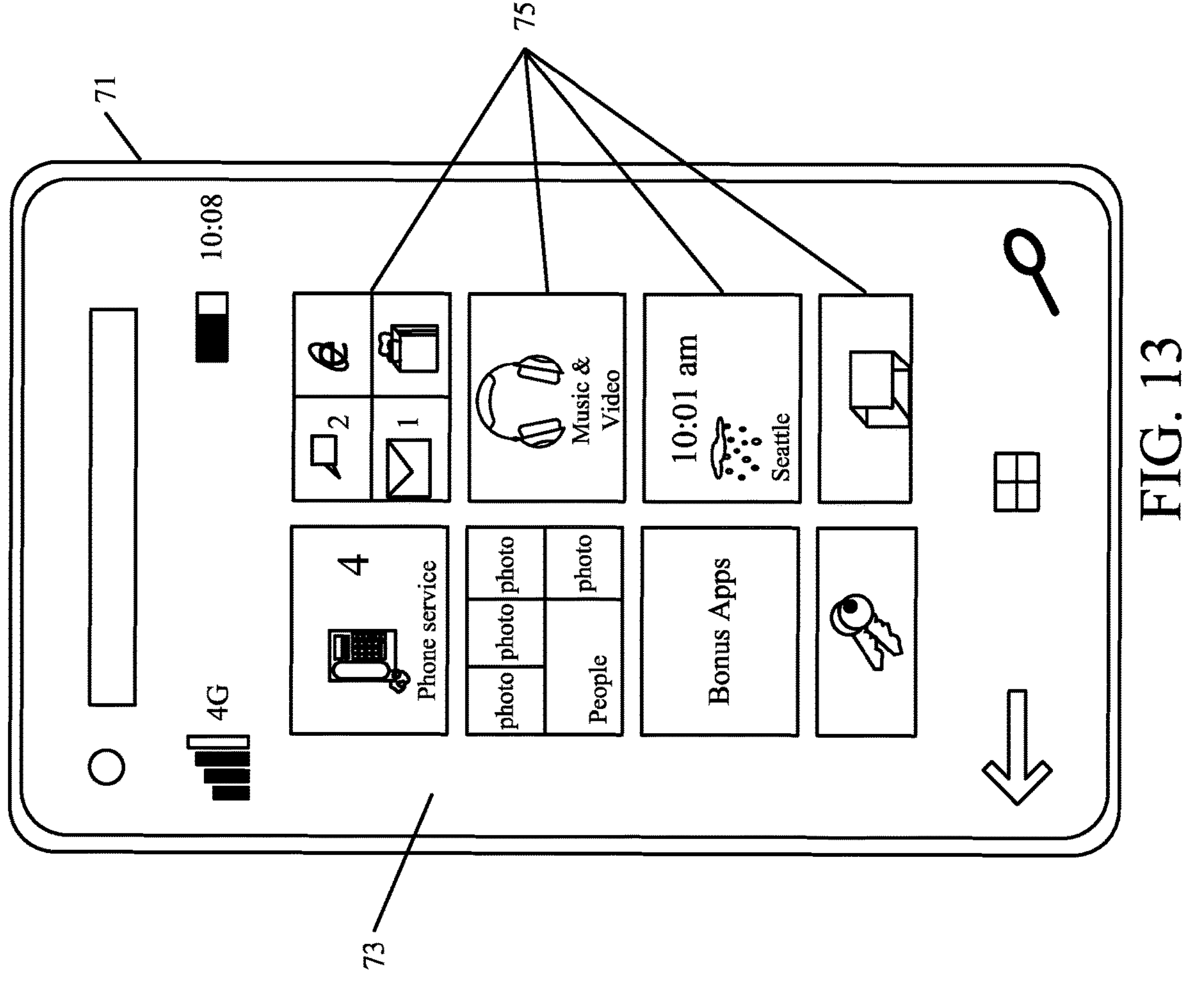

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural harvester 100 for use in generating, processing, or displaying the maps discussed above. FIGS. 12-13 are examples of handheld or mobile devices.

FIG. 11 provides a general block diagram of the components of a client device 16 that can run some components shown in FIG. 4, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 12 shows one example in which device 16 is a tablet computer 1200. In FIG. 12, computer 1200 is shown with user interface display screen 1202. Screen 1202 can be a touch screen or a pen-enabled interface that receives inputs from a pen or stylus. Tablet computer 1200 may also use an on-screen virtual keyboard. Of course, computer 1200 might also be attached to a keyboard or other user input device through a suitable attachment mechanism, such as a wireless link or USB port, for instance. Computer 1200 may also illustratively receive voice inputs as well.

FIG. 13 is similar to FIG. 12 except that the device is a smart phone 71. Smart phone 71 has a touch sensitive display 73 that displays icons or tiles or other user input mechanisms Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
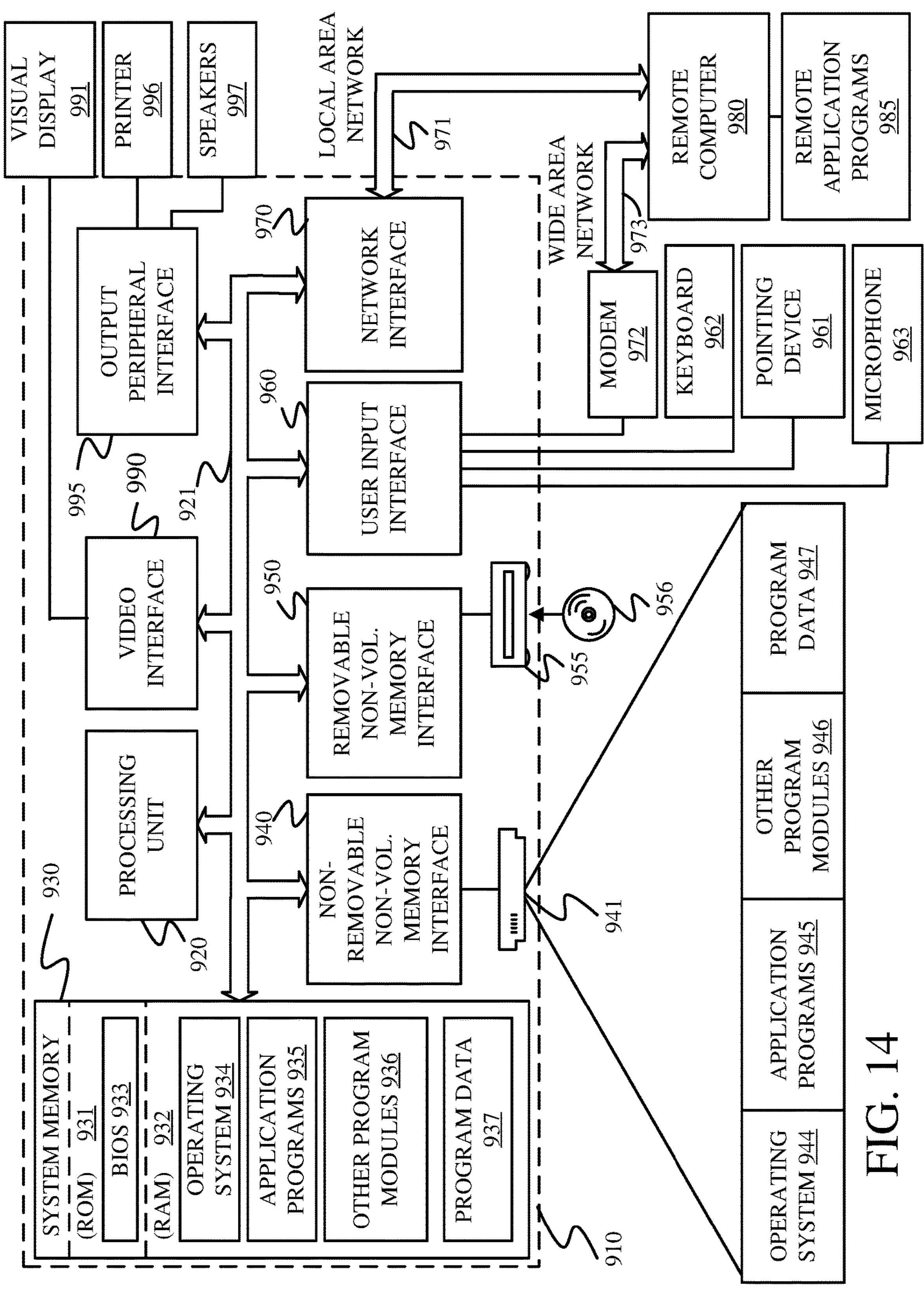
FIG. 14 is a block diagram showing one example of a computing environment that can be used in an agricultural harvester.

FIG. 14 is one example of a computing environment in which elements of FIG. 4 can be deployed. With reference to FIG. 14, an example system for implementing some embodiments includes a computing device in the form of a computer 910 programmed to operate as discussed above. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 4 can be deployed in corresponding portions of FIG. 14.

Computer 910 typically includes a variety of computer readable media. Computer readable media may be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory or both such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data or program modules or both that are immediately accessible to and/or presently being operated on by processing unit 920. By way of example, and not limitation, FIG. 14 illustrates operating system 934, application programs 935, other program modules 936, and program data 937.

The computer 910 may also include other removable/non-removable volatile/nonvolatile computer storage media. By way of example only, FIG. 14 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 910. In FIG. 14, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a controller area network—CAN, local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 14 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:

a control system that:

receives, from a geographic position sensor, a geographic position of an agricultural harvester in a field;

receives a map that maps values of a characteristic corresponding to different geographic locations in the field; and generates, based on the map and the geographic position of the agricultural harvester, a control signal to control an end divider actuator to move an end divider on a head of the agricultural harvester while the agricultural harvester travels over the field, the head being configured to engage and harvest crop from the field and having at least a first end, wherein the end divider is positioned on and movable relative to the first end of the head.

2. The agricultural system of claim 1, wherein the map comprises one or more maps, each map, of the one or more maps, mapping values of a respective characteristic corresponding to the different geographic locations in the field, wherein the one or more maps comprise one or more of:

a harvest coverage map that maps, as values of the respective characteristic, harvest coverage values to the different geographic locations in the field;

a genotype map that maps, as values of the respective characteristic, genotype values to the different geographic locations in the field;

a crop state map that maps, as values of the respective characteristic, crop state values to the different geographic locations in the field; and a weed map that maps, as values of the respective characteristic, weed values to the different geographic locations in the field.

3. The agricultural system of claim 1, wherein the map comprises a functional predictive ear characteristic map that maps, as the values of the characteristic, predictive values of an ear characteristic, the agricultural system further comprising:

an in-situ sensor that detects a value of the ear characteristic corresponding to a geographic location in the field;

a predictive model generator that:

receives an information map that maps values of a characteristic to the different geographic locations in the field; and generates a predictive ear characteristic model that models a relationship between the characteristic mapped in the information map and the ear characteristic based on the value of the ear characteristic detected by the in-situ sensor corresponding to the geographic location and a value of the characteristic in the information map at the geographic location; and a predictive map generator that generates the functional predictive ear characteristic map that maps the predictive values of the ear characteristic to the different geographic locations in the field based on the values of the characteristic in the information map and based on the predictive ear characteristic model.

4. The agricultural system of claim 1, wherein the map comprises a functional predictive control input map that maps, as the values of the characteristic, predictive control input values, the agricultural system further comprising:

an in-situ sensor that detects a control input value corresponding to a geographic location in the field;

a predictive model generator that:

receives an information map that maps values of a characteristic to the different geographic locations in the field; and generates a predictive control input model that models a relationship between the characteristic mapped in the information map and control input based on the control input value detected by the in-situ sensor corresponding to the geographic location and a value of the characteristic in the information map at the geographic location; and a predictive map generator that generates the functional predictive control input map that maps the predictive control input values to the different geographic locations in the field based on the values of the characteristic in the information map and based on the predictive control input model.

5. The agricultural system of claim 1, wherein the map comprises a functional predictive hair pinning map that maps, as the values of the characteristic, predictive hair pinning values, the agricultural system further comprising:

an in-situ sensor that detects a hair pinning value corresponding to a geographic location in the field;

a predictive model generator that:

receives an information map that maps values of a characteristic to the different geographic locations in the field; and generates a predictive hair pinning model that models a relationship between the characteristic mapped in the information map and hair pinning based on the hair pinning value detected by the in-situ sensor corresponding to the geographic location and a value of the characteristic in the information map at the geographic location; and a predictive map generator that generates the functional predictive hair pinning map that maps the predictive hair pinning values to the different geographic locations in the field based on the values of the characteristic in the information map and based on the predictive hair pinning model.

6. The agricultural system of claim 1, wherein the map comprises a functional predictive wrapping map that maps, as the values of the characteristic, predictive wrapping values, the agricultural system further comprising:

an in-situ sensor that detects a wrapping value corresponding to a geographic location in the field;

a predictive model generator that:

receives an information map that maps values of a characteristic to the different geographic locations in the field; and generates a predictive wrapping model that models a relationship between the characteristic mapped in the information map and wrapping based on the wrapping value detected by the in-situ sensor corresponding to the geographic location and a value of the characteristic in the information map at the geographic location; and a predictive map generator that generates the functional predictive wrapping map that maps the predictive wrapping values to the different geographic locations in the field based on the values of the characteristic in the information map and based on the predictive wrapping model.

7. The agricultural system of claim 1, wherein the control system generates the control signal to control the end divider actuator to at least one of:

raise the end divider on the agricultural harvester; or lower the end divider on the agricultural harvester.

8. The agricultural system of claim 1, wherein the control system generates the control signal to control the end divider actuator to adjust rotation of the end divider on the agricultural harvester.

9. The agricultural system of claim 1, wherein the end divider actuator is configured to move the end divider, relative to the first end of the head, between a fully extended position and a fully retracted position in which at least a portion of the end divider is retracted into a body of the head.

10. A method of controlling an agricultural harvester comprising:

receiving a map that maps values of a characteristic to different geographic locations in a field;

identifying a geographic position of the agricultural harvester at the field; and while the agricultural harvester travels over the field, controlling an end divider actuator to move an end divider on a head of the agricultural harvester based on the map and the geographic position of the agricultural harvester, the head being configured to engage and harvest crop from the field and having at least a first end, wherein the end divider is positioned on and movable relative to the first end of the head.

11. The method of claim 10, wherein receiving the map comprises receiving one or more maps, each map, of the one or more maps, mapping values of a respective characteristic corresponding to the different geographic locations in the field, wherein the one or more maps comprise one or more of:

a harvest coverage map that maps, as values of the respective characteristic, harvest coverage values to the different geographic locations in the field;

a genotype map that maps, as values of the respective characteristic, genotype values to the different geographic locations in the field;

a crop state map that maps, as values of the respective characteristic, crop state values to the different geographic locations in the field; and a weed map that maps, as values of the respective characteristic, weed values to the different geographic locations in the field.

12. The method of claim 10, wherein receiving the map comprises receiving a functional predictive map that maps, as the values of the characteristic, predictive values of the characteristic to the different geographic locations in the field, wherein the method further comprises:

receiving an information map that maps values of an additional characteristic corresponding to the different geographic locations in the field;

detecting, with an in-situ sensor, a value of the characteristic corresponding to a geographic location;

generating a predictive model that models a relationship between the additional characteristic and the characteristic; and controlling a predictive map generator to generate the functional predictive map that maps the predictive values of characteristic to the different geographic locations in the field based on the values of the additional characteristic in the information map and the predictive model.

13. The method of claim 10, wherein controlling the end divider actuator comprises controlling the end divider actuator to at least one of:

raise the end divider on the head of the agricultural harvester; or lower the end divider on the head of the agricultural harvester.

14. The method of claim 10, wherein controlling the end divider actuator comprises controlling the end divider actuator to adjust rotation of the end divider on the agricultural harvester.

15. The method of claim 10, wherein the end divider actuator comprises a first end divider actuator and the end divider comprises a first end divider, and further comprising:

controlling a second end divider actuator to control a second end divider on a second end of the head of the agricultural harvester.

16. The method of claim 10 and further comprising controlling an interface mechanism to display the map.

17. The method of claim 10, wherein controlling the end divider actuator comprises controlling the end divider actuator to actuate the end divider between an active state and an inactive state in which at least a portion of the end divider is retracted into a body of the head.

18. An agricultural harvester comprising:

a geographic position sensor that detect a geographic position of the agricultural harvester in a field;

a head configured to engage and harvest crop from the field, the head having a first end and a second end;

an end divider positioned on the first end of the head;

an end divider actuator configured to move the end divider, relative to the first end of the head, from an extended position to a retracted position; and a control system that:

receives a map that maps values of a characteristic to different geographic locations in the field; and generates, based on the map and the geographic position of the agricultural harvester, a retract control signal to control the end divider actuator to move the end divider from the extended position to the retracted position.

19. The agricultural harvester of claim 18, wherein the map comprises one of:

a harvest coverage map that maps, as values of the characteristic, harvest coverage values to the different geographic locations in the field;

a genotype map that maps, as values of the characteristic, genotype values to the different geographic locations in the field;

a crop state map that maps, as values of the characteristic, crop state values to the different geographic locations in the field; and a weed map that maps, as values of the characteristic, weed values to the different geographic locations in the field.

20. The agricultural harvester of claim 18, wherein the map comprises a functional predictive map that maps, as the values of the characteristic, predictive values of the characteristic to the different geographic locations;

wherein the functional predictive map is generated based on a predictive model that models a relationship between the characteristic and an additional characteristic; and wherein the predictive model models the relationship based on an in-situ value of the characteristic, detected by an in-situ sensor, corresponding to a geographic location and a value of the additional characteristic at the geographic location in an information map.

* * * * *